US009378313B2

(12) United States Patent
Noureldin et al.

(10) Patent No.: US 9,378,313 B2
(45) Date of Patent: *Jun. 28, 2016

(54) METHODS FOR ENHANCED ENERGY EFFICIENCY VIA SYSTEMATIC HYBRID INTER-PROCESSES INTEGRATION

(71) Applicant: Saudi Arabian Oil Company, Dhahran (SA)

(72) Inventors: Mahmoud Bahy Noureldin, Dhahran (SA); Mana M. Al-Owaidh, Al-Ulaya (SA); Abdulaziz M. Alnutaifi, Dammam (SA)

(73) Assignee: Saudi Arabian Oil Company, Dhanran (SA)

( * ) Notice: Subject to any disclaimer, the term of this patent is extended or adjusted under 35 U.S.C. 154(b) by 718 days.

This patent is subject to a terminal disclaimer.

(21) Appl. No.: 13/858,718

(22) Filed: Apr. 8, 2013

(65) Prior Publication Data

US 2013/0231909 A1 Sep. 5, 2013

Related U.S. Application Data

(63) Continuation-in-part of application No. 12/767,315, filed on Apr. 26, 2010, now Pat. No. 8,417,486.

(60) Provisional application No. 61/256,754, filed on Oct. 30, 2009.

(51) Int. Cl.
*G06G 7/48* (2006.01)
*G06F 17/50* (2006.01)

(52) U.S. Cl.
CPC ........ *G06F 17/5009* (2013.01); *G06F 2217/16* (2013.01); *G06F 2217/80* (2013.01)

(58) Field of Classification Search
CPC ... G06F 1/26; G06F 17/5009; G06F 2217/16; G06F 2217/80
USPC ...................................... 703/6, 18
See application file for complete search history.

(56) References Cited

U.S. PATENT DOCUMENTS 5,886,895 A * 3/1999 Kita ........................ F01K 13/02
700/28
7,698,022 B2 4/2010 Noureldin
(Continued)

FOREIGN PATENT DOCUMENTS

WO WO2009149447 A2 12/2009
WO WO2010088657 A2 8/2010

OTHER PUBLICATIONS

S. Ahmad, "Heat Recovery Between Areas of Integrity," Computers and Chemical Engineering, vol. 15, #12 (809-892), 1991.
(Continued)

*Primary Examiner* — Kamini S Shah
*Assistant Examiner* — Andre Pierre Louis
(74) *Attorney, Agent, or Firm* — Bracewell LLP; Constance G. Rhebergen; Christopher L. Drymalla

(57) ABSTRACT

Methods for systematically providing enhanced energy efficiency of mega industrial sites and synergy with the adjacent community through advanced hybrid inter-systems energy integration targeting and solutions generation to achieve desired best levels of energy consumption and greenhouse gas emissions reduction, are provided. An exemplary method includes identifying a plurality of possible inter-processes integration energy consumption targets for a plurality of possible inter-processes energy integration combinations between a plurality of functional areas of a mega industrial site, selecting an energy-efficient inter-processes integration energy consumption target, identifying the combination of the plurality of possible inter-processes energy integration combinations providing for the energy efficient inter-processes integration energy consumption target, generating a plurality of technically viable industrial site inter-processes heat exchange system design alternatives, and identifying the technically viable industrial site inter-processes heat exchange system design substantially providing for optimal total waste heat recovery between the respective functional areas.

25 Claims, 43 Drawing Sheets

(56) References Cited

U.S. PATENT DOCUMENTS

| | | |
|---|---|---|
| 7,729,809 B2 | 6/2010 | Noureldin |
| 7,873,443 B2 | 1/2011 | Noureldin |
| 8,032,262 B2 | 10/2011 | Noureldin |
| 8,116,918 B2 | 2/2012 | Noureldin |
| 8,116,920 B2 | 2/2012 | Noureldin |
| 8,150,559 B2 | 4/2012 | Noureldin |
| 8,150,560 B2 | 4/2012 | Noureldin |
| 8,311,682 B2 | 11/2012 | Noureldin |
| 8,364,327 B2 | 1/2013 | Noureldin |
| 2006/0178762 A1 | 8/2006 | Wroblewski |
| 2007/0067068 A1 | 3/2007 | Havlena |
| 2009/0076790 A1 | 3/2009 | Fein |
| 2009/0211263 A1 | 8/2009 | Coyle |
| 2010/0030547 A1 | 2/2010 | Noureldin |
| 2010/0070258 A1 | 3/2010 | Noureldin |
| 2011/0015801 A1 | 1/2011 | Mazzarella |
| 2011/0040550 A1 | 2/2011 | Graber |
| 2011/0106504 A1 | 5/2011 | Noureldin |
| 2011/0112698 A1* | 5/2011 | Edwards ................. G05B 17/02 700/291 |
| 2011/0266207 A1 | 11/2011 | Willard |
| 2012/0029897 A1 | 2/2012 | Cherian |
| 2012/0166616 A1 | 6/2012 | Meehan |
| 2013/0013284 A1 | 1/2013 | Wang |

OTHER PUBLICATIONS

H. Rodera, "Targeting Procedures for Energy Savings by Heat Integration Across Plants," American Institute of Chemical Engineering Journal, (45), (1721-1742) (1999).

A. Kralj, "Waste Heat Integration Between Processes," Applied Thermal Engineering, 22 (1259-1269), 2002.

M. Bagajewicz, "Multiple Plant Integration in a Total Site," American Institute of Chemical Engineering Journal, (48) (2255-2270), 2002.

A. Gorsek, "Design of the Optimal Total Heat Recovery System Using SSSP Approach," Chemical Engineering and Processing, 45 (372-382), 2006.

P. Varbanov, "Total Site Integrating Renewables With Extended Heat Transfer and Recovery," Heat Transfer Engineering, 31 (9), (733-741), 2010.

International Search Report for related pct application PCT/US2014/033156, dated Sep. 3, 2014.

U.S. Appl. No. 13/757,467, filed Feb. 1, 2013.

U.S. Appl. No. 13/757,491, filed Feb. 1, 2013.

M. Bagajewicz, H. Rodera, "Energy Savings in the Total Site Heat Integration Across Many Plants," Computers and Chemical Engineering, 24, (1237-1242), 2000.

M. Noureldin, "GHG Emissions Reduction Via Energy Efficiency Optimization," Greenhouse Gases, chapter 4, (79-100), Croatia, Intech, 2012.

* cited by examiner

FIG. 5.

*Water users*

| Facility type | Discription | Area discription | Water Dem m3/day |
|---|---|---|---|
| xx | xxx | xxxxx | 34 |
| xx | xxx | xxxxx | 1 |
| xx | xxx | xxxxx | 1 |
| xx | xxx | xxxxx | 1 |
| xx | xxx | xxxxx | 3 |
| xx | xxx | xxxxx | 3 |
| xx | xxx | xxxxx | 4 |
| xx | xxx | xxxxx | 2 |
| xx | xxx | xxxxx | 2 |
| xx | xxx | xxxxx | 2 |
| xx | xxx | xxxxx | 6 |
| xx | xxx | xxxxx | 3 |
| xx | xxx | xxxxx | 4 |
| xx | xxx | xxxxx | 44 |
| xx | xxx | xxxxx | 3 |
| xx | xxx | xxxxx | 3 |
| xx | xxx | xxxxx | 33 |
| xx | xxx | xxxxx | 34 |
| xx | xxx | xxxxx | 48 |
| xx | xxx | xxxxx | 58 |

FIG. 6.

*Buildings Energy demand

| No. | Bld. Name | Classification | Rated Value | COP/Eff |
|---|---|---|---|---|
| Bld. 1 | xx | Cooling (Ton) | | |
| | xx | Elect. App. MW | | |
| | | Heating (BTU/h) | | |
| | xx | Tot. Pwr Cons. (MW) | | |
| Bld. 2 | xx | Cooling (Ton) | | |
| | xx | Elect. App. MW | | |
| | | Heating (BTU/h) | | |
| | xx | Tot. Pwr Cons. (MW) | | |
| Bld. 3 | xx | Cooling (Ton) | | |
| | xx | Elect. App. MW | | |
| | | Heating (BTU/h) | | |
| | xx | Tot. Pwr Cons. (MW) | | |
| Bld. 4 | xx | Cooling (Ton) | | |
| | xx | Elect. App. MW | | |
| | | Heating (BTU/h) | | |
| | xx | Tot. Pwr Cons. (MW) | | |
| Bld. 5 | xx | Cooling (Ton) | | |
| | xx | Elect. App. MW | | |
| | | Heating (BTU/h) | | |
| | xx | Tot. Pwr Cons. (MW) | | |

FIG. 7.

Process Steam Demand Intervals (e.g. 3 headers configuration)

| HP | | | MP | | | | LP | | |
|---|---|---|---|---|---|---|---|---|---|
| Pr | Tmp | Min | Max | Pr | Tmp | Min | Max | Pr | Tmp | Min | Max |

| Pr | Tmp | Min | Max | Pr | Tmp | Min | Max | Pr | Tmp | Min | Max |
|---|---|---|---|---|---|---|---|---|---|---|---|
| 625 | 730 | 15 | 44 | 450 | 457 | 400 | 1000 | 140 | 354 | 1000 | 3000 |
| 625 | 730 | 15 | 44 | 450 | 457 | 600 | 1200 | 100 | 329 | 1500 | 3200 |
| 625 | 730 | 15 | 44 | 450 | 457 | 450 | 1300 | 75 | 309 | 1100 | 3400 |
| 625 | 730 | 15 | 44 | 340 | 430 | 500 | 1000 | 140 | 354 | 1500 | 3000 |
| 625 | 730 | 15 | 44 | 340 | 430 | 250 | 1200 | 100 | 329 | 2000 | 3200 |
| 625 | 730 | 15 | 44 | 340 | 430 | 800 | 1300 | 75 | 309 | 1000 | 3500 |
| 625 | 730 | 15 | 44 | 270 | 409 | 600 | 1000 | 140 | 354 | 1000 | 3100 |
| 625 | 730 | 15 | 44 | 270 | 409 | 543 | 1200 | 100 | 329 | 1286 | 3300 |
| 625 | 730 | 15 | 44 | 270 | 409 | 557 | 1300 | 75 | 309 | 1282 | 3400 |

FIG. 8.

Process Steam Generation Intervals

| HP- Process Htr | | MP-Process Htr | | LP-Process Htr | |
|---|---|---|---|---|---|
| Min | Max | Min | Max | Min | Max |
| 0 | 500 | 0 | 500 | 0 | 500 |
| 0 | 500 | 0 | 500 | 0 | 500 |
| 0 | 500 | 0 | 500 | 0 | 500 |
| 0 | 500 | 0 | 500 | 0 | 450 |
| 0 | 500 | 0 | 500 | 0 | 450 |
| 0 | 500 | 0 | 500 | 0 | 450 |
| 0 | 500 | 0 | 500 | 0 | 450 |
| 0 | 500 | 0 | 500 | 0 | 450 |
| 0 | 500 | 0 | 500 | 0 | 450 |

FIG. 9.

Power Demand Interval

| Power Demand | Fixed Load | Switchable load to STs | Min Pwr Demand | Max Pwr Demand |
|---|---|---|---|---|
| MW | 20 | 15 | 20 | 35 |

FIG. 10.

Available Fuels and their operating cost

| Fuel Type | HHV | Cost $/MMBtu | Max. Available |
|---|---|---|---|
| Fuel Gas | | | |
| Desil | | | |
| Fuel Oil | | | |
| Curde | | | |

FIG. 11.

Power Export Interval

| Power Export | Min | Max |
|---|---|---|
| MW | 0 | 120 |

Equipment List

| Equip. Name | Min | Max |
|---|---|---|
| HP- Boiler | 0 | 4000 |
| HP-Cogen | 0 | 4000 |
| MPi- Boiler | 0 | 4000 |
| MPi- Cogen | 0 | 4000 |
| ⋮ | | |
| HP-Process StmGen | 300 | 500 |
| MPi-Process StmGen | 250 | 500 |
| ⋮ | | |
| LPn-Process StmGen | 90 | 450 |
| ⋮ | | |
| STG-HP-MPi | 0 | 2000 |
| ⋮ | | |
| STG-HP-LPn | 0 | 2000 |
| ⋮ | | |
| STG-MPi-LPn | 0 | 2000 |
| ⋮ | | |
| STG-HP-Cond | 0 | 2500 |
| Solar HP-Stm | 0 | 400 |
| Solar MPi-Stm | 0 | 500 |
| ⋮ | | |
| Solar LPn-Stm | 0 | 500 |
| ⋮ | | |
| Solar BFW-Preheat Temp. | 0 | 50 |

FIG. 12.

No. of headers definition
i: Number of meduim pressure steam headers
n: Number of low pressure steam headers

FIG. 13.

| No. Headers | HP | MPi | LPn |
|---|---|---|---|
| 2 | 1 | 0 | 1 |
| 3 | 1 | 1 | 1 |
| 4 | 1 | 2 | 1 |
| 5 | 1 | 3 | 1 |
| 6 | 1 | 3 | 2 |
| 7 | 1 | 4 | 2 |

FIG. 14.

| Steam Turbines & Motors List | | | | |
|---|---|---|---|---|
| Type | Service | Switchable/Not | Rated HP | Eff. % |
| Motor-XX | Service-1 | Yes | | |
| Motor-XX | | Yes | | |
| Motor-XX | | No | | |
| Motor-XX | | No | | |
| Motor-XX | Service-2 | No | | |
| Motor-XX | | Yes | | |
| Motor-XX | | Yes | | |
| Motor-XX | Service-3 | No | | |
| Motor-XX | | No | | |
| Motor-XX | | No | | |
| Motor-XX | | No | | |
| Motor-XX | Service-i | Yes | | |
| Motor-XX | | Yes | | |
| Motor-XX | | Yes | | |
| Motor-XX | | Yes | | |
| ... | ... | ... | ... | ... |

| Type | Service | Switchable/Not | Rated HP | Stm Rate (Stm/hp) |
|---|---|---|---|---|
| ST-XX | Service-1 | Yes | | |
| ST-XX | | Yes | | |
| ST-XX | | No | | |
| ST-XX | | No | | |
| ST-XX | Service-2 | No | | |
| ST-XX | | Yes | | |
| ST-XX | | Yes | | |
| ST-XX | Service-3 | No | | |
| ST-XX | | No | | |
| ST-XX | | No | | |
| ST-XX | | No | | |
| ST-XX | Service-i | Yes | | |
| ST-XX | | Yes | | |
| ST-XX | | Yes | | |
| ST-XX | | Yes | | |
| ... | ... | ... | ... | ... |

$\{\Delta T\_min\_j\} = \{8, 12, 12, 8, 8, 8\} K$

THERE ARE 5 VALID COMBINATIONS FOR THIS PROCESS.

| # | Combination | Qh | Qc |
|---|---|---|---|
| 1 | AtCh A, AtCh B, AtCh C | 460.0 | 2610.0 |
| 2 | AtCh A, AtCh B | 2150.0 | 4300.0 |
| 3 | AtCh A, AtCh B, AtCh C | 710.0 | 2860.0 |
| 4 | AtCh A, AtCh B, AtCh C | 1900.0 | 4050.0 |
| 5 | AtCh B, AtCh C | 2150.0 | 4300.0 |

FIG. 22.

Combination: *Area A, Area B*
*Area A, Area B*

| # | Areas | Qh | Qc |
|---|---|---|---|
| 1 | Area A | 2150.0 | 300.0 |
| 2 | Area B | 0 | 4000.0 |
| Tot | --- | 2150.0 | 4300.0 |

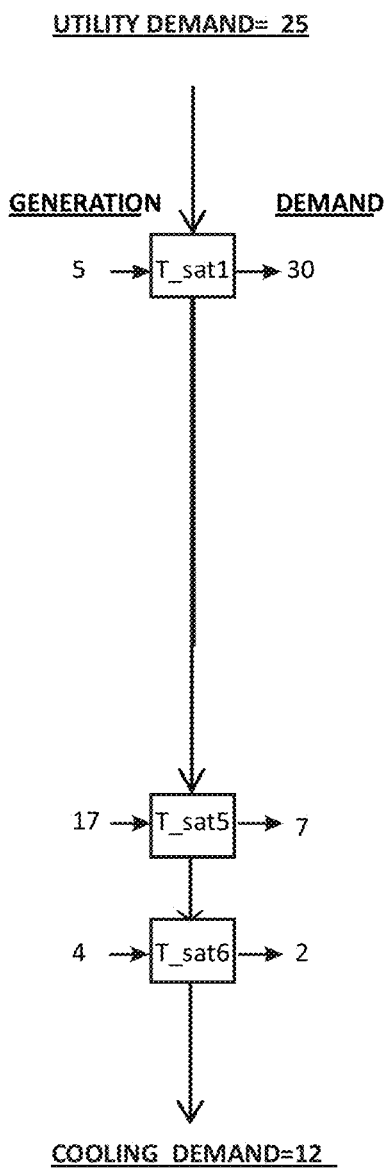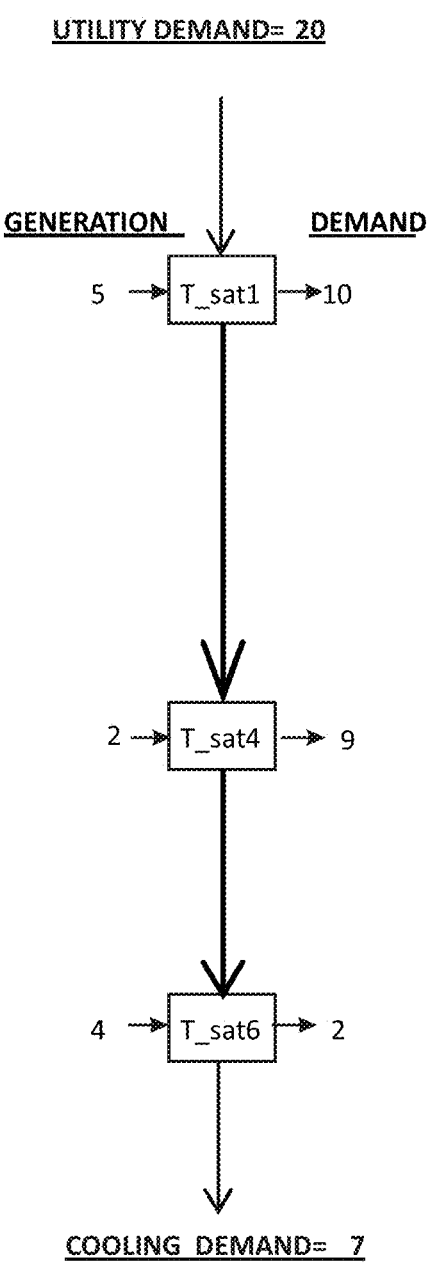

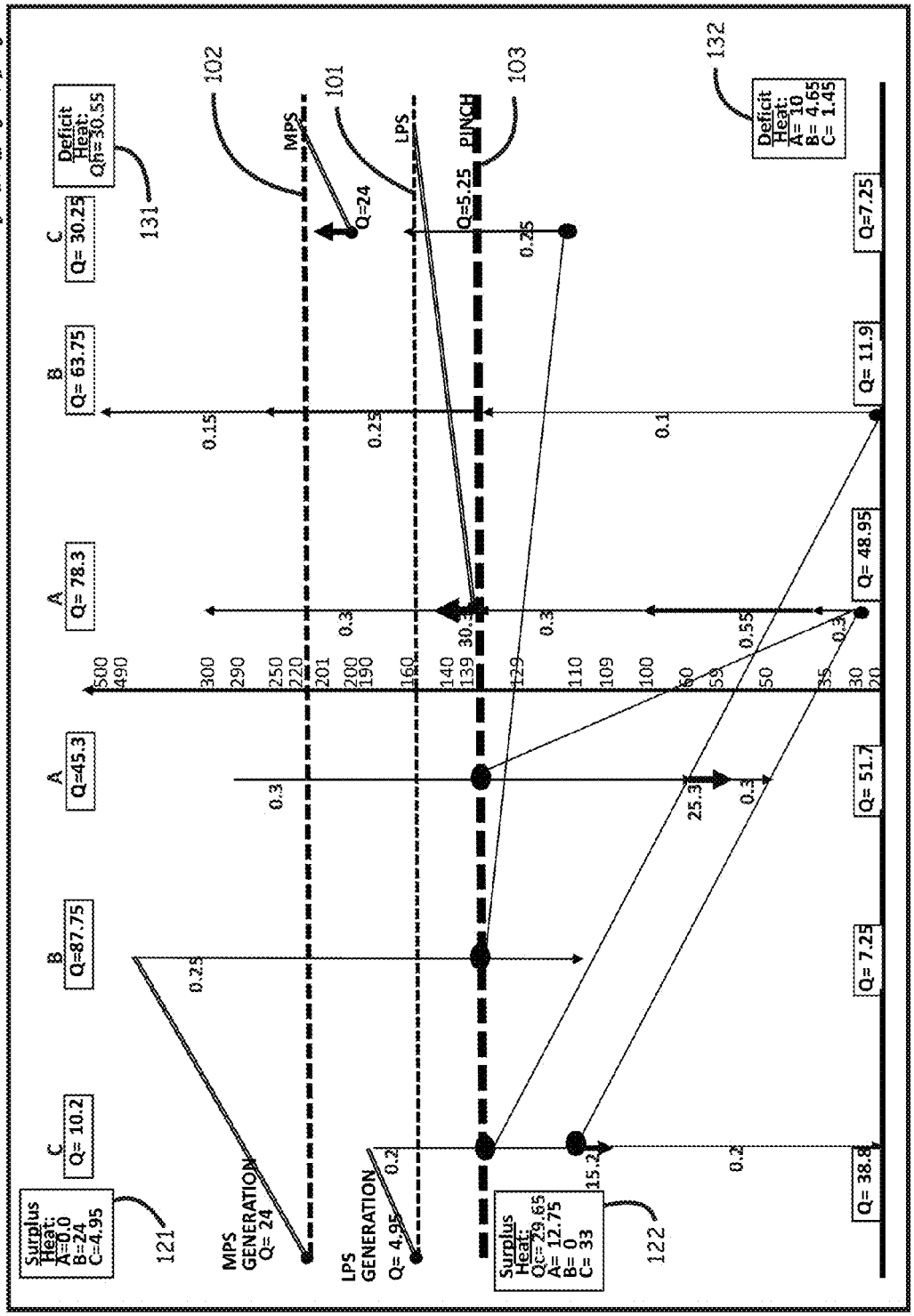

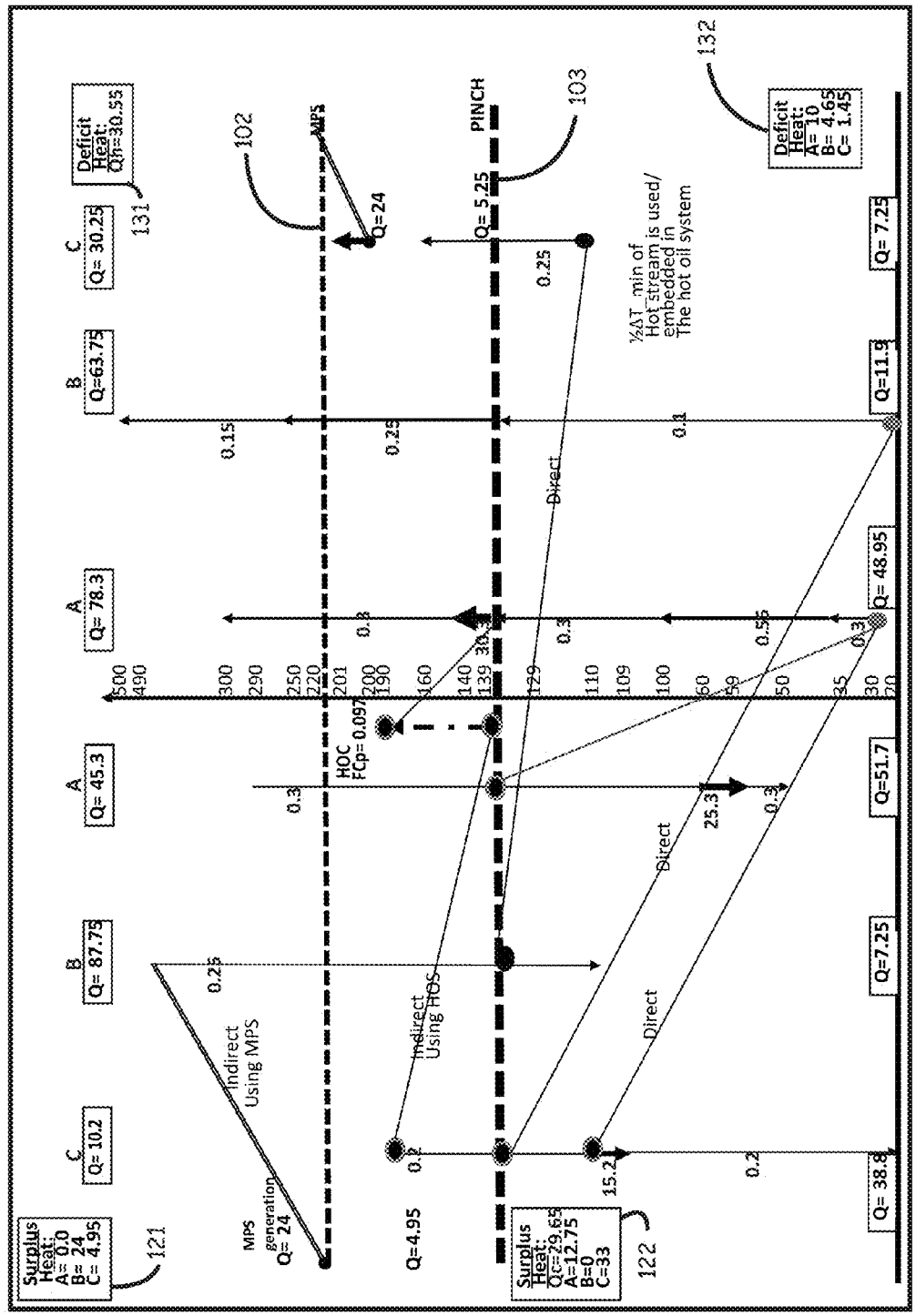

METHODS FOR ENHANCED ENERGY EFFICIENCY VIA SYSTEMATIC HYBRID INTER-PROCESSES INTEGRATION

RELATED APPLICATIONS

This application is collectively a continuation-in-part of and claims priority to and the benefit of U.S. patent application Ser. No. 12/767,315, now U.S. Pat. No. 8,417,486, filed Apr. 26, 2010, titled "System, Method, and Program Product For Synthesizing Heat Exchanger Network and Identifying Optimal Topology For Future Retrofit," which claims priority to U.S. Provisional Patent Application No. 61/256,754, filed Oct. 30, 2009, titled "System, Method, and Program Product for Synthesizing Non-Constrained and Constrained Heat Exchanger Networks and Identifying Optimal Topology for Future Retrofit"; U.S. patent application Ser. No. 13/757,467, filed on Feb. 1, 2013, titled "Methods For Simultaneous Process and Utility Systems Synthesis in Partially and Fully Decentralized Environments; and U.S. patent application Ser. No. 13/757,491, filed on Feb. 1, 2013, titled "Systems and Computer Programs For Simultaneous Processing Utility Systems Synthesis in Partially and Fully Decentralized Environments; and U.S. patent application Ser. No. 12/480,415, filed on Jun. 8, 2009, titled "System, Program Product, and Related Methods For Global Targeting of Process Utilities Under Varying Conditions," each incorporated herein by reference in its entirety. See Appendix 1 for a list of related applications.

BACKGROUND OF THE INVENTION

1. Field of the Invention

This invention relates to generally energy management through heat recovery, and more particularly to systems, computer readable media, program code, and methods for providing enhanced energy management of mega industrial sites through energy recovery systems.

2. Description of the Related Art

The economics of industrial production, the limitations of global energy supply, and the realities of environmental conservation are an enduring concern for all industries. The majority in the world scientific communities believe that, the world's environment has been negatively affected by the global warming phenomenon due to the release of greenhouse gases (greenhouse gas) into the atmosphere.

There are three major sources of greenhouse gas: carbon dioxide ($CO_2$), methane ($CH_4$), and nitrous oxide ($N_2O$). The world's $CO_2$ emissions into the air have been increasing drastically over the past century. The industrial revolution and exploitation of natural resources such as coal and oil have greatly contributed to $CO_2$ emissions. From greenhouse gas perspective, energy efficiency optimization is not only a fast track approach to reduce energy cost, but also to reduce energy-based greenhouse gas/$CO_2$ emissions.

For decades, energy efficiency optimization merely addressed the energy efficiency of standalone process equipment. Since late eighties and early nineties, however, the landscape has changed. It is not only energy efficiency for the standalone equipment/unit but also for subsystems, systems, industrial complexes and today/future one mega sites as well as industrial cities through the utilization of heat exchanger network systems.

Heat exchanger network synthesis is a multi-variable multi-dimensional optimization problem in which the total network driving distribution depends on each stream conditions and each hot stream minimum approach temperature for heat recovery. Such variables can contribute to determining the number of units, shells, and both the heating and cooling utilities requirements as well as its mix. Utilizing conventional pinch technology, this multi-variable optimization problem has been reduced to a single variable optimization problem—the optimization of the global minimum approach temperature ($\Delta T\_min$) for each hot process stream of the problem. While such methodology can theoretically be used at any scale, it is still only utilized by others on standalone plants via direct intra-process integration between a plant's hot and cold streams. It is applied at the process level and has proved to be very successful in reducing both energy consumption and energy-based greenhouse gas emissions. Newer systems developed by the assignee of the invention or inventions described herein have provided further optimization through systems designed to develop an optimal set of stream specific minimum approach temperatures ($\Delta T\_min\_i$) and advanced matching techniques.

Since the emanation of the pinch technology and its evolution to pinch analysis technique for process synthesis, direct integration has only been intra-process. Direct inter-processes integration has been considered by industry to be impractical. Arguments against utilization of such integration include arguments that: the processes that would be integrated may have different start up and shut down times; the processes can work at partial loads; the processes can have seasonal changes in its conditions; capital costs of utility systems, heaters and heat exchangers network may not be reduced over that of indirect inter-processes integration due to changes in processes schedule and operation philosophy; the disturbance in one process can propagate to another one if they are integrated, making the process difficult to control; the distance-time/velocity lags affect the controllability of processes; the geographical distances among processes will result in a substantial energy cost in pumping or compression and will require capital costs associated with the piping, pumping and compression; safety might be impacted due to the travel of a fluid from one hazardous area to another; and the fear of leakage and so on, which are very common to plant engineers. Additionally, systematic methods to handle mega sites and industrial zones for inter-processes integration are lacking and conventional mathematical programming models are not capable of handling mega size problems, where many facilities are involved in an industrial zone oversight. Therefore, direct inter-processes integration, while potentially very beneficial to energy conservation and greenhouse gas emissions reduction, is still to date not practiced in the mega industrial sites design and retrofit.

As such, the inventors have recognized the need for systems, computer readable media, program code, and methods that provide for the selection of direct integration among multiple plants/processes located in adjacent geographical locations while still considering indirect inter-processes integration to thereby optimize the waste energy recovery and reduce greenhouse gas.

The current methods for inter-processes integration are indirect, using buffer systems. The buffer systems are either steam system (most of the time) or hot oil system. Both research and industry have access to the pinch modified and mathematical programming methods which adapt the indirect method using steam system. Regarding utilization of steam, early pinch technology work on total site heat integration helped to determine levels of generation of steam to indirectly integrate different processes. Some researchers, however, have argued against using steam under certain scenarios because the generation of steam has to be accomplished at a fixed temperature levels, which may result in missed opportunities for integration, steam produced in most chemical complexes is also used to generate power, and that driving equipment and heating the steam to exactly match with process heating needs is almost impossible, and as such, usually result in venting and/or huge air cooling utilization. Further, it is not optimal to put waste heat boilers in the process plant to recover waste heat from one end and ignore the path of this steam in the whole facility, block or industrial zone and its end point. Additionally, in many hydrocarbon processing facilities, medium and/or high pressure steam generation or utilization not recommended for utilization in heating cold process streams, because of the fear of leakage to the hydrocarbon side and corrosion, and hence, is typically considered a forbidden match. Accordingly, some researchers have argued against steam utilization as a buffer in favor of hot oil system utilization.

Regarding utilization of hot oil, both research and industry also has access to the pinch modified and mathematical programming methods which adopt the indirect method using hot oil system. The researchers that favor hot oil over steam, however, have failed to mention that, in addition to the large number of hot oil circuits normally required to achieve the desired energy saving targets, the low heat transfer coefficient of the hot oil fluids result in heat exchangers requiring excessively large surface areas, more units needing to be added, and a larger number of start-up heaters and/or air coolers required per circuit, among others.

As such, neither sets of researchers, those favoring steam nor those favoring hot oil, advocate analysis or utilization of both hot oil and steam systems to provide indirect inter-processes integration. Accordingly, recognized by the inventors is the lack of a methodology that systematically identifies when the hot oil system, the steam system, or both provide the preferred solution on either the thermodynamic or economic basis. Additionally, recognized by the inventors is that no current method adopts both direct and indirect inter-processes integration methods; no conventional method adopts the direct inter-processes integration method for mega size problems such as integrated refining, petrochemical and chemical industrial zones; and correspondingly, no conventional method adopts both direct and indirect methods using both hot oil and steam systems. Additionally, it is recognized by the inventors that no conventional method considers the wider direct integration outside the industrial part of the complex with the community/housing part.

In summary, while the industrial community appears to agree that the direct integration approach in inter-processes integration (e.g., between several plants) may be more efficient and may render more saving in energy consumption and energy-based greenhouse gas emissions, it is not practiced, and prior to the designed processes of embodiments of the invention or inventions described herein, no systematic method to synthesis systems which exhibit such capability for mega industrial complexes exist. As such, the industry has a long felt, unsatisfied need for systems, computer readable media, program code, and methods to allow a user to synthesize energy recovery systems through utilization of direct and/or indirect inter-processes integration utilizing steam and/or hot oil systems, depending upon whether a decision-maker's focus is on thermodynamic or economic efficiency, or a balance between the choices.

SUMMARY OF THE INVENTION

In view of the foregoing, various embodiments of the present invention advantageously provide systems, computer readable media, program code, and methods for systematically providing enhanced energy efficiency of mega industrial sites and synergy with the adjacent community through advanced hybrid inter-systems energy integration targeting and solutions generation to achieve desired best levels of energy consumption and greenhouse gas emissions reduction. Various embodiments of the present invention advantageously provide for identifying all combinations of hybrid direct and indirect inter-processes energy integration targets; selecting best energy efficient ones, generating multiple technically viable energy efficient industrial site synthesis alternatives, and identifying best generation and allocation of energy utilities. This can include: inter-systems integration using direct and indirect as well as hybrid methods, and defining best and second best couplings of zones, blocks, facilities, plants, processes, units and streams for best energy consumption and greenhouse gas emissions reduction for any number of adjacent industrial facilities synthesis or retrofit through analysis of all possible combinations of processes-specific design modifications and smart matching.

Various embodiments of the present invention advantageously provide systems, computer readable media, program code, and methods which create new opportunities for energy consumption and greenhouse gas emissions reduction beyond that possible to date. This can be accomplished through employment of hybrid inter-systems energy integration techniques that advantageously can overcome the problems of current intra-system energy integration constraints, such as partial and full forbidden-matching, $\Delta T\_min$ reduction saturation, and the problems of employment of only indirect inter-system energy integration techniques that utilize only steam or only hot oil systems, which can significantly negatively impact the possibility of enhancing waste energy recovery. Advantageously, such techniques according to various embodiments can utilize, simultaneously, all possible intra-processes structures and parameters conditions' changes, stream specific minimum temperature approach ($\Delta T\_min$), direct and indirect inter-systems integration, hot-to-hot process-to-process matching, cold-to-cold unit process-to-process matching, and process identities switching (e.g., hybrid techniques), while considering future retrofit for more energy conservation to reach best energy and greenhouse gas emissions targets. The techniques can advantageously also provide for systematically identifying when direct integration is best utilized and/or is the only option to reach the best energy and greenhouse gas emissions reductions' targets, and when indirect integration alone can be used to reach best energy and greenhouse gas emissions reduction targets, and can provide for identifying when indirect integration using a steam system is better than that of a hot oil system and for synthesis of best central multi-generation utilities system that is in best in total annualized cost and exhibit synergy with the mega industrial-community.

More specifically, an example of an embodiment of a computer-assisted method of providing enhanced energy efficiency and reduced greenhouse gas emissions for a mega industrial site, includes the steps of analyzing a plurality of possible inter-processes energy integration combinations between a plurality of functional areas of a mega industrial site, determining when direct inter-processes energy integration, indirect inter-processes energy integration, or hybrid inter-processes energy integration provides for a greater total energy recovery for the mega industrial site, and identifying the possible inter-processes energy integration combination providing for an optimal solution for total waste heat recovery between the respective functional areas to define an optimal inter-processes energy integration combination. The plurality of functional areas can include one or more of the following:

a plurality of zones, a plurality of blocks, a plurality of facilities, a plurality of plants, and a plurality of units of the mega industrial site. Each of these functional areas include a plurality of resource streams which can be collectively represented as a single functional area-specific stream. The inter-process energy integration combinations being analyzed include those using direct inter-processes energy integration, indirect inter-processes energy integration, and hybrid inter-processes energy integration.

The method can also include, either separately or as part of the analyzing or determining steps, the steps of determining when one or more water or steam buffers provides a greatest energy recovery for indirect inter-processes energy integration over a corresponding one or more hot oil circuits, and determining when one or more hot oil circuits provides a greatest energy recovery for indirect inter-processes energy integration over a corresponding one or more water or steam buffers. The steps can also or alternatively include determining when a combination of both water or steam buffers and one or more hot oil circuits provides the greatest energy recovery for indirect inter-processes energy integration, and determining when a combination of water buffers, steam buffers, and one or more hot oil circuits provides the greatest energy recovery (thermodynamic efficiency) for indirect inter-processes energy integration. The steps can also or alternatively include determining when indirect integration using steam system alone is better than that of hot oil system to reach desired energy and greenhouse gas emissions reduction targets, and determining when indirect integration using hot oil system alone is better than that of steam system to reach desired energy and greenhouse gas emissions reduction targets.

The steps can also or alternatively include identifying when indirect inter-processes energy integration using a buffer is not to be used or recommended, and instead, a resource stream of the plurality of resource streams of a unit, plant, facility, block, or zone is better used as an energy-ambassador to reach desired energy or greenhouse gas emissions targets, and identifying when indirect inter-processes energy integration using a buffer is not to be used or recommended, and instead, hot-to-hot streams matching, cold-to-cold streams matching, streams identities switching techniques, or a combination thereof across a plurality of units, plants, facilities, blocks, or zones should be used to reach desired energy or greenhouse gas emissions targets. The steps can also or alternatively include determining when direct inter-processes integration is the only option to reach desired energy and greenhouse gas emissions reduction targets, and determining when indirect integration alone can be used to reach the desired energy and greenhouse gas emissions reduction targets. The steps can also or alternatively include identifying a minimum number of direct inter-process energy integration connections that render an optimal impact on waste heat recovery before resorting to indirect inter-processes energy integration, and generating an industrial site inter-processes heat exchange system design having an inter-processes connection and matching scheme providing a balance between most efficient waste heat recovery and capital cost allocation.

The steps can also or alternatively include generating a plurality of technically viable energy efficient industrial site inter-processes heat exchange system design alternatives, identifying the industrial site inter-process heat exchange system design having an inter-processes connection and matching scheme providing a balance between most efficient waste heat recovery and capital cost allocation, and identifying a plurality of additional inter-processes heat exchange system design having a substantially overlapping structure and designed to provide optimal future retrofit solutions responsive to forecasted operational and capital considerations.

The step of determining when direct inter-processes energy integration, indirect inter-processes energy integration, or hybrid inter-processes energy integration provides for a greater energy recovery, can include the step of arbitrating between direct and indirect inter-processes energy integration solutions in view of one or more non-thermodynamic constraints. The steps can also or alternatively include producing and synthesizing an acceptable inter-processes heat exchange system design providing the optimal solution for total waste heat recovery and a second-best solution based upon present operational and capital considerations, and to produce and synthesize a plurality of additional solutions having a substantially overlapping structure designed to provide optimal future retrofit solutions responsive to forecasted operational and capital considerations. The steps can also or alternatively include defining best and second best heat exchange couplings between the plurality of functional areas for optimal energy consumption and greenhouse gas emissions reduction responsive to an analysis of a substantial plurality of possible combinations of significant processes-specific design modifications and smart matching schemes.

The steps can also or alternatively include identifying one or more functional area process streams that primarily control a pinch point location for the energy utility system for the mega industrial site, determining an optimal pinch point location that provides a maximum waste energy recovery and a minimum greenhouse gas emissions for the energy utility system, and adjusting supply temperature of the one or more functional area process streams that primarily control the pinch point location to obtain a desired inter-processes energy integration energy consumption target. The steps can also or alternatively include identifying a zone, block, plant, or facility that primarily control a pinch point location for the energy utility system for the mega industrial site. The steps can also or alternatively include identifying one or more functional area process streams that primarily control a pinch point location for the energy utility system for the mega industrial site, accounting for substantially all probable significant intra-processes structures' and parameters' conditions changes, and determining an optimal pinch point location for future retrofit responsive to the identification of the one or more functional area process streams that primarily control the pinch point location and responsive to forecasted operational and capital considerations.

Another embodiment of a computer-assisted method of providing enhanced energy efficiency and reduced greenhouse gas emissions for a mega industrial site, includes the steps of identifying a plurality of possible inter-processes integration energy consumption targets for a plurality of possible inter-processes energy integration combinations between a plurality of functional areas of a mega industrial site. The plurality of functional areas include a plurality of zones, a plurality of blocks, a plurality of facilities, a plurality of plants, and/or a plurality of units of the mega industrial site, each including a plurality of resource streams. The method can also include identifying the combination of the plurality of possible inter-processes energy integration combinations providing for an optimal solution for total waste heat recovery between the respective functional areas responsive to user selection of an energy efficient inter-processes integration energy consumption target, and determining a technically viable industrial site inter-processes heat exchange system design substantially providing for the optimal total waste heat recovery between the respective functional areas.

The method can also include, either separately or as part of the identifying or determining steps, the steps of generating a plurality of technically viable energy efficient industrial site inter-processes heat exchange system design alternatives, and identifying the industrial site inter-process heat exchange system design having an inter-processes connection and matching scheme providing a balance between most efficient waste heat recovery and capital cost allocation. The steps can also or alternatively include identifying a plurality of additional inter-processes heat exchange system design having a substantially overlapping structure and designed to provide optimal future retrofit solutions responsive to forecasted operational and capital considerations.

Another embodiment of a computer-assisted method of providing enhanced energy efficiency and reduced greenhouse gas emissions for a mega industrial site, includes the steps of identifying a plurality of possible inter-processes integration energy consumption targets for a plurality of possible inter-processes energy integration combinations between a plurality of functional areas of a mega industrial site, selecting an energy-efficient one of the plurality of possible inter-processes integration energy consumption targets, identifying the combination of the plurality of possible inter-processes energy integration combinations providing for the energy efficient one of the plurality of possible inter-processes integration energy consumption targets, generating a plurality of technically viable industrial site inter-processes heat exchange system design alternatives, and identifying the technically viable industrial site inter-processes heat exchange system design substantially providing for optimal total waste heat recovery between the respective functional areas. The method can also or alternatively include the step of identifying a plurality of additional inter-processes heat exchange system design having a substantially overlapping structure and designed to provide optimal future retrofit solutions responsive to a time series of forecasted operational and capital considerations, among others.

Another embodiment of the present invention provides a computer readable medium containing or otherwise embodying program code comprising instructions, that when executed by one or more processors, typically embodied in a computer, cause the one or more processors to perform any or all of the computer executable steps of the computer-assisted methods, described above.

Another embodiment of the present invention provides a system for providing enhanced energy efficiency and reduced greenhouse gas emissions for a mega industrial site. The system can include an inter-processes energy integration analysis and design computer having a processor and memory in communication with the processor, and an inter-processes energy integration analysis and design program stored in the memory of the inter-processes energy integration analysis and design computer to target for enhanced energy efficiency for a mega industrial site through direct, indirect, and hybrid inter-processes energy integration. The program can include instructions that when executed by the inter-processes energy integration analysis and design computer cause the computer to perform the computer executable steps of the computer-assisted methods, described above.

Various embodiments of the present invention advantageously include systems, program code, and methods that identify opportunities for direct inter-processes integration among its zones, blocks, facilities, plants, processes, units, streams in adjacent geographical locations for waste energy recovery problem, that identify when a mix of direct and indirect inter-processes integration provides the optimal solution, and/or that identify when indirect inter-processes integration provides a better solution than direct inter-processes integration, and vice versa. Various embodiments advantageously include systems, program code, and methods that employ indirect inter-processes using a combination of water, steam, and/or hot oil systems; that identify when either oil or steam is recommended over the other on a thermodynamic basis and/or economic basis; and/or that systematically examines each of the four options (direct/indirect and steam/oil) individually and in combination to find the best combination out of the available solutions.

Various embodiments advantageously include systems, program code, and methods that have the means to analyze inter-processes integration outside industrial part of complex (i.e., with community/housing); that can find the best zone matching, best block matching, best facility matching, and best stream matching through direct and/or indirect matching; and that consider energy "quality" using an entropy balancer calculation, not just quantity. Various embodiments advantageously include systems, program code, and methods that can identify and graphically display the problem wide pinch point(s) and identify the zone, block, facility, process unit, and stream(s) controlling the pinch point location(s). Various embodiments advantageously include systems, program code, and methods that can identify and graphically display the direct number of matches/connections among zones or blocks or facilities or processes, and the least number of direct inter-processes integration connections which render the best impact on waste heat recovery before resorting to indirect process integration methods using steam, oil, or tempered hot water systems.

Various embodiments advantageously include systems, program code, and methods that can rank order first, second, third best direct inter-processes integration arrangements for direct processes, plants, and zones integration for user selection, that can identify when direct integration is the only option to reach a desired energy and greenhouse gas emission reduction target, that can identify when indirect integration alone can be used to reach the desired energy and greenhouse gas emission reduction targets, and they can identify when indirect integration using steam system alone is better than hot oil system to reach targets.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 5 is a schematic diagram of a graphical user interface including input fields for inputting the facility type, description, area description, and water usage according to an embodiment of the present invention.

FIG. 6 is a schematic diagram of a graphical user interface input fields for inputting building information to include cooling, electricity usage, and heating requirements according to an embodiment of the present invention.

FIG. 7 is a schematic diagram of a graphical user interface including input fields for inserting process steam demand intervals for each "type" of header according to an embodiment of the present invention.

FIG. 8 is a schematic diagram of a graphical user interface including input fields for inputting process steam generation intervals according to an embodiment of the present invention.

FIG. 9 is a schematic diagram of a graphical user interface including input fields for inputting electric power demand intervals according to an embodiment of the present invention.

FIG. 10 is a schematic diagram of a graphical user interface including input fields for inputting available fuel and operating cost according to an embodiment of the present invention.

FIG. 11 is a schematic diagram of a graphical user interface including input fields for inputting power export intervals according to an embodiment of the present invention.

FIG. 12 is a schematic diagram of a graphical user interface including input fields for inputting equipment minimum and maximum capacity or desired operating range intervals according to an embodiment of the present invention.

FIG. 13 is a schematic diagram of a graphical user interface display of the number of headers based on pressure levels according to an embodiment the present invention.

FIG. 14 is a schematic diagram of a graphical user interface including input fields for entering data for steam turbines and motors according to an embodiment of the present invention.

FIG. 15 is a schematic diagram of a graphical user interface illustrating simultaneous in-process $\Delta T\_min$ selections for enhancing inter-processes energy integration according to an embodiment of the present invention.

FIG. 16 is a schematic diagram of a graphical user interface illustrating simultaneous in-process $\Delta T\_min$ selections for enhancing inter-processes energy integration according to an embodiment of the present invention.

FIG. 18 is a schematic diagram of a graphical user interface illustrating determining optimal process changes for minimum cooling utility via inter-processes integration according to an embodiment of the present invention.

FIG. 19 is a schematic diagram of a graphical user interface illustrating determining optimal process changes for minimum heating utility via inter-processes integration according to an embodiment of the present invention.

FIG. 20 is a schematic diagram of a graphical user interface illustrating identification of process changes for balanced heating and cooling utilities for a mega-problem via inter-processes integration according to an embodiment of the present invention.

FIG. 21 is a schematic diagram of a graphical user interface illustrating the framework for analyzing direct inter-system integration for a desired direct integration combination according to an embodiment of the present invention.

FIG. 22 is a schematic diagram of a graphical user interface illustrating an example directed to calculation of the minimum hot utility consumption Qh and the minimum cooling utility Qc for a second possible combination of integration shown in FIG. 21 according to an embodiment of the present invention.

FIGS. 27-31 are schematic block flow diagrams illustrating an energy consumption comparison between conventional three header systems and those having additional steam headers according to an embodiment of the present invention.

FIG. 49 is a schematic diagram of a graphical user interface illustrating inter-processes integration using medium and low-pressure steam according to an embodiment of the present invention.

FIG. 50 is a schematic diagram of a graphical user interface illustrating inter-processes integration using medium-pressure steam according to an embodiment of the present invention.

DETAILED DESCRIPTION

Figure 1:
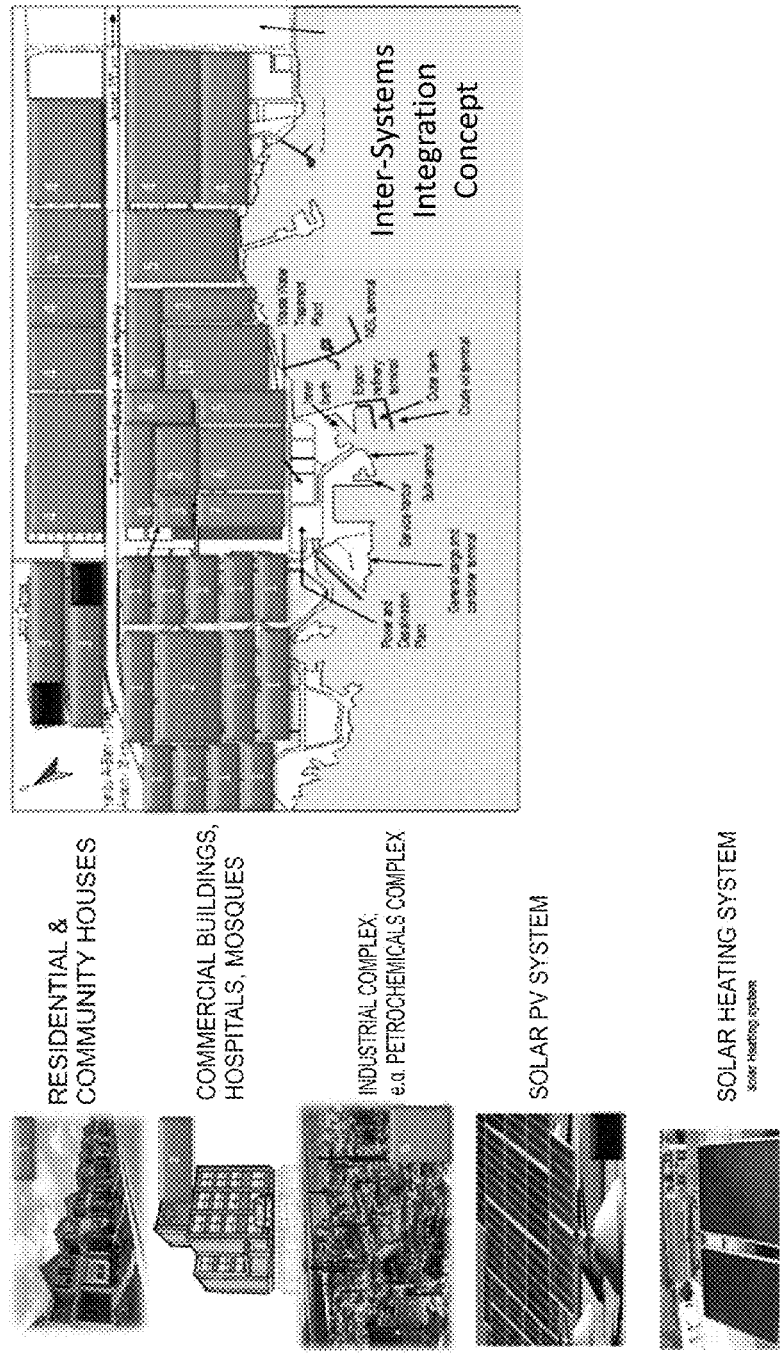
FIG. 1 is a schematic diagram of an industry-community site targeted for inter-systems energy integration according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

TERMS

The following terms may be used throughout:
FCp: Heat capacity flowrate of a hot or cold stream
[FCp1h]: Interval Heat capacity flowrate of hot stream #1
[FCp1c]: Interval Heat capacity flowrate of cold stream #1
MM Btu/h.° F.: Million British thermal units per hour. Degree
Qc: Cooling duty required
Qh: Heating duty required
[Qc]: Interval cooling duty required
[Qh]: Interval heating duty required
kW: Kilo watts
kW/° K: Kilo watts per degree Kelvin
$\Delta T\_min$: Minimum approach temperature
HEN: Heat exchanger network
hi: Stream heat transfer coefficient
U: Overall heat transfer coefficient
A: Heat exchanger surface area
h: Hot stream
c: Cold stream
$\Delta S\_P\_i$: Entropy Production of process i in a Defined Boundary
$\Delta S\_P\_all$: Entropy Production of all-together System in a Defined Boundary
X: $\{\Sigma S\_feed - \Sigma S\_product\}$ for all-together Processes
xi: $\{\Sigma S\_feed - \Sigma S\_product\}$ for Process i
TDD: Temperature-Duty Diagram
CCL: Cold Composite Line
HCL: Hot Composite Line
HPS: High Pressure Steam
MPS: Medium Pressure Steam
LPS: Low Pressure Steam
Zone: Collection of Industrial Blocks
Block: Collection of Facilities
Facility: Collection of Plants
Plant: Collection of Processes
Process: Collection of Units
Unit: Collection of Equipment/Streams
Community: Utility consumer other than Industry consumers Various embodiments of the present invention also advantageously provide the decision-maker systematic methodologies/tools which enable him/her to first target for direct and indirect load for integration without leaving anything on the table and generating as many as technically viable options/alternatives/solutions to attain the desired/acceptable level of energy consumption-waste heat recovery. These tools can include methods, program code, and systems which create new opportunities to energy consumption and greenhouse gas emissions reduction beyond possible to date via novel hybrid inter-systems energy integration techniques that advantageously can overcome the problems of current intra-system energy integration constraints, such as partial and full forbidden matching, $\Delta T\_min$ reduction saturation and using only indirect inter-system energy integration techniques (e.g., steam and/or only hot oil systems) which negatively impact the possibility of enhancing waste energy recovery. Advantageously, such techniques can utilize, simultaneously, all possible intra-processes structures and parameters conditions' changes, stream specific minimum temperature approach ($\Delta T\_min$); direct and indirect inter-systems integration, hot-to-hot process to process matching; cold-to-cold unit process to process matching, and process identities switching (e.g., hybrid techniques), while considering future retrofit for more energy conservation to reach best energy and greenhouse gas emissions targets. The techniques can provide for direct inter-processes integration to provide better energy consumption cost reduction and less energy-based greenhouse gas emissions, addressed in a new cost-effective way to enable wider adaptation of direct inter-processes integration in existing industrial facilities and naturally for mega facilities, zones and even cities. Direct integration among multiple plants/processes located in adjacent geographical locations, can advantageously provide additional degrees of freedom to optimize the waste energy recovery problem and consequently presents new horizon to the energy-based greenhouse gas emissions reduction to levels never thought of before. The techniques can advantageously also provide for systematically identifying when direct integration is best utilized and/or is the only option to reach the best energy and greenhouse gas emissions reductions' targets, and when indirect integration alone can be used to reach best energy and greenhouse gas emissions reduction targets, and can provide for identifying when indirect integration using steam system is better than that of hot oil system and for synthesis of best central multi-generation utilities system that is in best in total annualized cost and exhibit synergy with the mega industrial-community.

System Structure

An industrial city or site typically contains a number of zones. Each zone contains blocks, e.g., east, west, north and south. Each block contains a number of facilities, e.g., oil refinery; plastics complex, pulp & paper, etc. Each facility (e.g., an oil refinery) contains a number of plants, e.g., a hydrocracking plant, naphtha hydrotreating plant (NHT), crude distillation plant, etc. Each plant (e.g., an NHT plant) contains a number of units, e.g., a stripping unit, naphtha splitting unit, reaction unit, etc. Each unit contains a number of hot streams that need to be cooled and cold streams that need to be heated, e.g., feed stream to the naphtha splitter, bottom product stream, top product stream, feed stream to reboiler, feed stream to condenser, etc. In a mega industrial city or site having 25 plants, for example, there are up to $4.6386 \times 10^{18}$ combinations of potential inter-plant system integration connections which can be, e.g., direct, indirect, and no integration. Various exemplary system options according to the plurality of exemplary embodiments of the present invention are described below.

FIG. 1 illustrates a mega industrial site including residential and community houses labeled as 1, commercial buildings, hospitals, churches, mosques, etc. labeled as 2, and industrial plants labeled as 3, 4, 5, 6, 7, 8, 9, and 10.

Figure 2:
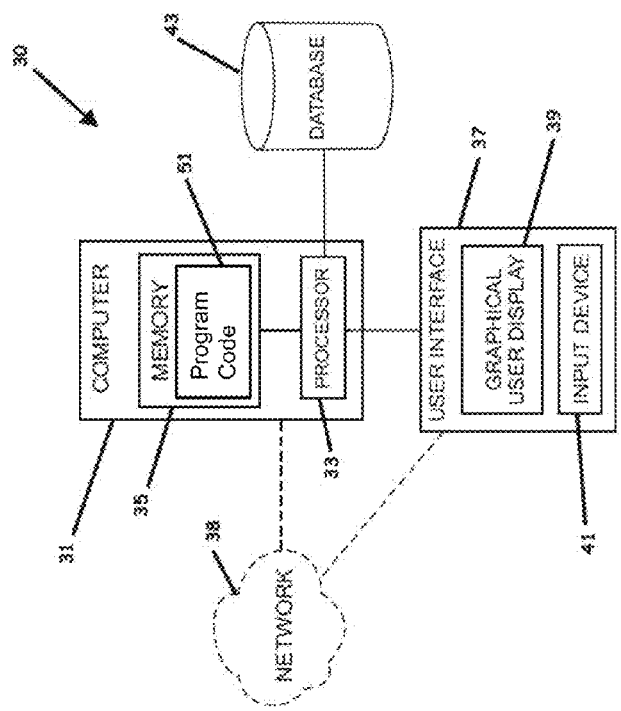
FIG. 2 is a schematic block diagram of a system to target for enhanced energy efficiency for a mega industrial site according to an embodiment of the present invention.

FIG. 2 illustrates a system 30 to target for enhanced energy efficiency for a mega industrial site through direct, indirect, and hybrid inter-processes integration (i.e., a combination of direct inter-processes integration, indirect inter-processes integration, or no intra-process integration) to provide best and second best couplings of zones, blocks, facilities, plants, processes, units and streams for best energy consumption and greenhouse gas emissions reduction for all possible combinations of processes-specific design modifications and smart matching. The system 30 can include an inter-processes integration analysis and design computer 31 having a processor 33, memory 35 coupled to the processor 33 to store software and database records therein, and a user interface 37 which can include a graphical display 39 for displaying graphical images, and a user input device 41 as known to those skilled in the art, to provide a user access to manipulate the software and database records. Note, the computer 31 can be in the form of a personal computer or in the form of a server or server farm serving multiple user interfaces 37 or other configuration known to those skilled in the art. Accordingly, the user interface 37 can be either directly connected to the computer 31 or through a network 38 as known to those skilled in the art.

The system 30 can also include one or more databases 43 stored in the memory 35 (internal or external) of inter- and intra-process integration analysis and design computer 31 and having various forms of mega site data to include: a plurality of sets of values each separately defining operational attributes for each of a plurality of hot process streams and a plurality of cold process streams. Such attributes can include, for example, a value for supply temperature (Ts) of each of the hot process streams and each of the cold process streams, a value for a target temperature (Tt) of each of the hot process streams and each of the cold process streams, and/or a value for a heat capacity flow rate (FCp) of each of the hot process streams and each of the cold process streams.

The one or more databases 43 can also include one or more sets of stream-specific minimum temperature approach values between streams ($\Delta T\_min\_i, j, k, l, m$), streams initial types, streams matching constraints, global utility consumption values Qh, Qc, system surplus and deficit values above and below the pinch point, as well as the interval and/or discrete locations of the pinch regions often referred to as a "pinch point," which describe a "region of minimum choice lower and upper temperature boundaries" when in interval form, at least for each pinch point controlling process stream temperature. The one or more databases 43 can also include identification of the streams, processes, units, facilities, plants, and/or zones that control the pinch locations, data linking the pinch points to define a map or maps of the pinch locations according to a progressive change in $\Delta T\_min\_i$ or process conditions, and the minimum number of heat exchanger units required for a network condition at each pinch. The one or more databases 43 can also include such data for one or more hot oil circuits and buffer systems, and can include capital costs of various heat exchangers network and buffer equipment and hot oil circuit equipment for the industrial site.

The one or more databases 43 can further include fuel type/energy source (coal, heavy fuel oil, natural gas, biomass, waste materials, solar etc.), equipment which generate steam (for heating purposes, pumps and compressors driving, heat carrying, cleaning, cooling) and power (for lighting and other applications), steam headers and its range of conditions (pressure or saturation temperature), shaft work network configuration, and the range of values with respect to allocation of steam and power to both process and utility plants usage, and discrete values identified as providing optimal and potentially optimal results, among others as would be understood by those of ordinary skill in the art. The one or more databases 43 can also include the topology of the mega industrial site and final direct and indirect connection points, steam headers, and oil circuits.

The system 30 can also include an inter-process analysis and design program 51 stored in memory 35 of the inter-process analysis and design computer 31 and adapted to provide systematic processes that include various unique phases of analysis and design. The unique phases of analysis and design can beneficially provide a revolutionary solution approach to providing systematic methods/tools which enable the designer to first target for direct and indirect load for integration without leaving anything on the table and generating as many as technically viable options/alternatives/solutions as necessary to attain desired level of energy consumption.

Figure 3:
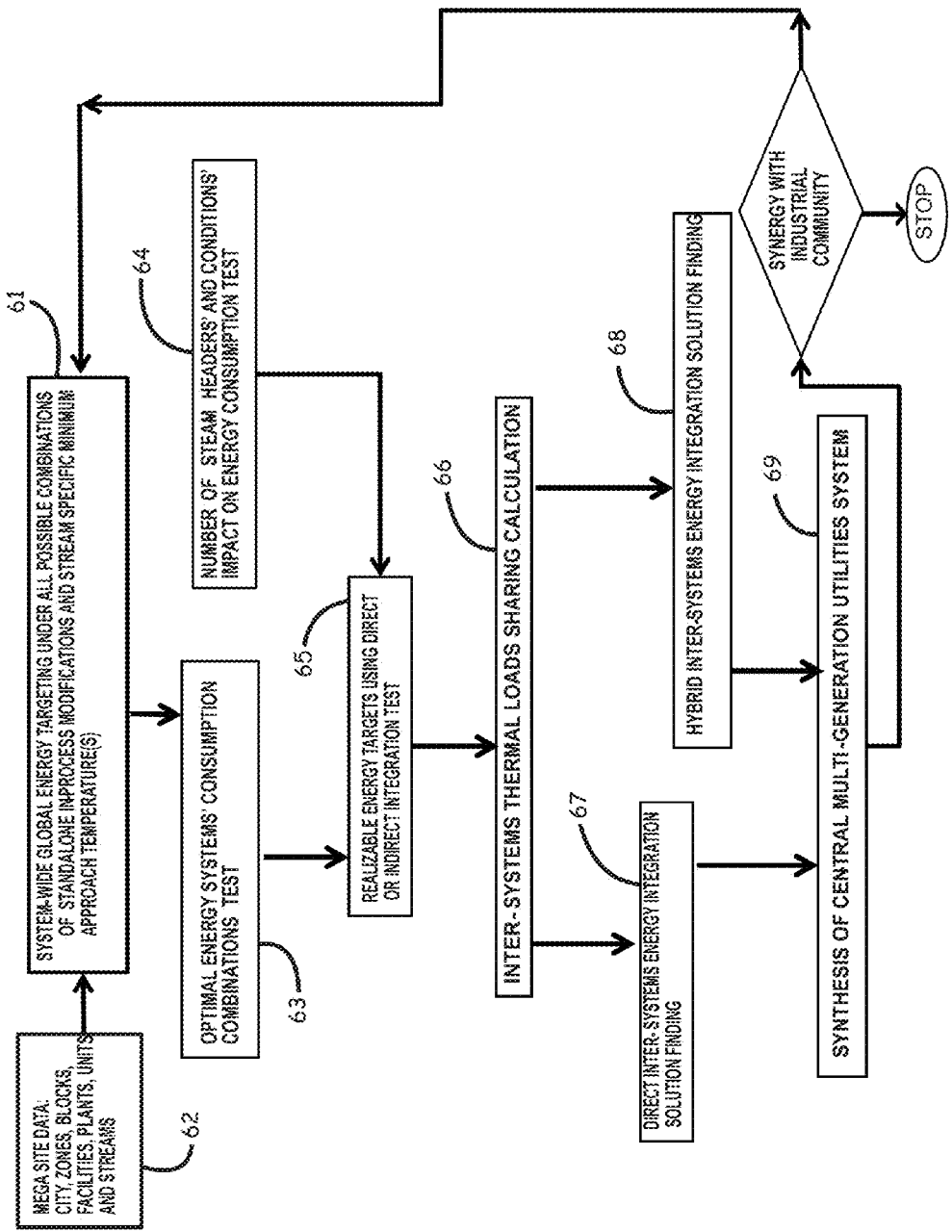
FIG. 3 is a block flow diagram illustrating the interconnection between major processes/program modules according to an embodiment of the present invention.

Referring also to FIG. 3, which illustrates the interconnection between the major processes/program modules according to an exemplary embodiment of the present invention, the program 51 can incorporate one or more combinations of the following processes/program modules to include: processes/program modules 61 which provide system-wide global energy targeting under all possible combinations of standalone in-process modifications and stream-specific minimum approach temperatures. One or more of the processes/program modules 61 receive mega site input data 62 including internal or interface structural connections and operational attributes for adjacent cities, industrial site zones, blocks, facilities, plants, units, and streams. These processes/program modules 61 include, but are not limited to those described in the patents/patent applications listed in Appendix 1. The program 51 can also include: an optimal energy systems consumption combinations test program module 63, a number-of-steam headers' and conditions' impact on energy consumption test program module 64, a realizable energy targets using direct or indirect integration test program module 65, an inter-system thermal loads sharing calculation program module 66, a direct inter-systems energy integration solution finding program module 67, a hybrid inter-systems energy integration solution finding program module 68, and synthesis of central multi-generation utilities system program module 69, which can provide for synergy with the industrial community.

Note, the inter-process analysis and design program 51 can be in the form of microcode, programs, routines, and symbolic languages that provide a specific set for sets of ordered operations that control the functioning of the hardware and direct its operation, as known and understood by those skilled in the art. Note also, the inter-process analysis and design program 51, according to an embodiment of the present invention, need not reside in its entirety in volatile memory, but can be selectively loaded, as necessary, according to various methodologies as known and understood by those skilled in the art.

Methodology Overview

One or more embodiments of the present invention provide systems, computer readable medium, program code, and methods that provide enhanced energy consumption and greenhouse gas emissions reduction, i.e. via smart direct integration among several processes, beyond the best possible using current state-of-art intra-process integration technique, which can be used in conjunction with indirect methods. The approach adopted according to one or more embodiments of the present invention incorporates a hybrid methodology that systematically looks to all options together to find the best combinations out of the available solutions package. These options include direct inter-processes integration, no integration, and indirect inter-processes integration. The indirect inter-processes integration can include use of water, steam, and/or hot oil.

One or more embodiments of the present invention provide systems, computer readable medium, program code, and methods that can be employed to find best zones matching, best blocks matching, best facilities matching, best plant matching, best unit matching, and/or best streams matching in order to optimize or otherwise enhance waste energy recovery and reduce greenhouse gas emissions. The matching can be implemented directly and/or indirectly. When doing so directly, the matching is accomplished via finding best direct matching without any buffers. When doing so indirectly, the matching can be accomplished via using water, steam, hot oil, all of them and so on. The indirect matching can be accomplished via utilization of a zone, a block, a facility, or a stream as a buffer or as an ambassador to take energy from one place and transfer it to another.

Matching of streams can be accomplished, for example, through application of the latest advanced matching techniques depicted in U.S. Pat. No. 7,729,809, titled "System, Method, and Program Product for Targeting and Identification of Optimal Process Variables in Constrained Energy Recovery Systems," U.S. Pat. No. 8,116,920, titled "System, Method, and Program Product for Synthesizing Non-Thermodynamically Constrained Heat Exchanger Networks," U.S. patent application Ser. No. 12/767,315, filed Apr. 26, 2010, titled "System, Method, and Program Product for Synthesizing Heat Exchanger Networks and Identifying Optimal Topology for Future Retrofit," and U.S. Pat. No. 8,032,262, titled "System, Method, and Program Product for Synthesizing Non-Constrained and Constrained Heat Exchanger Networks." The hot and cold process streams can be matched intra-process and inter-process, and/or the hot and cold streams of each zone, block or facility can be consolidated into a single representative process stream and cold process stream and matched homogeneously and/or heterogeneously.

The advanced matching can allow for a zone, a block or a facility or a stream to change its identity from energy supplier to energy receiver and return back to energy supplier or from energy receiver to energy supplier and return back to energy receiver. The advanced matching can also be performed under all possible combinations of reasonably anticipated process changes in each facility, for example, in a way that perfects the matching of the respective facility with other facilities in the same block and/or with other blocks and/or within the same zone and/or with other zones using direct, indirect and hybrid methods of integration.

This can also be accomplished, for example, under a set of stream-specific minimum approach temperatures ($\Delta T\_min\_i, j, k, l, m$) which provide an optimal combination for enhanced energy recovery, where "i" refers to the hot stream number, "j" refers to process number, "k" refers to plant/facility number and "l" refers to block number and "m" refers to the zone number. Alternatively, the stream-specific minimum approach temperatures ($\Delta T\_min\_i, j, k_1, k_2, l, m$) are further identified by the stream location within the plant within the facility, where "$k_1$" refers to the plant number, and "$k_2$" refers to the facility number. U.S. Pat. No. 7,873,443 "System, Method, and Program Product for Targeting and Optimal Driving Force Distribution in Energy Recovery Systems," incorporated herein by reference, describes a methodology of calculating a set of stream-specific minimum approach temperatures for a process. According to this exemplary configuration, for application to a mega industrial city, the algorithm includes additional stream identification to include the process, plant, facility, block, and/or zone number. The targeting module according to the exemplary configuration can define upon the energy targets calculation which stream(s), unit, plant, facility, block and zone controls the pinch location for the whole problem under the current minimum approach temperature and for future ones.

The analysis can beneficially be performed to identify the best possible scenarios for inter-processes integration and the most cost effective solution(s) now and in the future at the targeting phase via "plants' smart matching," without the discouraging solutions which require many inter-connections among plants as sometimes reported in literature. The exemplary configuration provides a systematic methodology/technique to first do the right integration at the highest level and then to do the right integration at the lower levels. The right integration at the highest level includes the identifying of what load to integrate and among what systems to do so, along with the identifying of the possible matches and loads to consider and others to neglect (e.g., small energy values). The right integration at the lower levels includes identifying the optimal method of inter-systems integration, i.e., direct, indirect or hybrid, and if indirect or hybrid, identifying it's medium, i.e., water, steam or hot oil, and performing smart matching or combinations.

The current state-of-art methods rely only on the first law of thermodynamics (accounting for energy) in the energy targeting and in the selection of the best inter-processes energy integration. In some applications relying on the first law of thermodynamics/heat balance calculation alone may be enough to differentiate among best inter-entities integration, but in most cases, considering the energy "quantity," only, is not enough to find the best inter-entities integration scheme (e.g., direct, indirect using steam or hot oil, or all of them), and the second law of thermodynamics calculations will need to be considered. That is, to ensure the right selection of the best inter-entities integration scheme(s), according to the exemplary configuration, the systematic methodology considers energy "quality" using an entropy balancer calculation.

Multi-Phase Approach

Figure 4:
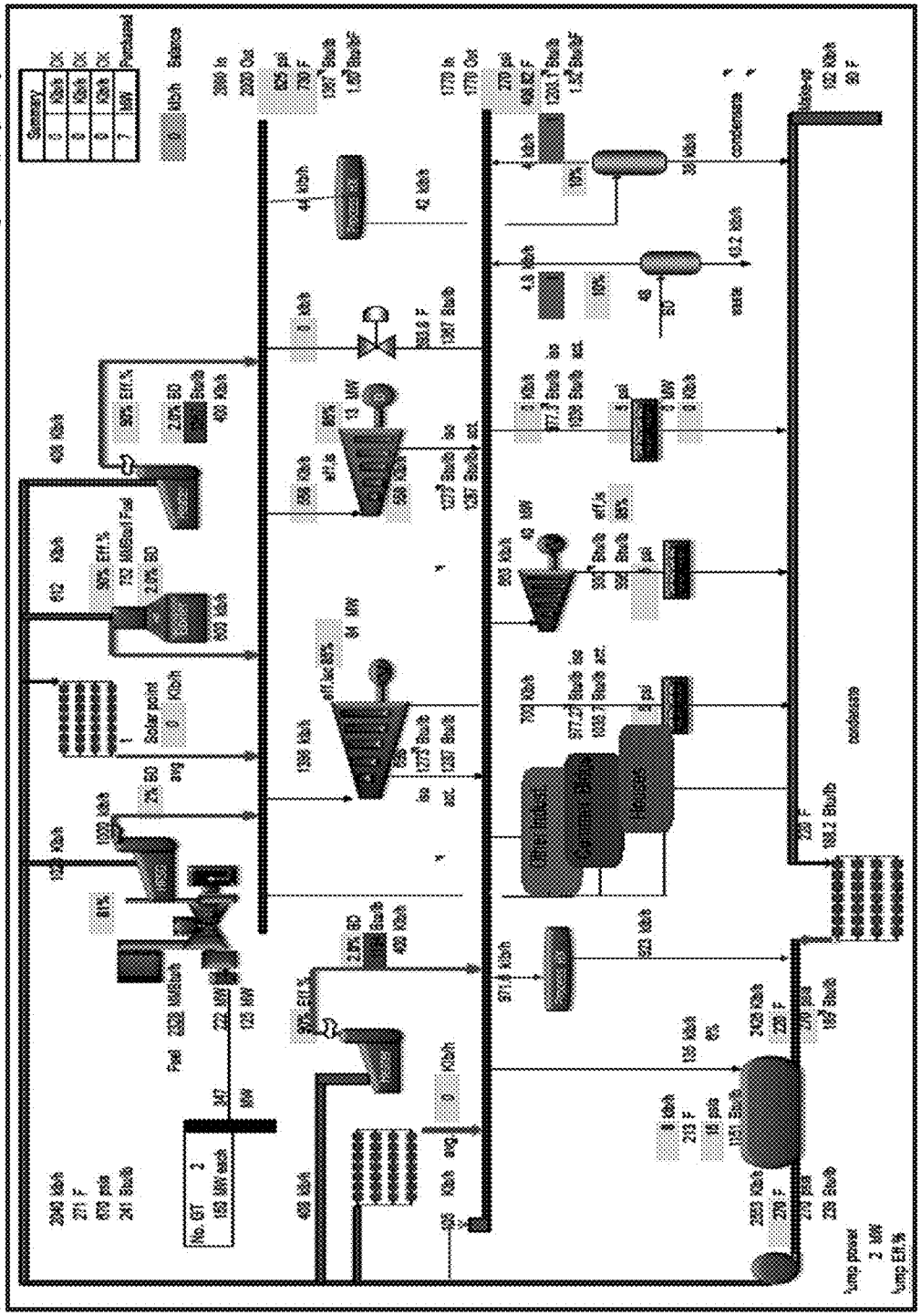
FIG. 4 is a schematic diagram of a central multi-generation utility system in synergy with a mega industrial community according to an embodiment of the present invention.

The various embodiments of the present invention beneficially provide new tools for the mega-problem representation, targeting for inter-processes energy integration and processes/plants matching. FIG. 4 illustrates synthesis of a central multi-generation utilities system in synergy with a mega industrial community. As an example, at least partially shown in the figure is an exemplary combined heat and power modified structure interfaced with other residential housing zones 1, commercial building zones 2, and other industry site zones 3-10.

According to an embodiment, the tools for solving the mega-problem for the industrial site shown, e.g., in FIG. 4 include three phases: (1) a problem-wide representation and lab test phase (see, e.g., FIGS. 5-31), (2) an energy targets identification for direct and indirect inter-processes integration phase (see, e.g., FIGS. 32-37), and (3) a matching method and generation of solution alternatives phase (see, e.g., FIGS. 38-50).

In performing these phases, the following issues are addressed systematically: Inter-zones integration; direct and indirect as well as hybrid integration (i.e., when to use direct, indirect or both); best and second best couplings of zones, facilities, units and streams using direct integration for any number of industrial facilities; targeting and finding solutions; design or retrofit with future retrofit-in-mind; each potentially performed under all possible combinations of process-specific design modifications and advanced matching.

In some continuous processes, the forbidden matches concept is not addressed. For example, with respect to NHT, CCR and HCU plants, as a few examples, the rules only forbid full integration of the whole thermal load between the two matched streams to keep certain thermal and cooling loads for trimming the heater and cooler. As such, these type of matches are considered partially forbidden matches. Various embodiments address this constraint via the wider inter-processes integration described herein to maximize waste heat recovery from hot streams to be cooled.

According to an exemplary configuration, using the composite curves building method, all streams can be represented in one temperature interval graph, problem-wide pinch point(s) can be defined and an optimal pinch temperature can be identified. Additionally, the zone; block, facility, process unit and stream controlling pinch point location can be found. Further, the zone(s); block(s), facility(s), process unit(s), and stream(s) having a high and highest impact on the waste energy recovery problem can be located. Graphical technique can also be used to identify the minimum direct number of matches/connections among zones or blocks or facilities or processes. They can be also used via the all-in-one composite lines, to decide the amounts of indirect heating and indirect cooling duties and its associated temperature levels above and below the problem-wide pinch, as well as the estimated targets for extractable work above the pinch and reducible work below the pinch.

Further, according to the exemplary configuration, a hybrid integration analysis is performed, where the current state-of-art (conventional wisdom) adopts direct or indirect, but not both. Additionally, where the current state-of-art adopting indirect integration adopts steam systems or hot oil systems, but not both together, the exemplary configuration analyzes the problem with either or both systems within its toolbox. Still further, the exemplary configuration addresses the steam-system-based indirect energy integration using a different (larger) number of steam levels and different operating conditions, and is not limited to using just predefined fixed conditions to given steam levels.

Phase I—Problem Wide Representation and Lab Test Phase

The problem-wide representation and lab test phase is described with reference to FIGS. 5-31). The following table provides high-level steps for performing Phase 1, the problem wide representation, and lab tests (A-D):

| | |
|---|---|
| Step 1 | Define the problem's zones, blocks, facilities, plants and processes considered for inter-systems energy integration. |
| Step 2 | Use energy targeting module to find [Qh] and [Qc] under all possible combinations of process-specific modifications and stream-specific ΔT_min in the acceptable user defined range. |
| Step 3 | Locate the problem-wide pinch interval and the pinch-location controlling processes. |
| Step 4 | Decision maker select/identify the desired level of energy target(s) for heating utility, cooling utility or both. |
| Step 5 | Collapse the intervals to locate the problem-wide best/desired pinch, the pinch-location controlling process and the best process changes as well as streams-specific ΔT_min in the acceptable user defined range. |
| Step 6 | Define the user input of absolutely constrained/forbidden zones, facilities, plants, processes and streams from direct matching. |
| Step 7 | Use the new energy targeting module to find best possible matches among the zones, or blocks, or facilities, or plants, or processes. |
| Step 8 | For very large number of processes use the temperature duty diagram to guide through the selection of best matches. |

Step 1 includes defining the problem's zones, blocks, facilities, plants and processes considered for inter-systems energy integration. FIGS. 5-14 illustrate input fields on a graphical user interface of the user display 41. FIG. 5 illustrates input fields for inputting the facility type, description, area description, and water usage. FIG. 6 illustrates input fields for inputting building information to include cooling, electricity usage, and heating requirements. FIG. 7 illustrates input fields for inserting process steam demand intervals for each "type" of header (e.g., high-pressure, medium pressure, low pressure). FIG. 8 illustrates input fields for inputting process steam generation intervals. FIG. 9 illustrates input fields for inputting electric power demand intervals. FIG. 10 illustrates input fields for inputting available fuel and operating cost. FIG. 11 illustrates input fields for inputting power export intervals. FIG. 12 illustrates input fields for inputting equipment minimum and maximum capacity or desired operating range intervals. FIG. 13 displays the number of headers based on pressure levels. FIG. 14 illustrates input fields for entering data for steam turbines and motors.

Phase I, Lab Test A

Steps 2-5 encompass the first lab test, Lab test "A," which provides a system-wide global energy targeting under all possible in-process modifications and stream-specific minimum approach temperatures test. Lab test A can be used for energy targeting using simultaneous integration and system specific design and operation modifications for any number of systems (e.g., facilities, plants) to attain the best theoretical energy efficiency, with and without regard to non-thermodynamic constraints.

Figure 15:
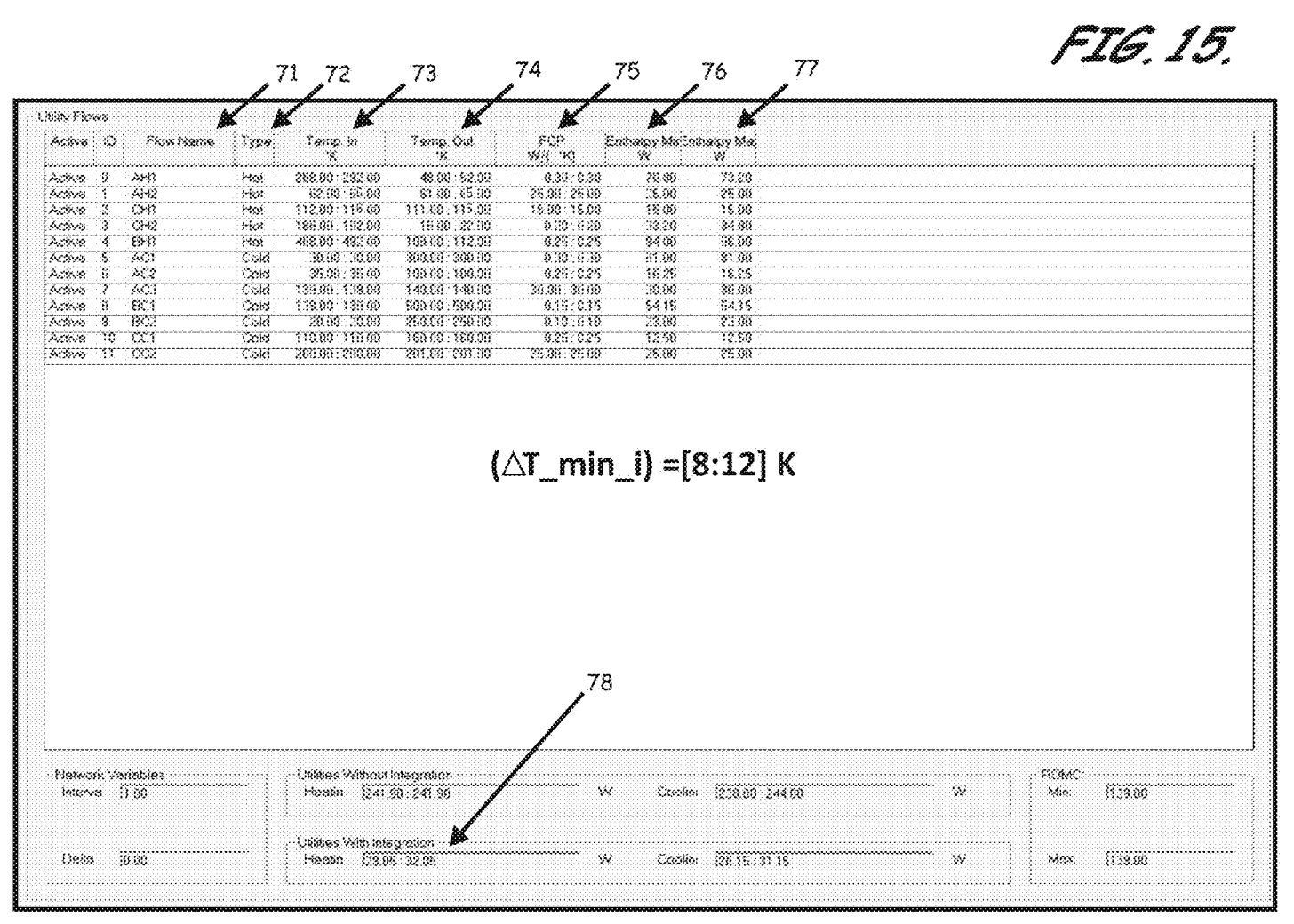

Step 2 includes the employment of an energy targeting module to find [Qh] and [Qc] under all possible combinations of process-specific modifications and stream-specific ΔT_min in the acceptable user defined range. FIG. 15 illustrates simultaneous in-process ΔT_min selections for enhancing inter-processes energy integration. In this example, a graphical user interface is provided which allows the user to enter a list of streams 71, their type 72, their starting temperature interval values 73, their target temperature interval values 74, their heat capacity flow rate interval 75, and their minimum and maximum entropy values 76, 77. Note, the stream temperature value shown for the hot streams reflect a ΔT_min_i interval value of 8 and 12° K. During the lab test, various stream values including the ΔT_min_i values can be manipulated manually or through an automated process described, for example, in U.S. Pat. No. 7,873,443.

Figure 16:
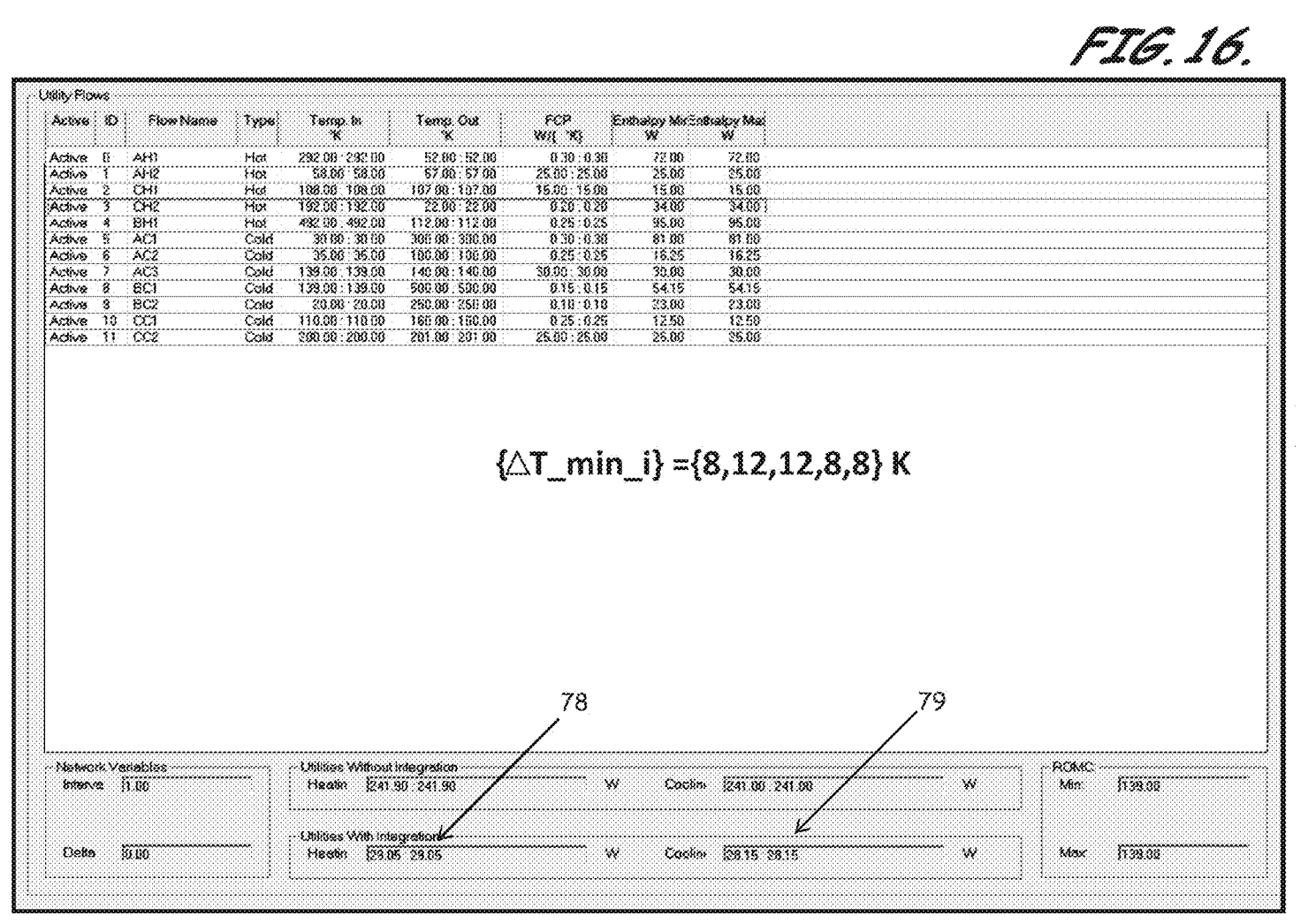

FIG. 16 also illustrates simultaneous in-process ΔT_min selections for enhancing inter-processes energy integration. In this example, a 5% reduction in heating utility consumption Qh at 78 is achieved using a stream-specific set minimum approach temperature values ΔT_min_i={8, 12, 12, 8, 8}° K, respectively, for hot streams entered in the table as compared with the conventional method which would utilize a same ΔT_min of 10° K for each hot stream. Notably, using a stream-specific set minimum approach temperature values ΔT_min_i={8, 20, 20, 8, 8}° K does not substantially change the reduction in heating utility consumption Qh.

Figure 17:
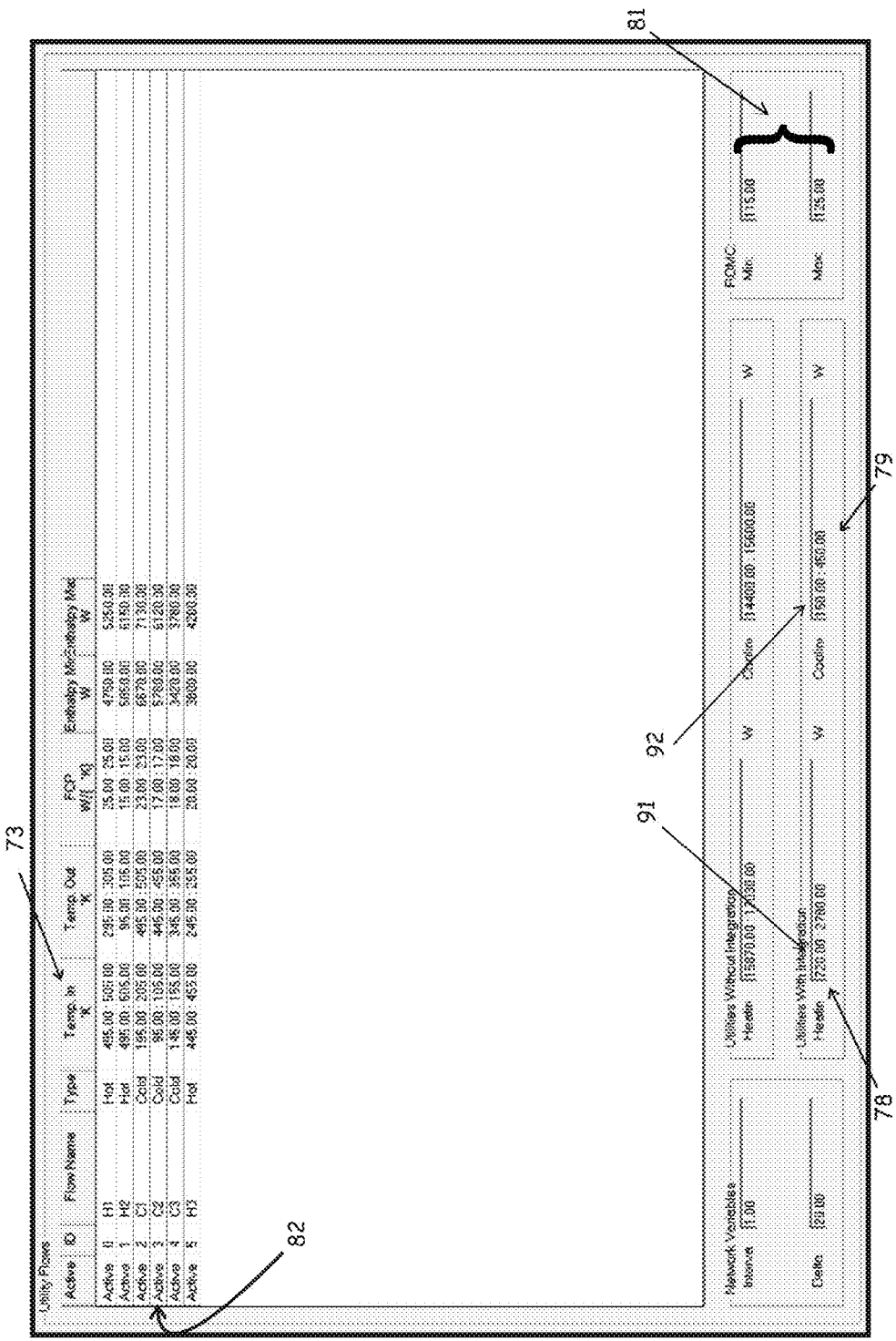
FIG. 17 is a schematic diagram of a graphical user interface illustrating simultaneous in-process design and operations modifications for enhancing inter-processes energy integration according to an embodiment of the present invention.

Step 3 includes determining the problem-wide pinch interval and the pinch-location controlling processes. FIG. 17 illustrates simultaneous in-process design and operations modifications for enhancing inter-processes energy integration. In this example, the pinch interval is shown at 81. It can be seen in the figure that from its determined values, cold stream "C2" at 82 controls the mega-problem pinch point location. It can also be seen that modifying its start inlet temperature 73 will change the pinch location and the cooling and heating utilities requirements 78, 79. By modifying process conditions such as the supply/inlet temperature of the pinch controlling stream, the energy integration can be substantially enhanced. The zone, block, facility, plant, unit, or stream that has its representative stream's supply/inlet temperature starting at the pinch point temperature is the respective zone, block, facility, plant, unit, or stream that controls the problem-wide pinch at the current minimum approach temperatures used in the calculation. If there is more than one process, stream, or other item represented as a stream, having a supply/starting at this temperature, one can identify the one that controls the pinch location via deceasing the minimum approach temperature of each stream or its supply/starting temperature. If the pinch point temperature moves, the respective stream is the one controlling the location of the pinch temperature. If not, the process can be repeated until the controlling stream is identified.

Step 4 includes the decision maker selecting or otherwise identifying the desired level of energy target(s) for heating utility, cooling utility or both. The decision-maker can select either the minimum heating utility consumption at 91 or the minimum cooling utility consumption at 92, or a balance between the two utilities as his/her objective. This selection dictates the mega-problem process conditions in each stream/process/facility/block/zone modification.

Figure 18:
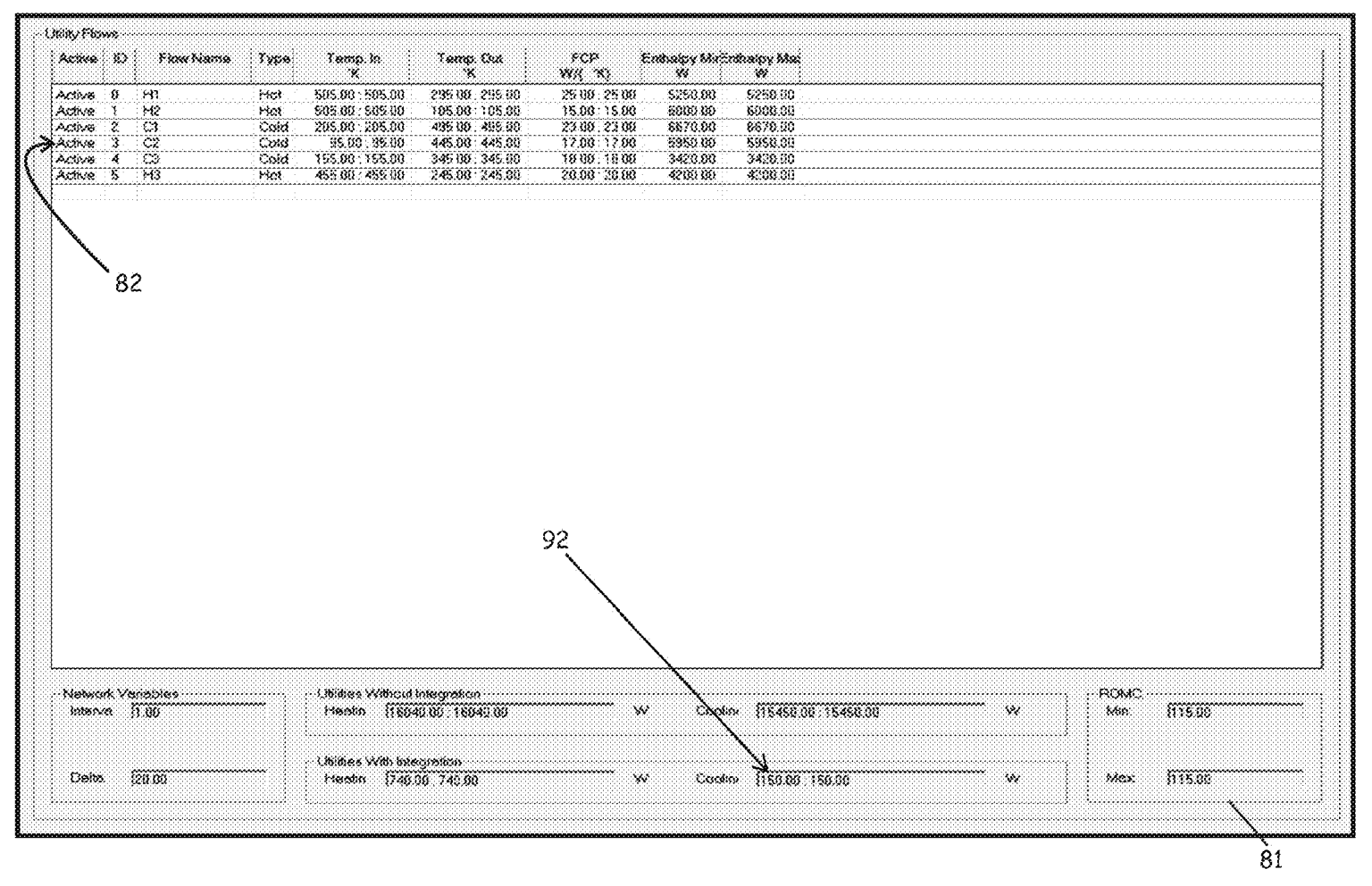
Figure 19:
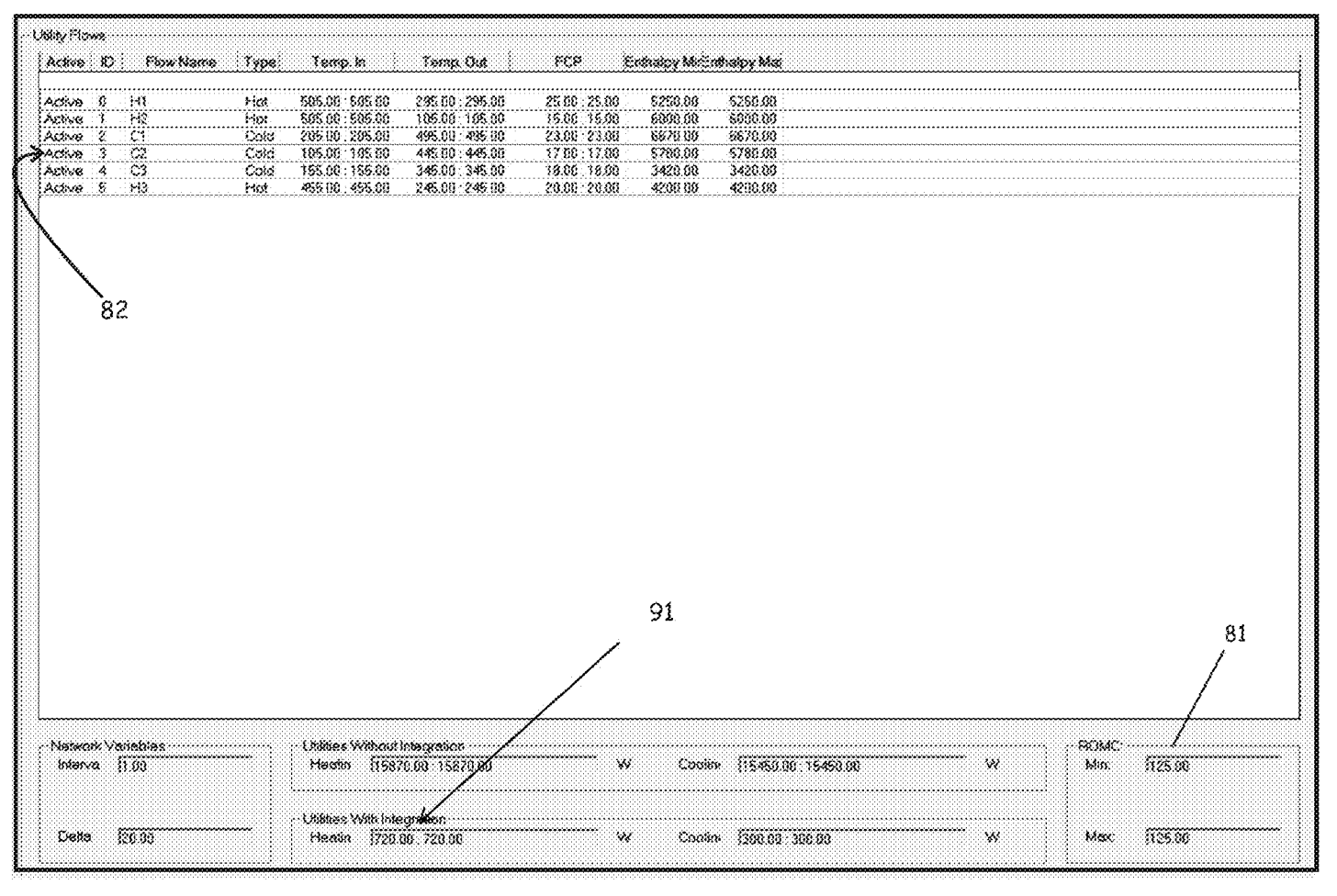

If the minimum cooling utility Qc is selected, as shown in FIG. 18, from the automated analysis, the optimal process conditions which dictate the minimum cooling utility Qc are readily determined. Specifically, FIG. 18 illustrates a scenario where the decision-maker selected the minimum cooling duty utility Qc to be the primary goal, with a minimum hot utility consumption Qh being subject to the minimum cooling duty utility. I.e., the hot utility consumption value Qh is not at the theoretical minimum, but at a best heat energy utility value given the goal of having a minimum cooling duty utility. FIG. 19 illustrates an opposite scenario where the decision-maker selected process conditions which lead to the minimum heating utility consumption Qh.

Step 5 includes collapsing the intervals of the supply and demand interval values as described in U.S. Pat. No. 7,873, 443, to locate and render the problem-wide best/desired pinch at 81, the pinch-location controlling process and the best process changes as well as streams-specific ΔT_min_i in the acceptable user defined range. In the example, the process stream/facility/zone labeled "C2" is the controlling process which can be manipulated to render the minimum cooling utility Qc (FIG. 18) or the minimum hot utility consumption Qh (FIG. 19).

Figure 20:
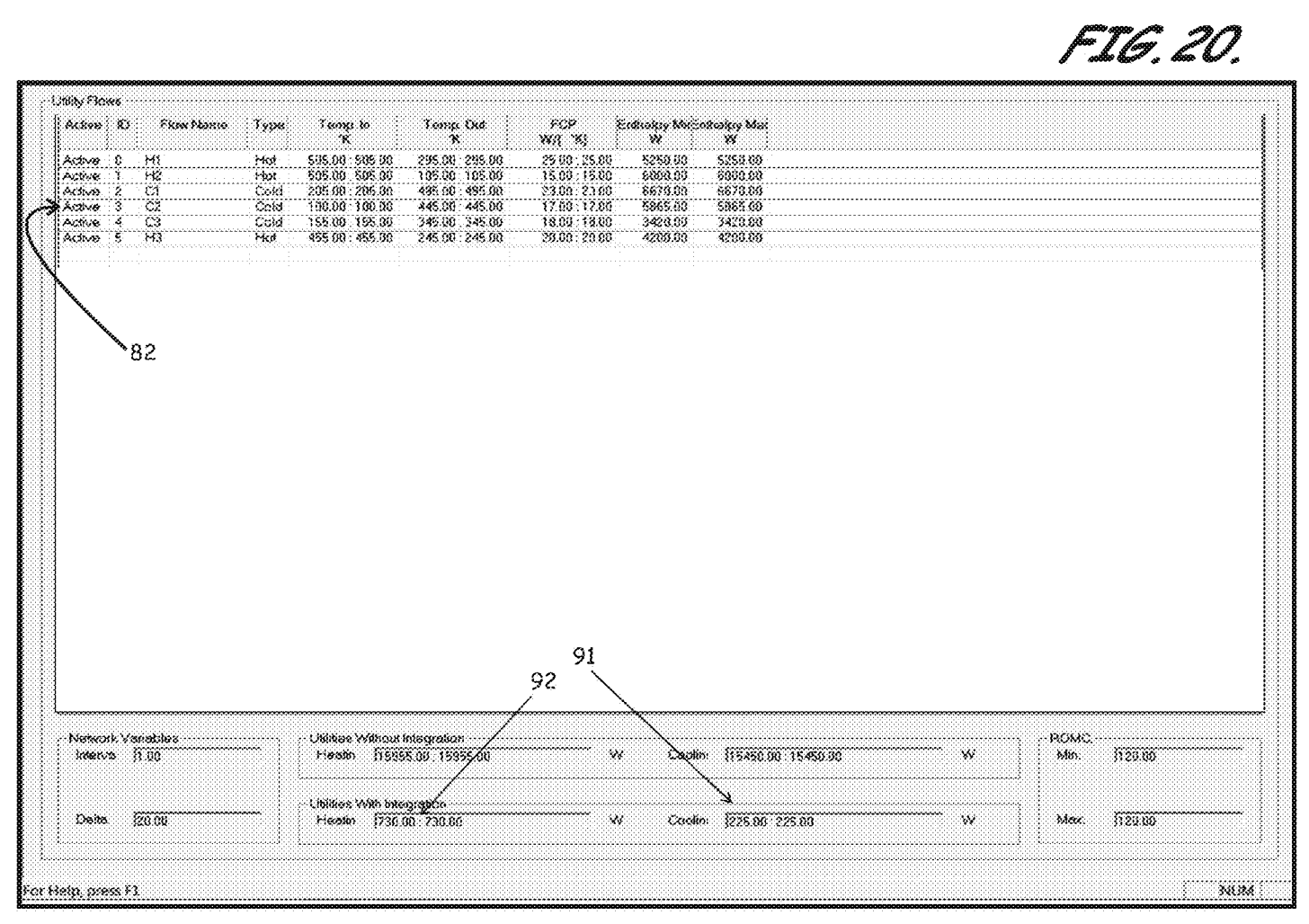

FIG. 20 illustrates identification of process changes for balanced heating and cooling utilities for a mega-problem via inter-processes integration. In this example, the decision-maker manipulated the pinch point location at 81 through manipulation of the supply temperature for cold stream C2 to provide a balanced heating utility Qh and cooling utility Qc solution.

Step 6 includes either a manual or automated identification of zones, facilities, plants, processes and streams absolutely constrained/forbidden from direct matching with certain other or all other zones, facilities, plants, processes and streams. For these zones, the thermal load must be handled via indirect integration.

Phase I, Lab Test B

Steps 7-8 encompass the second lab test of Phase 1, Lab test "B," which can be used to determine the best energy consumption systems' combinations using stream-specific minimum approach temperatures. Step 7 includes the employment of the energy targeting module 63 to find best possible matches among the zones, or blocks, or facilities, or plants, or processes, and step 8 includes, for very large number of processes, utilizing a temperature duty diagram (TDD), described later, to guide the decision-maker through the selection of best matches.

As an example application of Lab test B and step 7, we first define a problem having three zones and a global ΔT_min equal to 20° F., having the following operational attributes:

| Zone # | Stream type | Ts | Tt | FCp |
| --- | --- | --- | --- | --- |
| A | Hot | 500 | 250 | 25 |
| A | Cold | 200 | 500 | 23 |
| B | Hot | 500 | 100 | 15 |
| B | Cold | 100 | 450 | 17 |
| C | Hot | 450 | 250 | 20 |

From this input data, the energy targeting program module 63 calculates the minimum hot utility consumption Qh and minimum cooling utility Qc for each potential combination of direct inter-system integration to identify the best and second best combinations. FIG. 21 illustrates the framework for analyzing direct inter-system integration for a desired direct integration combination. In this example, a simple three zone problem is provided for exemplary analysis. In a three zone problem, there are five possible combinations which include the direct integration of all three zones and the integration of neither of the three zones. Utilizing energy targeting module 63 in conjunction with the energy targeting modules 61, all possible combinations of systems energy consumption using stream-specific minimum approach temperatures can be automatically identified. The program modules' output shows that the best solutions are the first and the fourth combination. FIG. 22 provides an example directed to calculation of the minimum hot utility consumption Qh and the minimum cooling utility Qc for the second combination shown in FIG. 21. In this example, area/zone A and area/zone B are analyzed as a single zone, and area/zone C is analyzed independently of areas/zones A and B—i.e., without either direct (or indirect) integration with areas/zones A or B. Such calculations are performed for each of the other possible combinations to determine the total heating and cooling duty utility values shown in FIG. 21.

The data shown in FIG. 21, according to the exemplary configuration, can be considered insufficient for the decision maker to finally conclude that only direct integration of area/zone A, B, and C, taken together is the only way to reach the hot utility and cold utility consumption solution provided with respect to the first combination shown in the figure, i.e., Qh=460.0, Qc=2610.0. As such, beneficially, an embodiment incorporates an entropy calculations algorithm, which can be used for any number of systems (e.g., to include 20 plants or more) to provide a new short-cut tool that can be used to verify or refute the interim conclusion that direct integration across all three zones is required.

Phase I, Lab Test C

Lab test C includes the employment of the realizable energy targets using direct or indirect integration test module 65, which provides the realizable energy targets through analysis of the integration choices based on entropy balance calculations.

In the following example, we first define a problem having three zones and a global $\Delta T\_min$ equal to 20° F., having the same operational attributes described immediately above. Additionally, assumptions include a medium pressure steam saturation temperature of 450° F. and a low pressure steam saturation temperature of 320° F. Additionally, integration with the community is not possible and in-plant power generation is not required.

Figure 23:
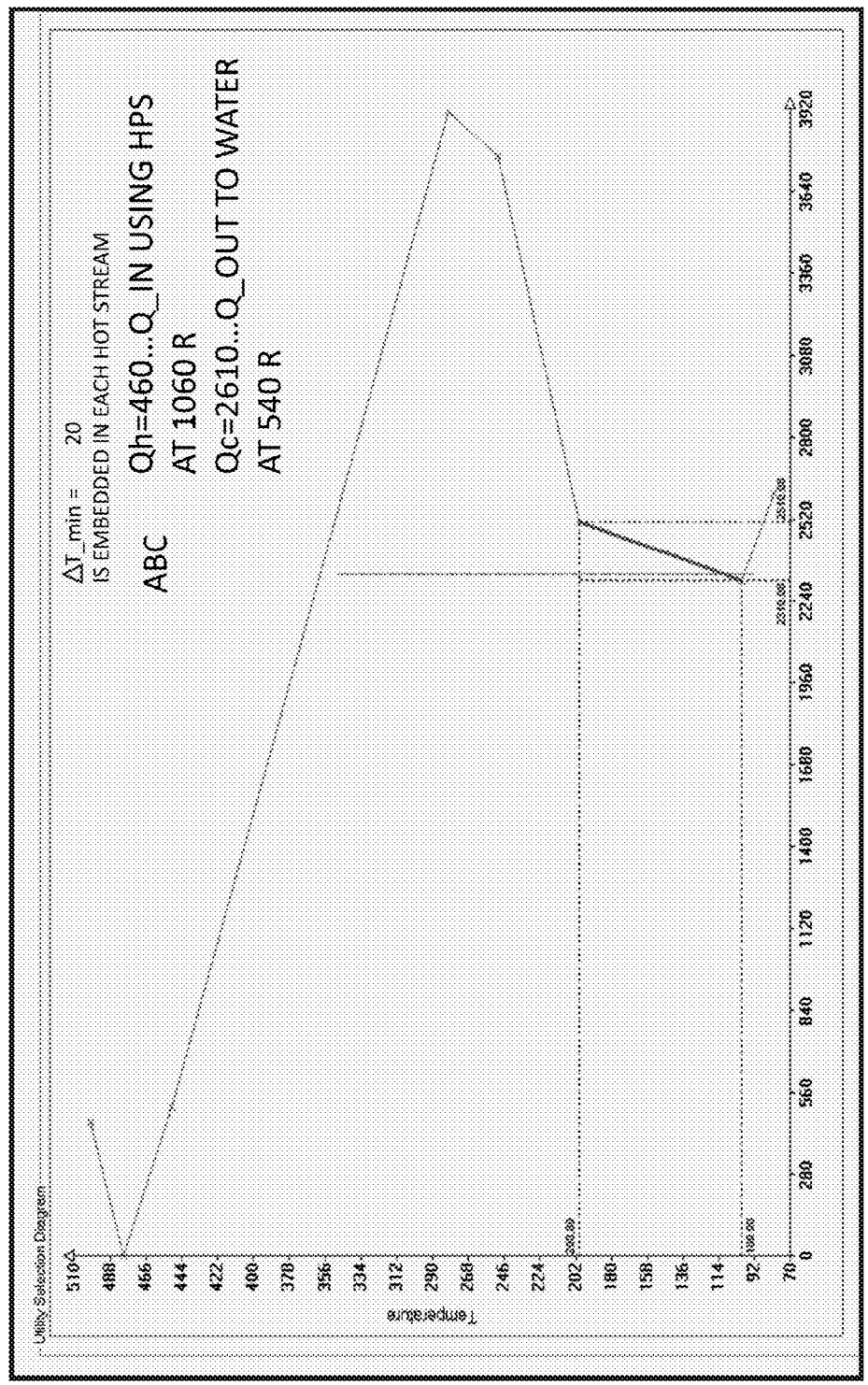
FIGS. 23-26 are schematic diagrams of graphical user interfaces illustrating utilities entropy balance calculations according to an embodiment of the present invention.

FIGS. 23-26 illustrate utilities entropy balance calculations. FIG. 23 illustrates composite curve showing the change in enthalpy versus temperature for the combination of streams of area/zone A, B, and C taken together (direct integration), and showing a graphical calculation of Qh and Qc. The hot utility consumption Qh of 460 kW is provided through a Q_in using high pressure steam at 1060 R. The cold utility consumption Qc of 2610 kW is provided by a Q_out to water at 540 R.

Figure 24:
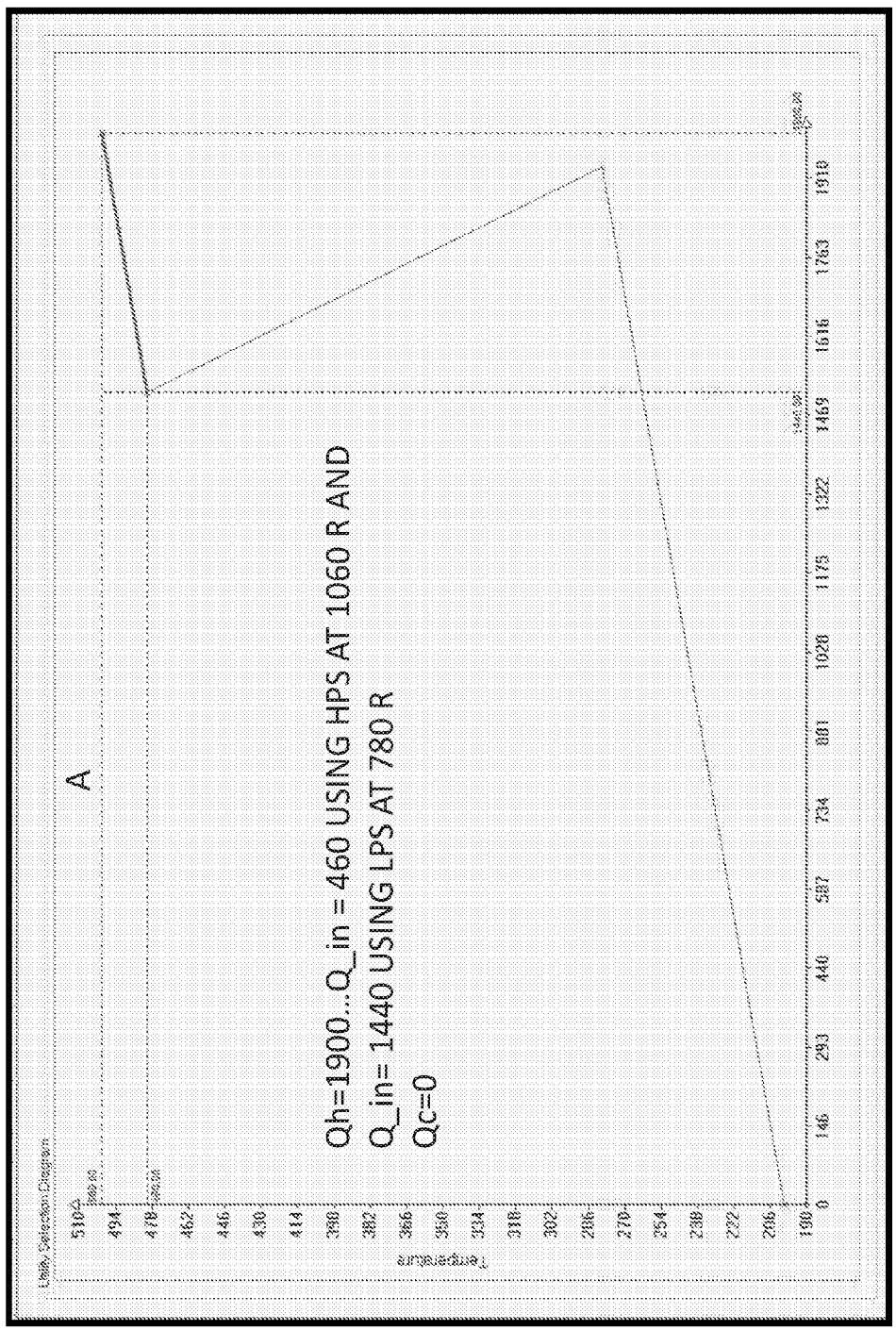
Figure 25:
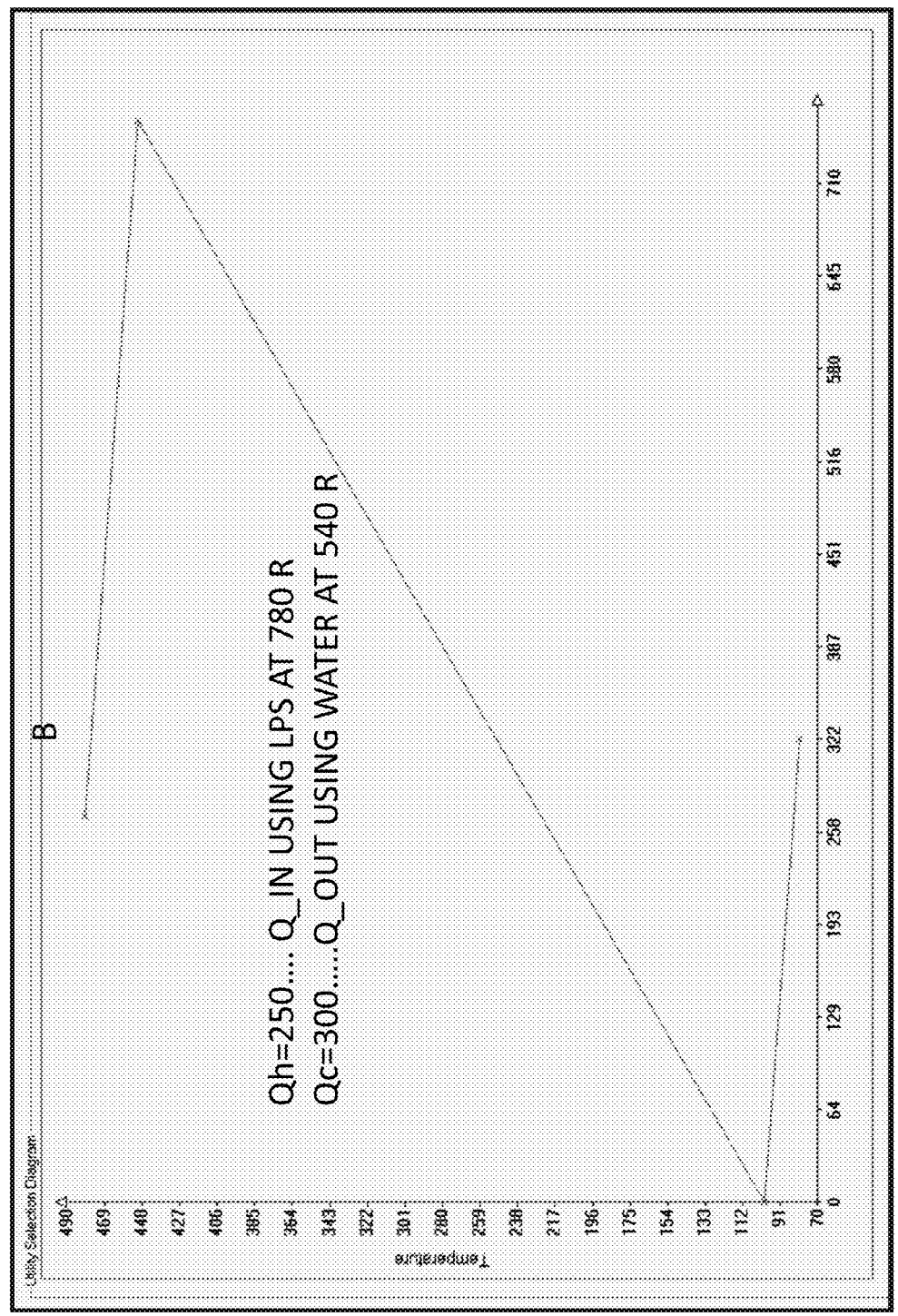
Figure 26:
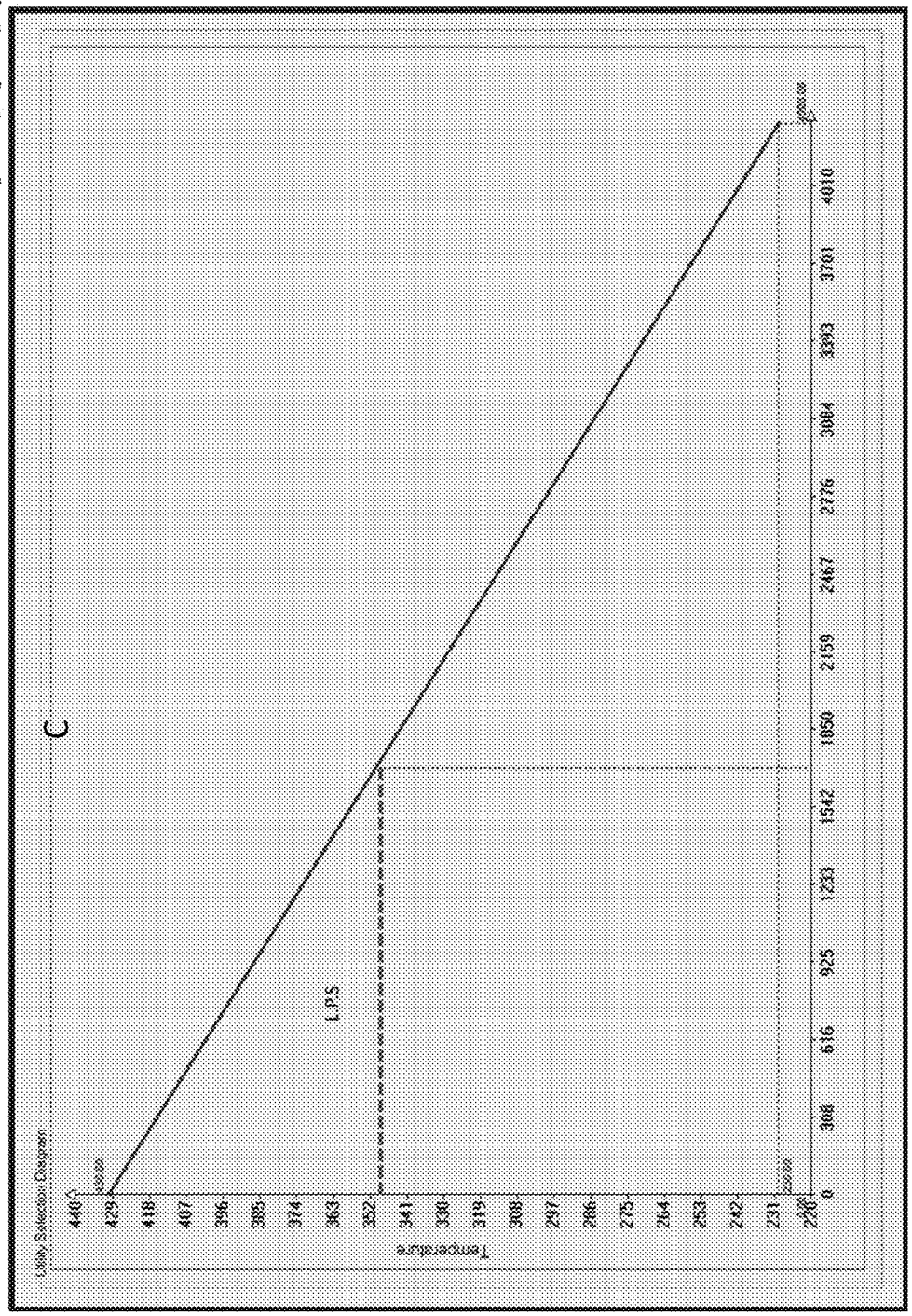

FIGS. 24-26 illustrate composite curves showing the change in enthalpy versus temperature for the streams of each separate area/zone A, B, and C. FIG. 24 illustrates a composite curve showing the process streams of area/zone A and graphical calculation of the hot utility consumption Qh of 1900 kW and the cold utility consumption Qc of 0 kW. The hot utility consumption Qh is provided through a Q_in of 460 kW using high-pressure steam at 1060 R and a Q_in of 1440 kW using low-pressure steam at 780 R. FIG. 25 illustrates a composite curve showing the process streams of area/zone B and graphical calculation of the hot utility consumption Qh of 250 kW provided through a Q_in using low-pressure steam at 780 R, and a cold utility consumption Qc of 300 kW provided through a Q_out using water at 540 R. FIG. 26 illustrates a composite curve showing the process streams of area/zone C and graphical calculation of the cold utility consumption Qc of 4000 kW, 1690 kW available for low-pressure steam generation or indirect integration with areas/zone A and B and the remaining Q_out (4000 kW-1690 kW) using water at 540 R.

To determine if direct integration between all of zones A+B+C is the optimal integration solution, the second case study is performed utilizing the total system entropy-balance shortcut calculation process illustrated below. In the case study, the assumption includes integration of the community not being possible and in-plant power generation not being required.

Entropy Balance on Flowing Open System is as follows:

$\Delta S\_P\_all+X=\{\Sigma Q\_out/T\_out\}all-\{\Sigma Q\_in/T\_in\}all$  Equation (1)

$\Delta S\_P\_A+x1=\{\Sigma Q\_out/T\_out\}A-\{\Sigma Q\_in/T\_in\}A$  Equation (2)

$\Delta S\_P\_B+x2=\{\Sigma Q\_out/T\_out\}B-\{\Sigma Q\_in/T\_in\}B$  Equation (3)

$\Delta S\_P\_C+x3=\{\Sigma Q\_out/T\_out\}C-\{\Sigma Q\_in/T\_in\}C$  Equation (4)

wherein X=x1+x2+x3,

Equation (2)+Equation (3)+Equation (4)  Equation (5)

Equation (5)−Equation (1)  Equation (6)

Using the composite curves shown in FIGS. 24-26, the exemplary application of the result of Equation (6) will be identification of an increase in entropy generation, if any, due to standalone and indirect inter-processes integration versus use of direct inter-processes integration, as follows:

$\Delta S\_P\_all+X=2610/540-460/1060=4.4$  (1)

$\Delta S\_P\_A+x1=-1440/780-460/1060=-2.28$  (2)

$\Delta S\_P\_B+x2=300/540-250/780=0.235$  (3)

$\Delta S\_P\_C+x3=2310/540+1690/780=6.445$  (4)

$\Delta S\_P\_A+x1+\Delta S\_P\_B+x2\Delta S\_P\_C+x3=4.4$  (5)

$(5)-(1)=0.0.$  (6)

The result here shows that in this specific case, efficiencies can be gained through indirect inter-processes integration among A, B, C after their intra-processes integration leads to the same result as direct inter-processes integration. Note, using the above described steam system can lead to the same results only for this case study. If integration with the community (power and/or steam for heating and cooling) is allowed, in-plant power generation is desired or available, or LPS header saturation temperature is higher than 780 R/320 F used as per previous case, the difference between Equations (5)–(1) will not be zero, heating utility will be higher, power generated in-plant will be less, and the possibility and capacity for synergy with the community to supply heat and/or cooling to it will be diminished.

Phase I, Lab Test D

Lab test D includes the employment of the number of steam headers' and conditions' impact on energy consumption test module 64 which provides a method for testing the impact of a given number of steam headers and conditions on energy consumption.

As will be described immediately below, employing indirect inter-systems integration, only, using steam will generally ("most of the time") result in a larger energy consumption than required if one were to use direct inter-systems integration, only. The theory behind using steam for indirect integration is that any stream source(s)/hot stream(s) in one "facility," for example, can be used to generate steam at specific steam saturation temperature and reasonable minimum approach temperature, and then integrate with another stream sink (s)/cold stream(s) that needs steam in another "facility" at specific saturation temperature and reasonable minimum approach temperature.

For example, assume that we have three steam headers and we can generate and consume the shown amount of steam at the following saturation temperatures:

| Steam Saturation Temperature (T_sat) | Generation ($10^4$ Lb/h) | Demand ($10^4$ Lb/h) |
|---|---|---|
| T_sat1 | 5 | 10 |
| T_sat2 | 4 | 3 |
| T_sat3 | 6 | 8 |
| T_sat4 | 2 | 9 |
| T_sat5 | 5 | 7 |
| T_sat6 | 4 | 2 |

Figures 27, 28:
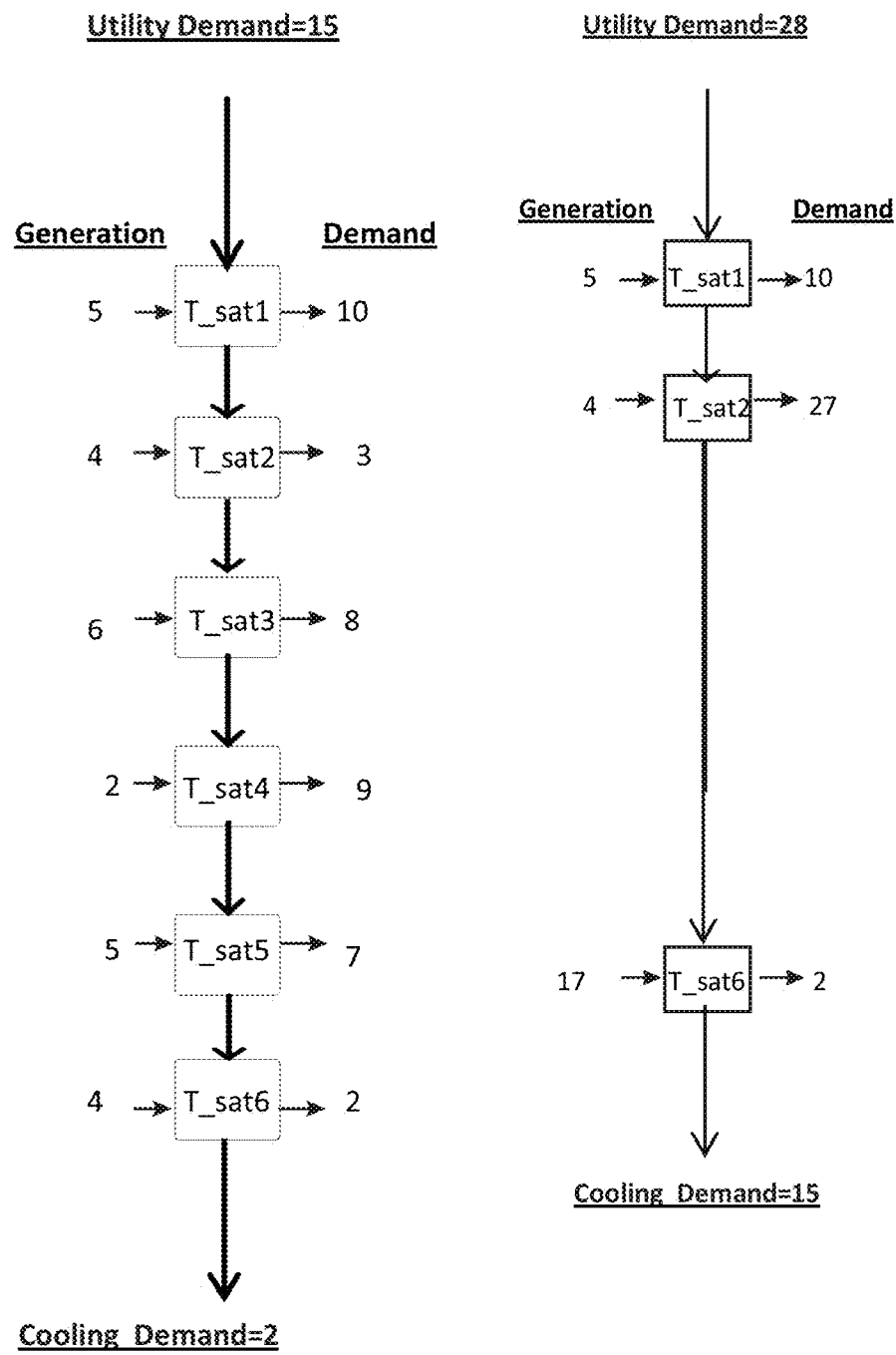
Figure 31:
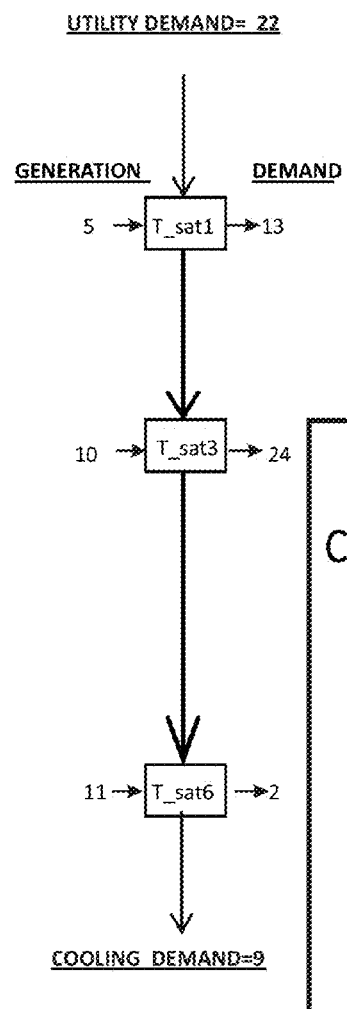

As shown in FIGS. 27-31, to achieve the same energy consumption (heating and cooling) upon using direct energy integration technique between the hot and cold sources in the studied facilities, the system will require six steam headers as shown in FIG. 27. As shown in FIGS. 28-31, using three steam headers, as is the standard practice in most of the industry, will result in an increased amount of energy consumption over that achievable by direct integration through utilization of additional steam headers and ensuing additional capital costs.

Phase II—Energy Targets Identification for Direct and Indirect Inter-Processes Integration Phase The Phase II process includes application of the inter-systems thermal loads sharing calculation module 66. According to an exemplary embodiment, a first step for identifying thermal loads sharing can include constructing a problem-wide temperature duty diagram, employing, for example, the following steps shown in the table below:

| Step 1 | Define the problem Zones, Blocks, Facilities, Plants and Processes considered for inter-systems energy integration. |
| --- | --- |
| Step 2 | Construct the Cold Composite Line (CCL) for each Zone, Block, Facility, Plant, Process and stream and steam headers as well as hot oil circuits. |
| Step 3 | Construct the Hot Composite Line (HCL) with embedded ΔT_min for each Zone, Block, Facility, Plant, Process and stream and steam headers as well as hot oil circuits. |
| Step 4 | Locate the problem-wide best/desired pinch and the pinch-location controlling process. |
| Step 5 | Define constrained/forbidden zones, facilities, plants, processes and streams direct matching. |
| Step 6 | Draw the "above the pinch" section on one axis; the zones or blocks or plants or processes in alphabetical order from the axis to the right for CCLs and from the axis to the left for HCLs. |
| Step 7 | Draw the "below the pinch" section on one axis; the zones or blocks or plants or processes in alphabetical order from the axis to the right for CCLs and from the axis to the left for HCLs. |
| Step 8 | Draw horizontal lines at each user input steam level with embedded desired ΔT_min and at the temperature pinch and at the near pinch temperature. |
| Step 9 | Draw an arrow at each change in FCp of each CCLs and HCLs and put its value adjacent to the lines. |
| Step 10 | Insert the thermal load on the top of each zone(s) or block(s) or facility(s) or plant(s) or process(es) above the pinch and on the bottom of each of each zone(s) or block(s) or facility(s) or plant(s) or process(es) below the pinch. |
| Step 11 | Insert the "surplus heating load" in an alphabetical order at the top left corner for each zone(s) or block(s) or facility(s) or plant(s) or process(es) above the pinch, and in the bottom left corner for below the pinch, and write the "deficit heating load" on the top right corner for above the pinch and on the bottom right corner for below the pinch. |

Step 1 includes defining the problem zones, blocks, facilities, plants and processes considered for inter-systems energy integration. An example of the process step was described as with respect to FIGS. 5-14.

Step 2 includes constructing a cold composite line (CCL), and Step 3 includes constructing a hot composite line (HCL) with embedded ΔT_min for specific zone, block, facility, plant, process and stream and steam headers as well as hot oil circuits. Note, for construction purposes, the steam headers and hot oil circuits exchangers have ½ the minimum approach temperature of each hot stream they receive load from. The following describes an exemplary method of constructing the CCL and HCL composite lines. Beneficially, the method below can be used to analyze any number of streams in any number of systems, where the system can be defined as a cluster of zones (e.g. 4 or 8), blocks, facilities, plants, processes or units.

For illustrative purposes, consider an industrial site having four zones and the information identifying the number of blocks, facilities, plants, processes, units and cold streams in each zone has been received. In order to reduce the complexity of the problem, the process calls for each zone having only one CCL line. Assume that a first system of the industrial site, which can be a zone or block or facility or plant or process or unit, consists of one cold stream and a second system consists of one cold stream as follows:

| Stream | Ts | Tt | FCp |
| --- | --- | --- | --- |
| C1 | 20 | 250 | 0.10 |
| C2 | 139 | 500 | 0.15 |

The CCL will be then drawn constructed as shown in FIG. 27. Because cold streams C1 and C2 overlap between the temperatures of 250° and 139°, the FCp for that temperature interval has an effective value of 0.25 W/° K (0.10+0.15).

Steps 4-11 are described with respect to an exemplary inter-systems energy integration problem illustrated in FIGS. 33-37.

For the exemplary problem, assume an industrial site having three systems each having operational stream attributes as provided in the table below; a ΔT_min equal to 20° F. for all hot streams; an MPS saturation temperature equal to 450° F.; and in LPS saturation temperature equal to 350° F.

| Zone # | Stream type | Ts | Tt | FCp |
| --- | --- | --- | --- | --- |
| A | Hot | 500 | 250 | 25 |
| A | Cold | 200 | 500 | 23 |
| B | Hot | 500 | 100 | 15 |
| B | Cold | 100 | 450 | 17 |
| C | Hot | 450 | 250 | 20 |

Figure 33:
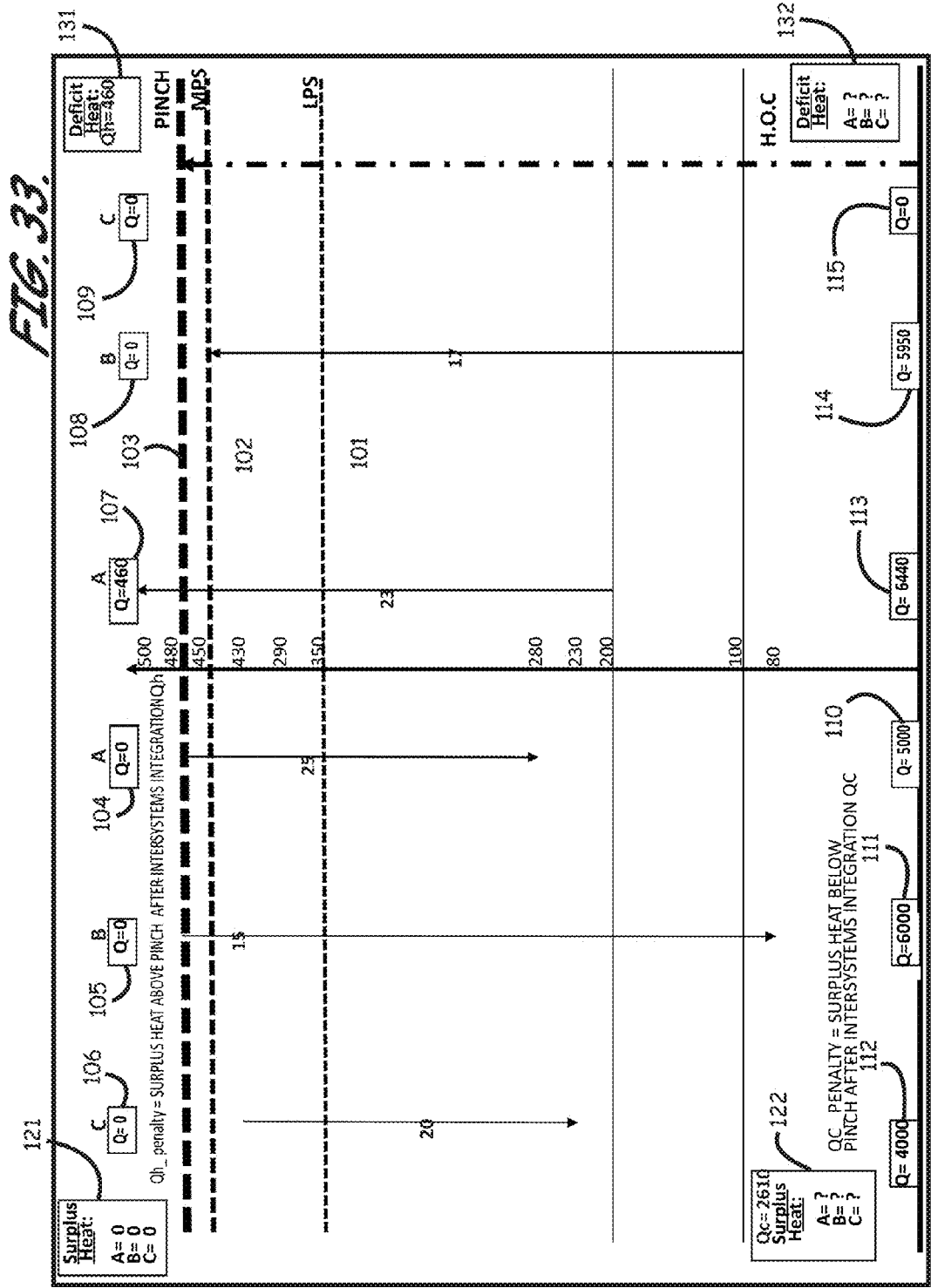
FIG. 33 is a schematic diagram of a graphical user interface illustrating construction of a temperature duty diagram according to an embodiment of the present invention.

FIG. 33 illustrates an exemplary temperature duty diagram having inter-systems global energy targets superimposed. In steps 1-3, the problem was defined in the composite or temperature lines for each cold and hot stream for each zone were added. In step 4, the problem-wide best/desired pinch and the pinch-location controlling process are located. In this example, pinch location at 480° F. and the controlling process stream is either the hot process stream for zone A or zone B, each having a starting temperature at the pinch location.

In step 5, any zones, facilities, plants, processes and streams constrained/forbidden from direct matching are defined. In step 6, the "above the pinch" section is drawn on one axis, and the zones or blocks or plants or processes are drawn in alphabetical order from the axis to the right for the CCLs and from the axis to the left for the HCLs. Similarly, in step 7, the "below the pinch" section is drawn on one axis, and the zones or blocks or plants or processes in alphabetical order from the axis to the right for CCLs and from the axis to the left for HCLs.

Figure 32:
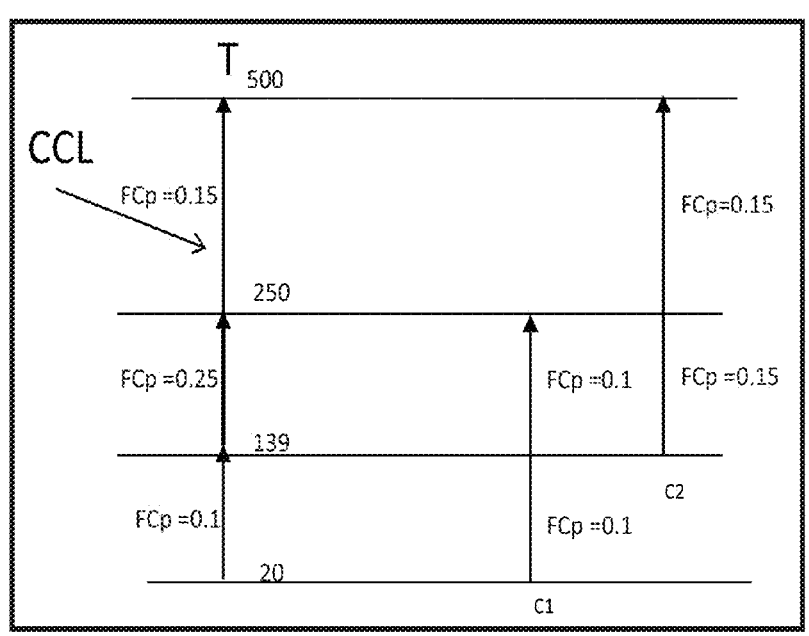
FIG. 32 is a graphical diagram illustrating construction of a cold composite line according to an embodiment of the present invention.

In step 8, horizontal lines at 101, 102 are drawn at each user input steam level with embedded desired ΔT_min, and are drawn at the temperature pinch 103 and will also be drawn at the near pinch temperature, if any. Step 9 includes drawing an arrow at each change in FCp of each CCLs and HCLs and inserting its value adjacent to the lines when the representative areas/zones includes multiple streams as depicted in FIG. 32 (not applicable for this exemplary problem)

In step 10, the thermal loads 104-109 are written or otherwise loaded on the top of each zone(s) or block(s) or facility(s) or plant(s) or process(es) above the pinch, and the thermal loads 110-115 are written or otherwise loaded on the bottom of each of each zone(s) or block(s) or facility(s) or plant(s) or process(es) below the pinch.

Step 11 includes writing the "surplus heating load" 121 in an alphabetical order at the top left corner for each zone(s) or block(s) or facility(s) or plant(s) or process(es) above the pinch, and the surplus heating load 122 in the bottom left corner for below the pinch, and writing the "deficit heating load" 131 on the top right corner for above the pinch, and the deficit heating load 132 on the bottom right corner for below the pinch. The "surplus heating load" is the load that need to be recovered via inter-system energy integration, otherwise cooling duty above the problem global pinch will be required. The "deficit heating load" is the load that needs to be provided via inter-system energy integration, otherwise heating duty below the problem global pinch will be required.

Figure 34:
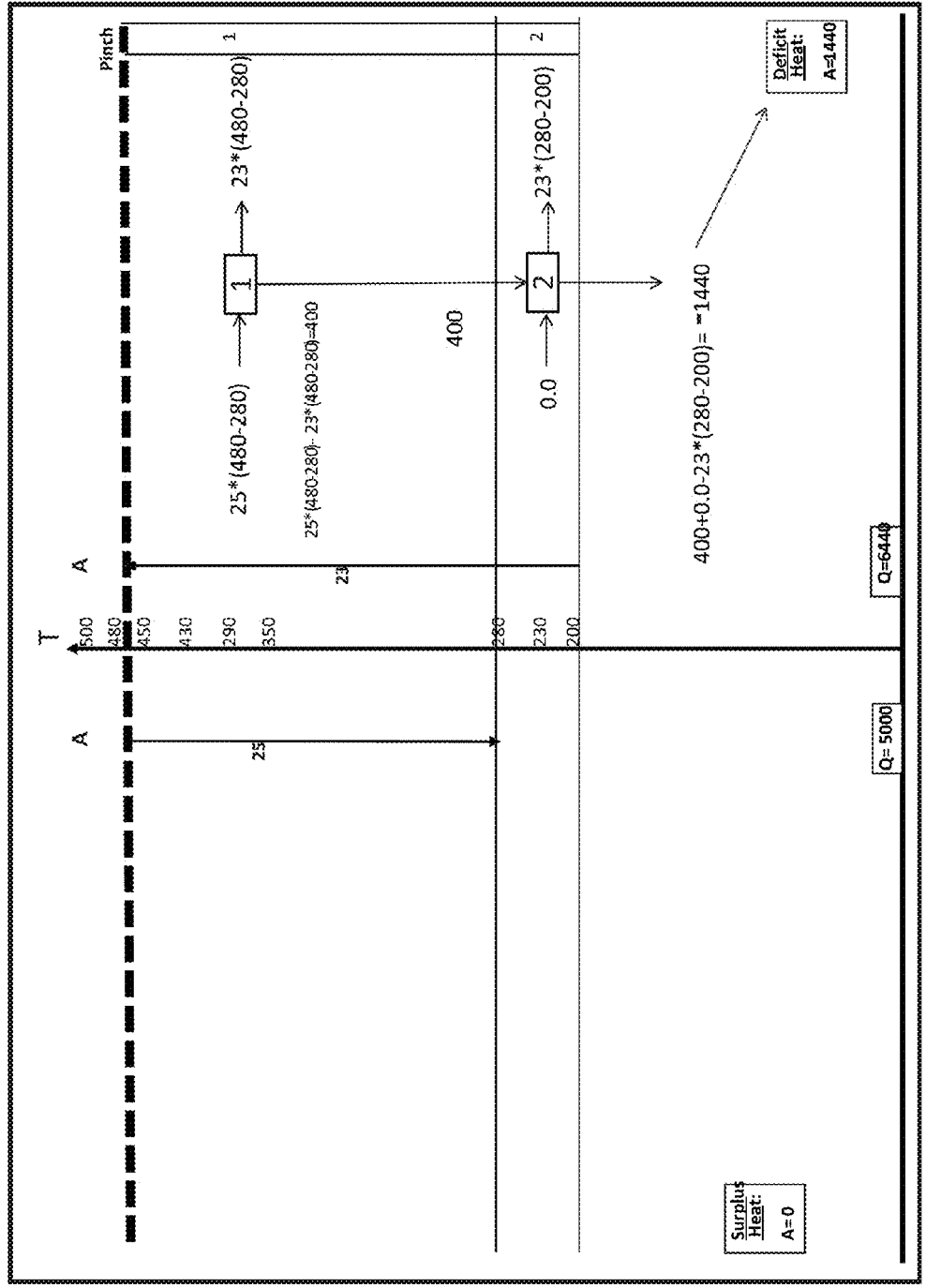
FIGS. 34-36 are schematic diagrams of a graphical user interface illustrating the calculation of heat surpluses and deficits for the temperature duty diagram of FIG. 34 according to an embodiment of the present invention.
Figure 35:
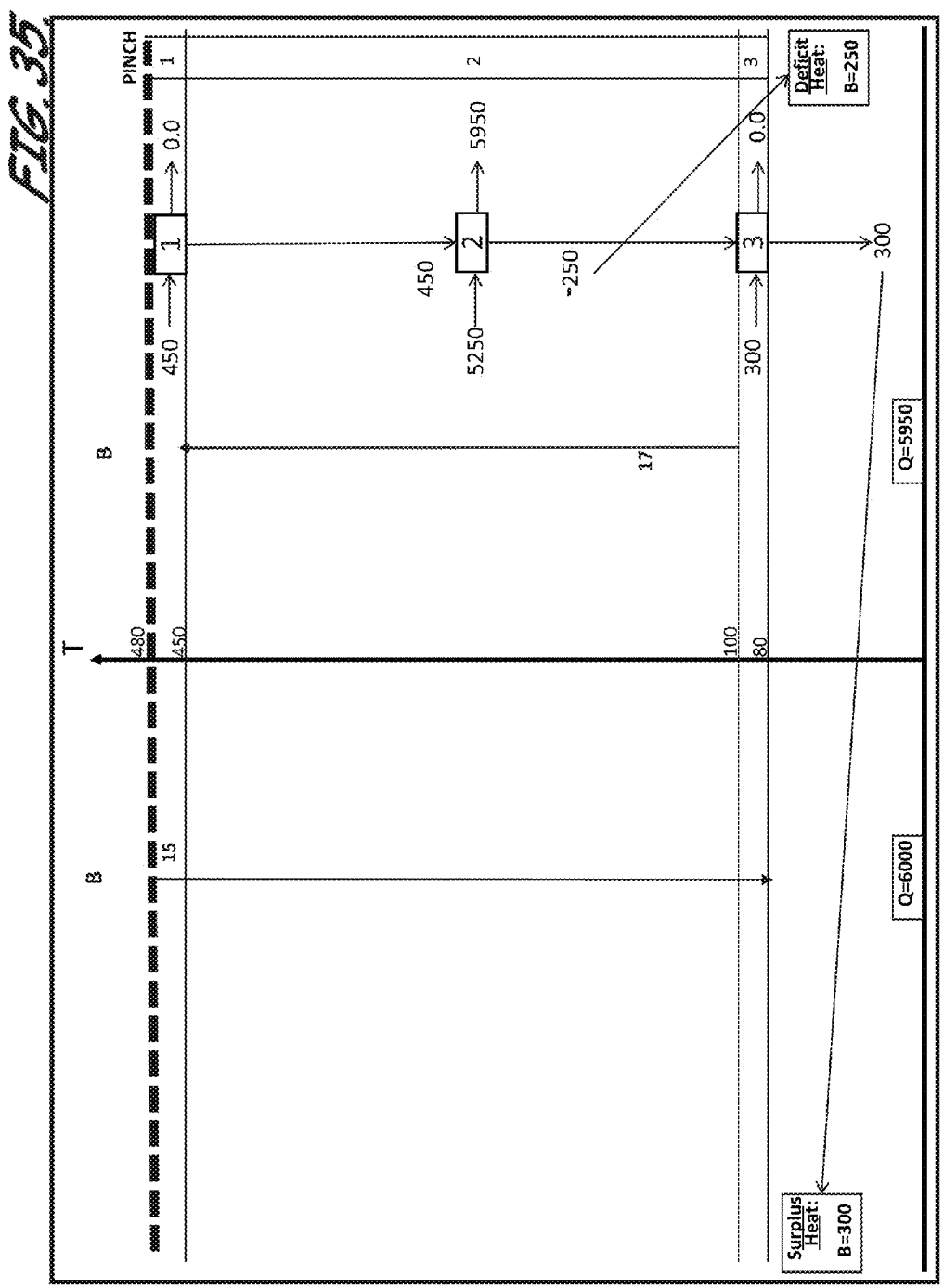
Figure 36:
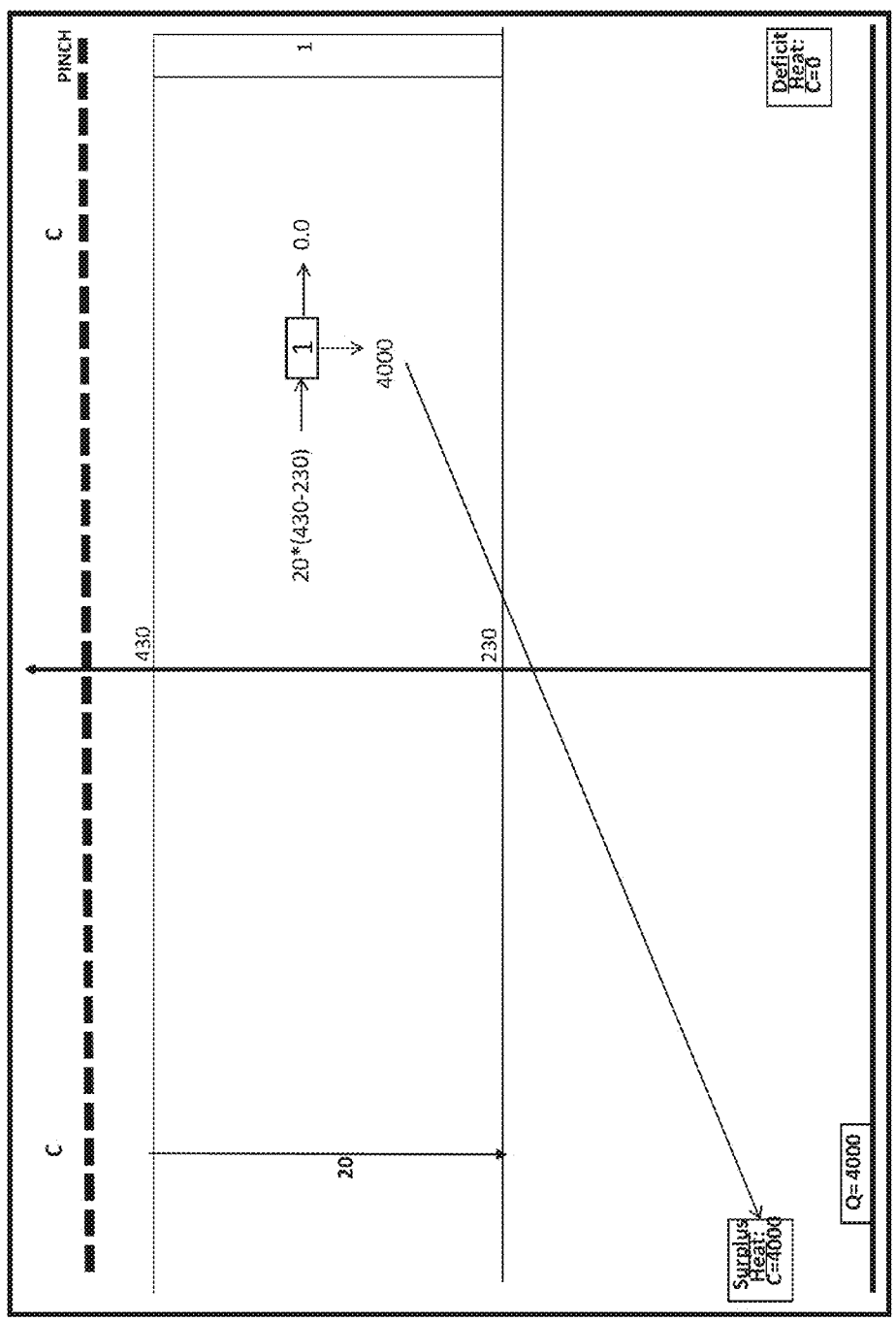
Figure 37:
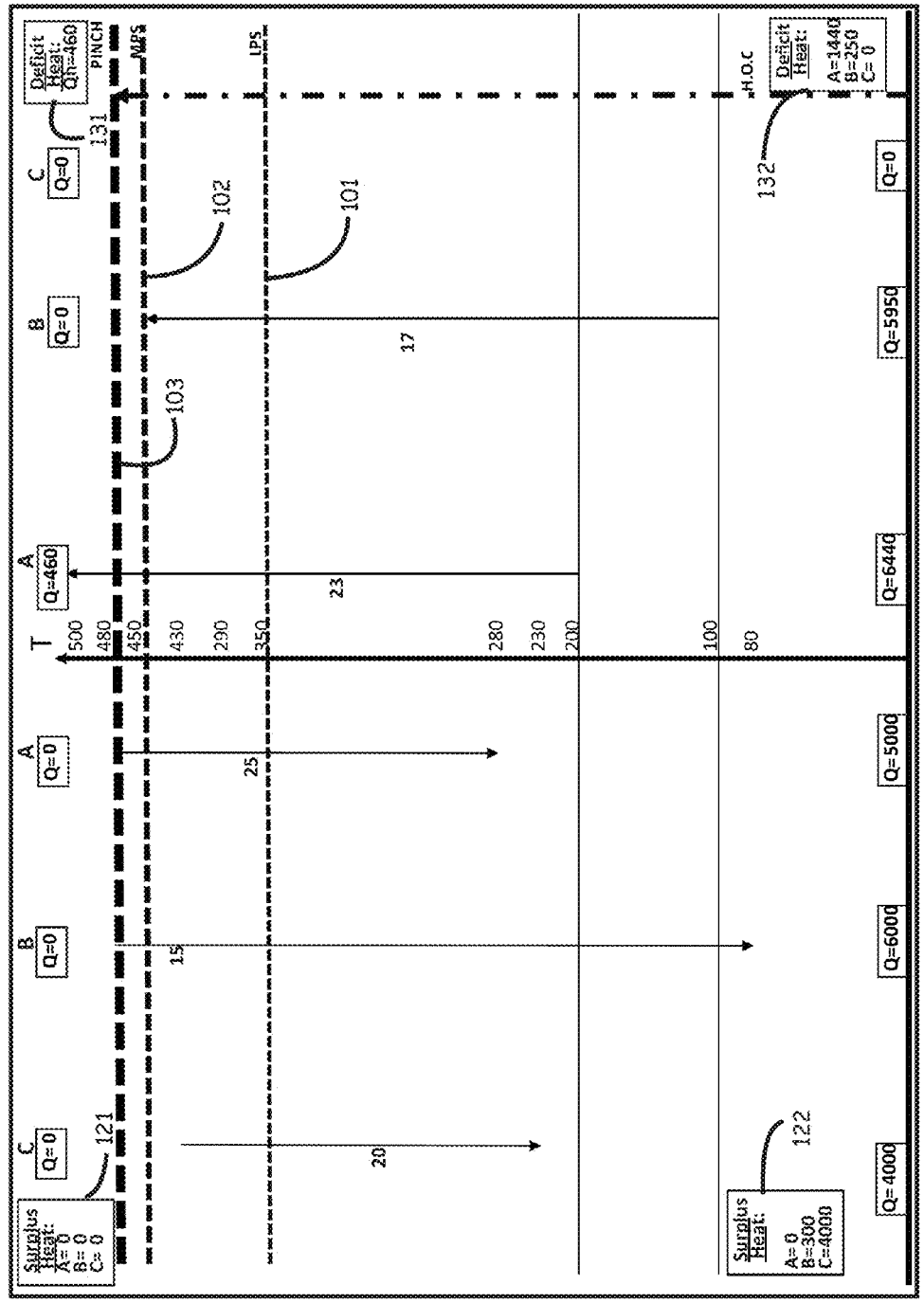
FIG. 37 is a schematic diagram of a graphical user interface illustrating the inclusion of the identified thermal loads for each zone entered in surplus heating load and deficit heating load entry fields according to an embodiment of the present invention.

FIG. 34 illustrates calculating surplus and deficits in the area/zone A below the pinch using the temperature duty diagram. In this example, zone A has a deficit of 1440 kW. FIG. 35 illustrates calculating surplus and deficits in zone B below the pinch using the temperature duty diagram. In this example, zone B has a deficit of 250 kW. FIG. 36 illustrates calculating surplus and deficits in zone C below the pinch using the temperature duty diagram. In this example, zone C is a surplus of 4000 kW. FIG. 37 illustrates FIG. 33 after the addition of the thermal load for each zone being entered in the surplus heating load 122 and deficit heating load 132 entry fields.

Phase II—Energy Targets Identification for Direct and Indirect Inter-Processes Integration Phase, Hybrid Inter-Systems Integration Matching Procedures According to an exemplary embodiment, the process of identifying thermal loads sharing can include analyzing a problem-wide temperature duty diagram for direct, indirect, and hybrid matching procedures, for example, can include the following steps shown in the table below:

| | |
|---|---|
| Step 1 | Construct the Cold Composite Line (CCL). |
| Step 2 | Construct the Hot Composite Line (HCL) with embedded ΔT_min for specific Zone, Block, Facility, Plant, Process and Stream. |
| Step 3 | Locate the problem-wide best/desired pinch and the pinch-location controlling process. |
| Step 4 | Mark the desired level of energy target(s) for heating utility or cooling utility or both on the temperature Duty Diagram (TDD). |
| Step 5 | Draw the above the pinch section of the TDD. |
| Step 6 | Identify the thermal load to be recovered from zones, or blocks, or facilities, or plants, or processes thru employment of matching schemes, to reach desired target. |
| Step 7 | Repeat steps 5 and 6 for the below the pinch section. |
| Step 8 | If alternatives exist for reaching desired energy target(s) use ones which enable a merge between above the pinch and below the pinch. |

According to steps 1-3, cold and hot composite lines are constructed and the problem-wide best/desired pinch and pinch location controlling process is identified, as described previously. In step 4, the theoretically desired level of energy target(s) for heating utility or cooling utility or both is imported or otherwise marked/annotated on the temperature duty diagram. According to steps 5 and 7, the above the pinch and below the pinch sections of the temperature duty diagram are drawn.

According to step 6, the thermal load to be recovered from the zones, blocks, facilities, plants, or processes is identified through utilization of matching schemes employing direct and/or indirect means, using steam and/or hot oil, to reach the desired target. According to the exemplary configuration, a matching scheme or schemes is/are selected that satisfy the above pinch "surpluses" and "deficiencies" and below the pinch "deficiencies" and "surpluses" in a way that the result does not exceed the calculated Qh and Qc. Alternatively, the decision maker may decide the level of energy he/she wants to forgo, for example, due to capital, operability or other reasons. Analysis tools using simulation and other economic models can be used by designer/decision maker to evaluate the alternatives to save energy versus the capital cost and other processes objectives to decide at the end if it is worthwhile to save all the possible energy indicated or only a portion of it, and if so, what portion to ignore. The surpluses and deficiencies calculations in the temperature duty diagram can give/guide to the decision maker as to which portions to ignore. For example, instead of integrating plant C with plant A and plant B, as shown, for example, in FIG. 38, the decision-maker can choose to integrate plant C with only plant A.

According to step 8, if alternatives exist for reaching desired energy target(s), use ones which enable the merge between above the pinch and below the pinch. For example, if the direct integration among plants above the pinch shown calls for integrating plant A with plant B, when performing the integration evaluation, additional consideration may be warranted to evaluating options for direct integration to also integrate plant A with plant B below the pinch.

In order to reach the desired energy target (s), indirect matching may be necessary and/or desired due to non-thermodynamic considerations. The process is similar to that with respect to direct integration, with the exception that rather than identifying best plant-to-plant matches, for example, the analysis will look to identify the number of hot oil circuits and/or steam headers. Analysis for the purposes of indirect matching can include: defining indirect load integration from plant-to-plant or process-to-process or stream-to-stream; drawing the temperature duty diagram for indirect integration load both above and below the pinch to represent a plant, process, or set of streams, etc., to thereby identify best matching/number of circuits/number of steam headers, or all of them (hybrid). If advanced matching technique, e.g., hot with hot, cold with cold, cold switched to hot and returned back to cold and so on, are feasible due to forbidden direct matching between zones, plants, processes, etc., use the temperature duty diagram again for the indirect integration load on process-to-process and stream-to-stream levels/basis" above and below the pinch" to find best hybrid solutions.

Phase III—Matching Method and Generation of Solution Alternatives Phase

The matching method and generation of solution alternatives phase is described with reference to FIGS. 33-50. The phase III process includes application of the direct inter-systems energy integration solution finding module 67 and technique. It can be seen from, e.g., FIGS. 33 and 37, that the total thermal load for direct, indirect, or hybrid inter-processes integration (described below) is 460 kW above and 2610 kW below the problem-wide pinch, as shown from the deficit and surplus entry fields 121, 122, 131, 132.

Phase III—Direct Inter-Systems Energy Integration Solution Finding

Figure 38:
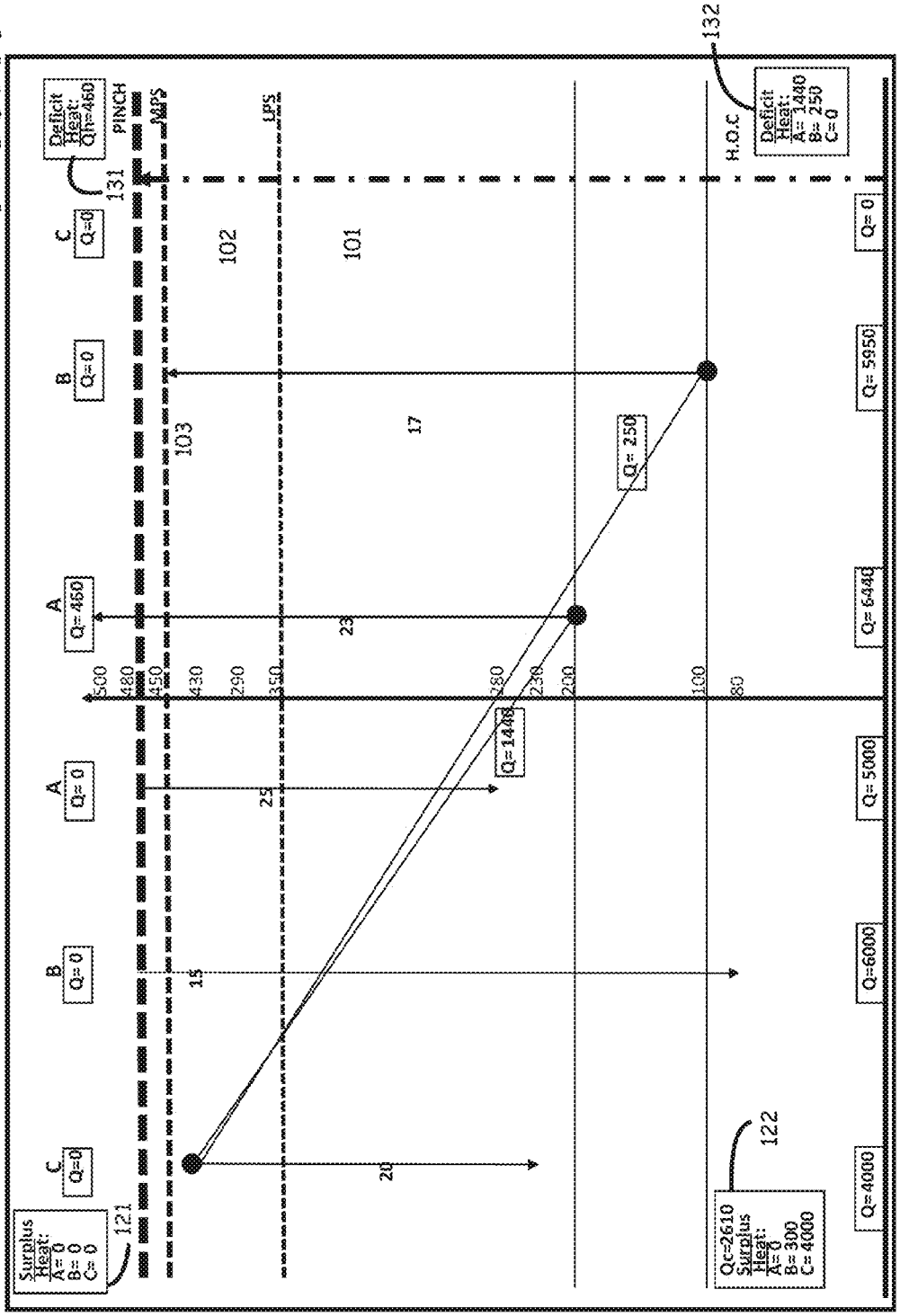
FIG. 38 is a schematic diagram of a graphical user interface illustrating a load matching scheme according to an embodiment of the present invention.
Figure 39:
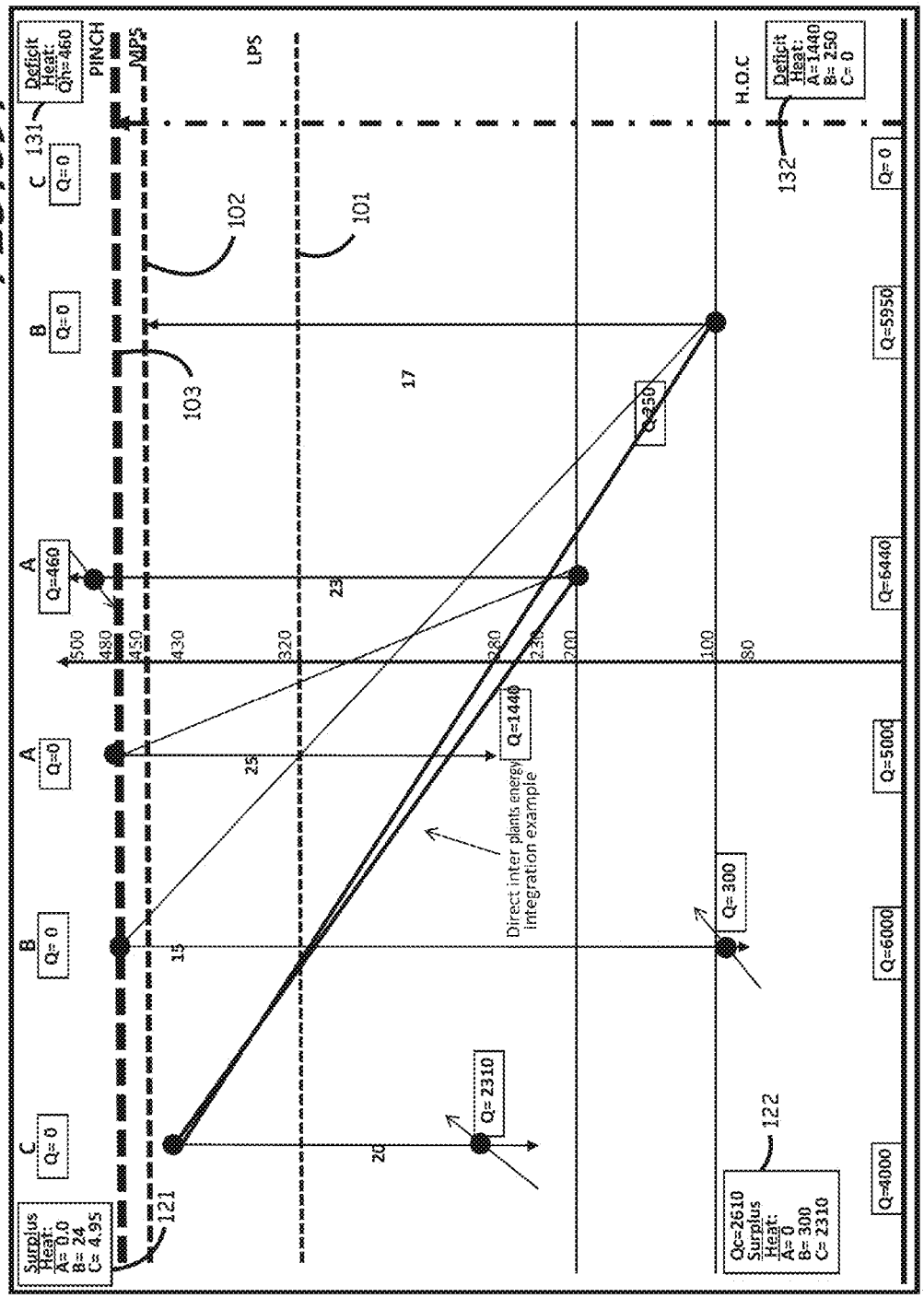
FIG. 39 is a schematic diagram of a graphical user interface illustrating direct inter-processes solution finding using a temperature duty diagram according to an embodiment of the present invention.

The temperature duty diagram could also be used graphically to display and help assist in evaluating certain matching alternatives. FIG. 38 illustrates an exemplary direct inter-systems "matching loads" calculation for initial solutions finding for an industrial site. For example, the figure illustrates a direct matching scheme whereby surplus in zone/plant C can be applied to zone/plant A and/or B and the surplus in zone/plant B, or stated in reverse, the deficit in zone/plant A can be obtained from zone/plant C and the deficit in zone/plant B can be obtained from zone/plant C. FIG. 39 illustrates the corresponding intra-zone/plant connections between the hot and cold streams of zone/plant A and the hot and cold streams of zone/plant B. The temperature duty diagram shows that to achieve maximum saving, at least two connections are required below the pinch. Any good impact of only two connections below the pinch shall include inter-processes integration of zone/plant C with zone/plant A and B below the pinch.

Phase III—Hybrid Inter-Systems Energy Integration

The phase III process includes application of the hybrid inter-systems energy integration solution finding module 68 and technique. By way of example, assume the decision maker has decided or approved the desired energy targets, desired processes conditions; desired stream-specific minimum approach temperatures and we ended up with the following 3 zones or facilities or plants or processes or units streams details:

| Zone # | Stream type | Ts | Tt | FCp |
|---|---|---|---|---|
| A | Hot | 300 | 60 | 0.3 |
| A | Hot | 70 | 69 | 25 |
| A | Cold | 30 | 300 | 0.3 |
| A | Cold | 35 | 100 | 0.25 |
| A | Cold | 139 | 140 | 30 |
| B | Hot | 500 | 120 | 0.25 |
| B | Cold | 139 | 500 | 0.15 |
| B | Cold | 20 | 250 | 0.1 |
| C | Hot | 120 | 119 | 15 |
| C | Hot | 200 | 30 | 0.2 |
| C | Cold | 110 | 160 | 0.25 |
| C | Cold | 200 | 201 | 25 |

Also assume a $\Delta T\_min=10$, for simplicity.

Figure 40:
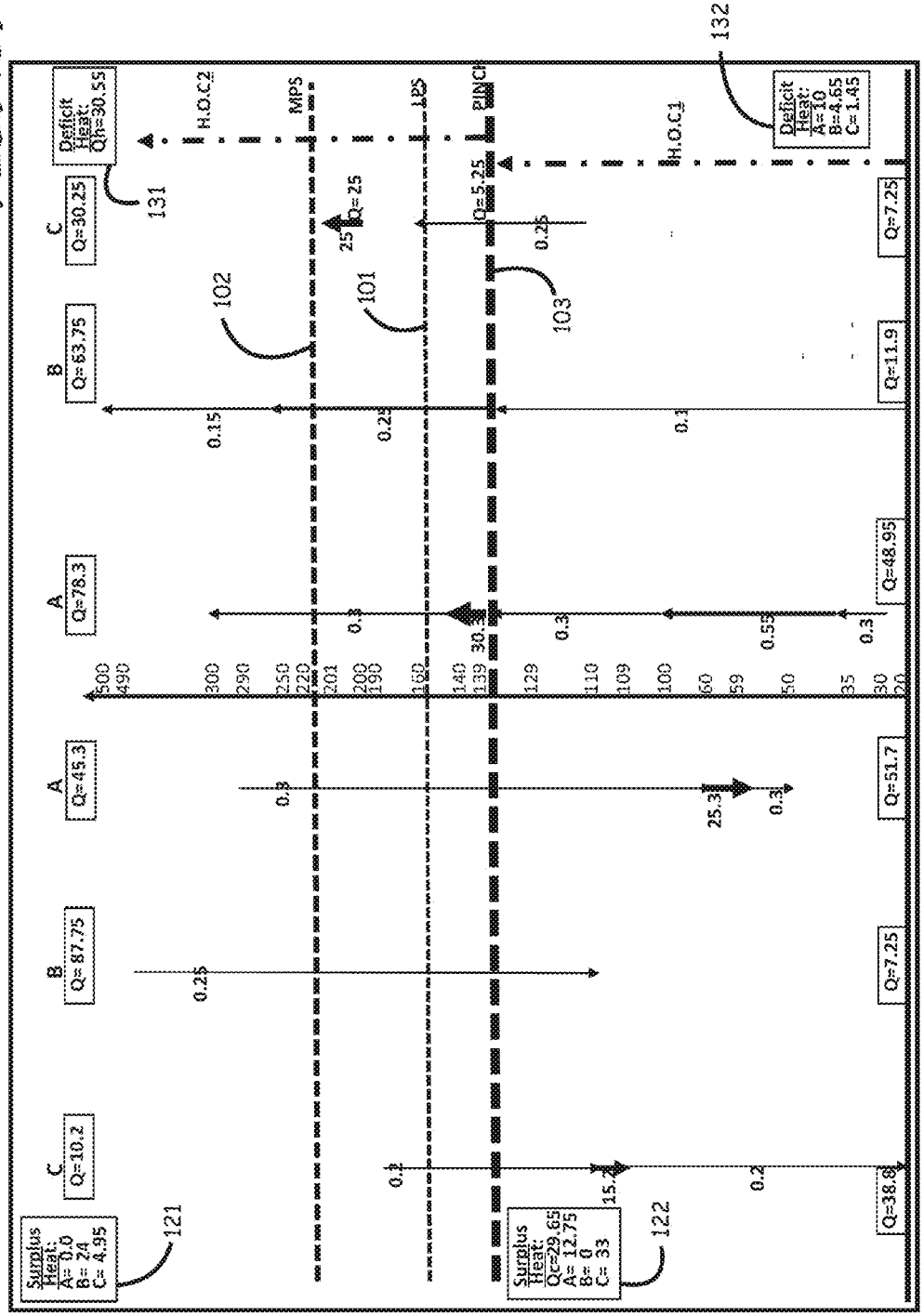
FIG. 40 is a schematic diagram of a graphical user interface illustrating a temperature duty diagram having hot and cold composite lines according to an embodiment of the present invention.

FIG. 40 illustrates the temperature duty diagram constructed according to a description provided in one or more of the previous sections. Note, a small deficit in zone C can be ignored as a penalty in energy consumption or it can be shifted to the zone B deficit. The deficit in "B" will be satisfied from surpluses in "C" or "C" and "A." Any deficit below the problem-wide pinch, if not satisfied from surpluses, will need a heating medium—becoming a double energy penalty. Other heating and cooling utilities of the global problem will increase by such energy penalty. The same is also applicable above the problem-wide pinch. Any surplus heat not exchanged with deficit heat will need cooling medium above the problem-wide-pinch and double penalty occurs.

Figure 41:
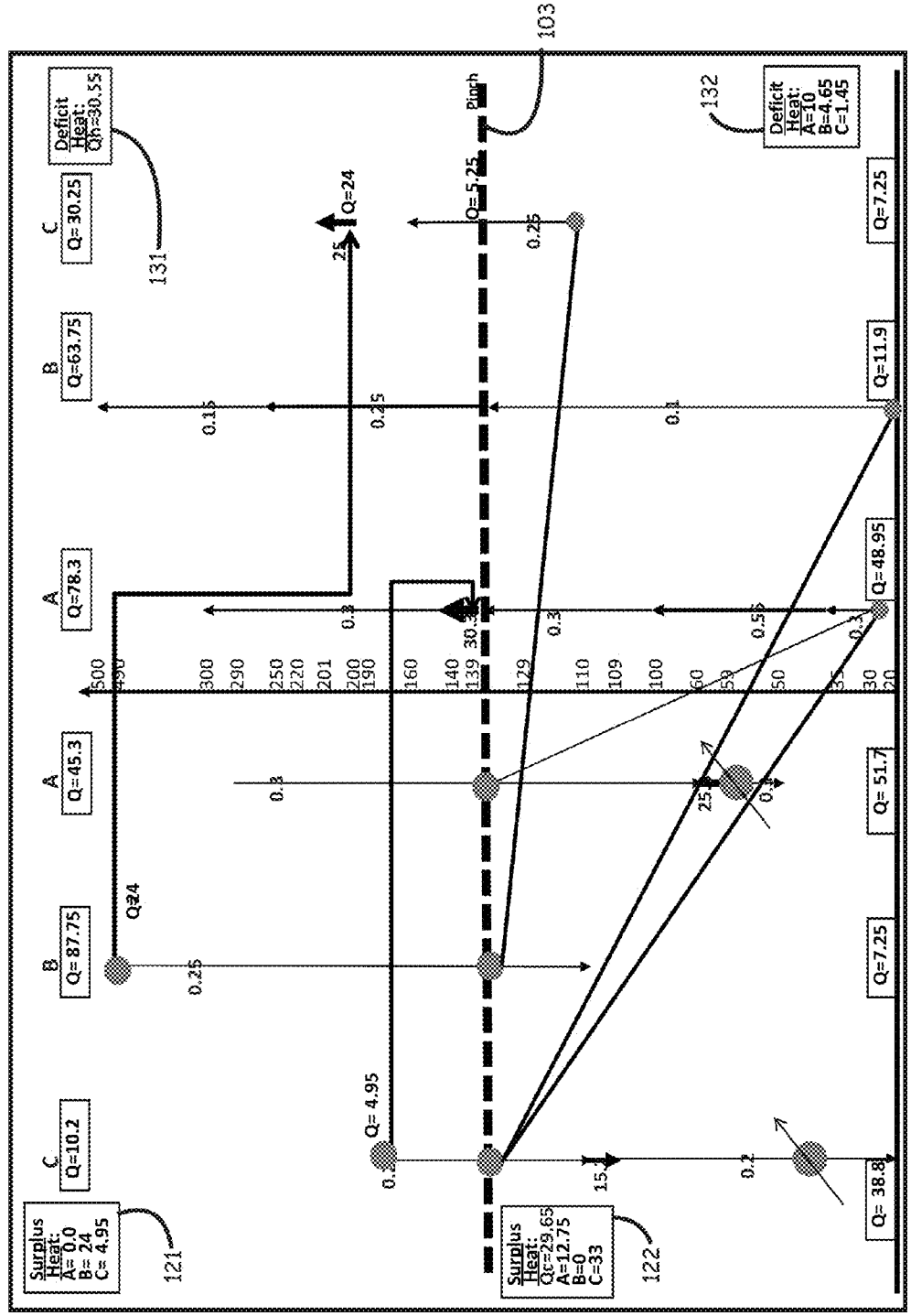
FIG. 41 is a schematic diagram of a graphical user interface illustrating a first option for direct inter-processes integration according to an embodiment of the present invention.

FIG. 41 illustrates a first option for direct inter-system integration. In this example, the surplus in "C" below the pinch is applied to "A" or "B" and surplus in "B" is applied to "C", and stated in the reverse, the deficit in "A" can be obtained from "C", the deficit in "B" can be obtained from "C" and the deficit in "C" can be obtained from "B." As can be seen from the options, to achieve maximum saving, five connections are required, two above the pinch and three below the pinch. Any good impact of only two connections includes inter-system integration of "B" above the pinch and "A" below the pinch. Any good impact of only three connections includes inter-systems integration of "B" above the pinch and "A" and "B" below the pinch.

Figure 42:
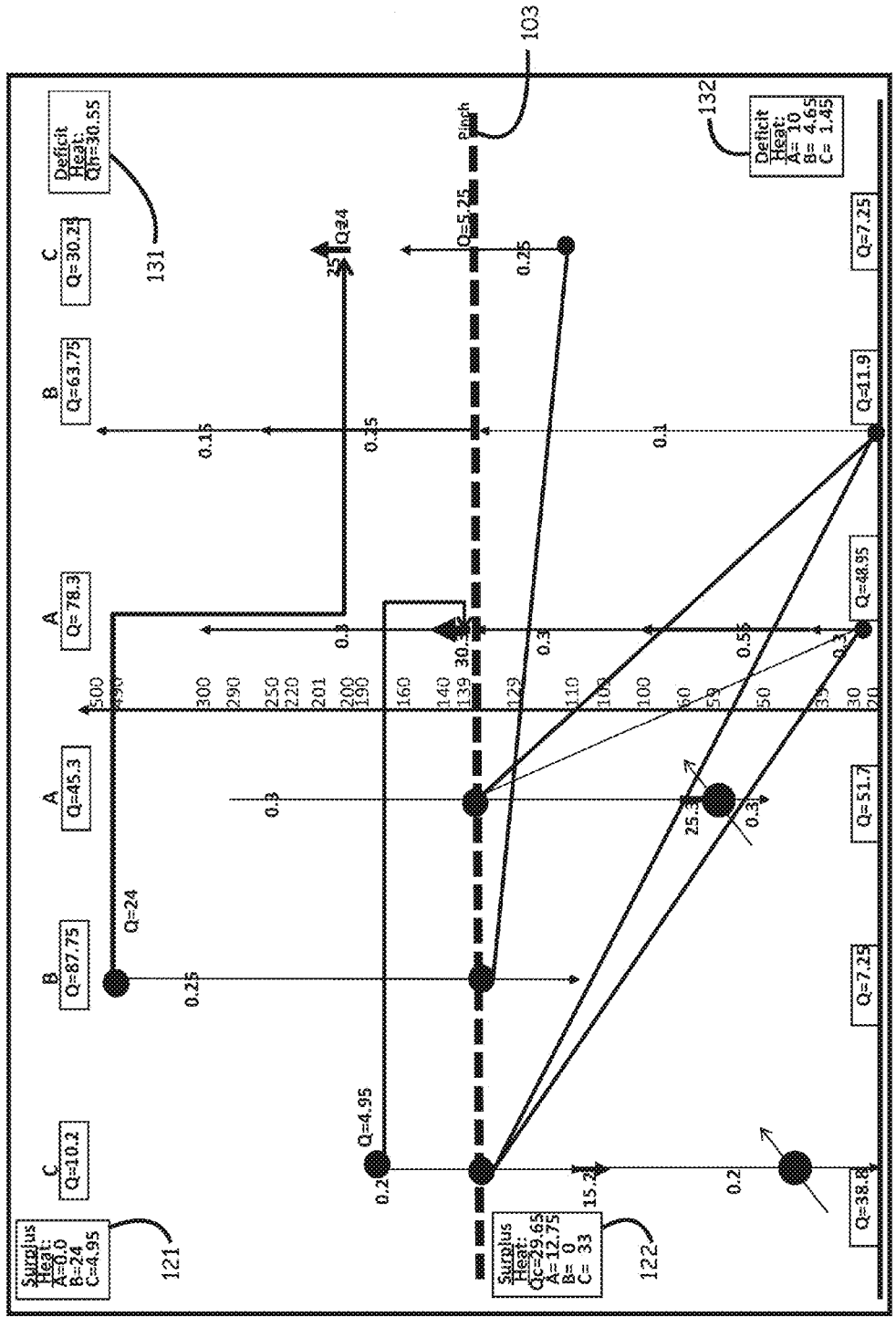
FIG. 42 is a schematic diagram of a graphical user interface illustrating a second option for direct inter-processes integration according to an embodiment of the present invention.

FIG. 42 illustrates a second option for direct inter-system integration. In this example, surplus in "A" below the pinch is applied to "B."

Figure 43:
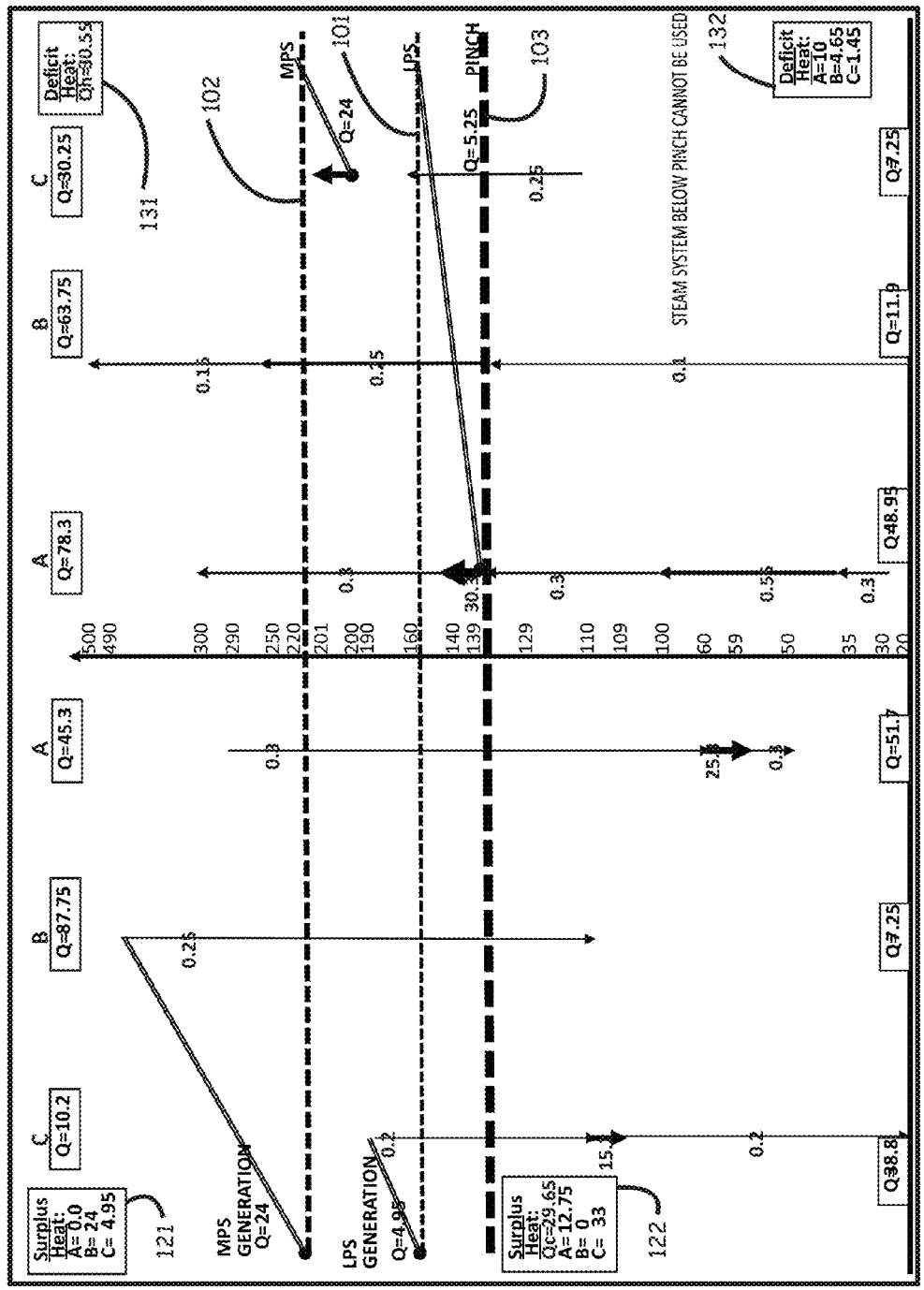
FIG. 43 is a schematic diagram of a graphical user interface illustrating indirect inter-processes integration using steam above the pinch according to an embodiment of the present invention.

FIG. 43 illustrates indirect inter-integration using a steam system above the pinch. In this example, MPS and LPS can be used as buffer to replace the direct "B"–"C" and "C"–"A", connections shown in FIGS. 41 and 42, thereby forming a hybrid system utilizing a combination of direct and in direct inter-system integration.

Phase III—Indirect Integration Using Hot Oil Circuit(s) Final Solution

Figure 44:
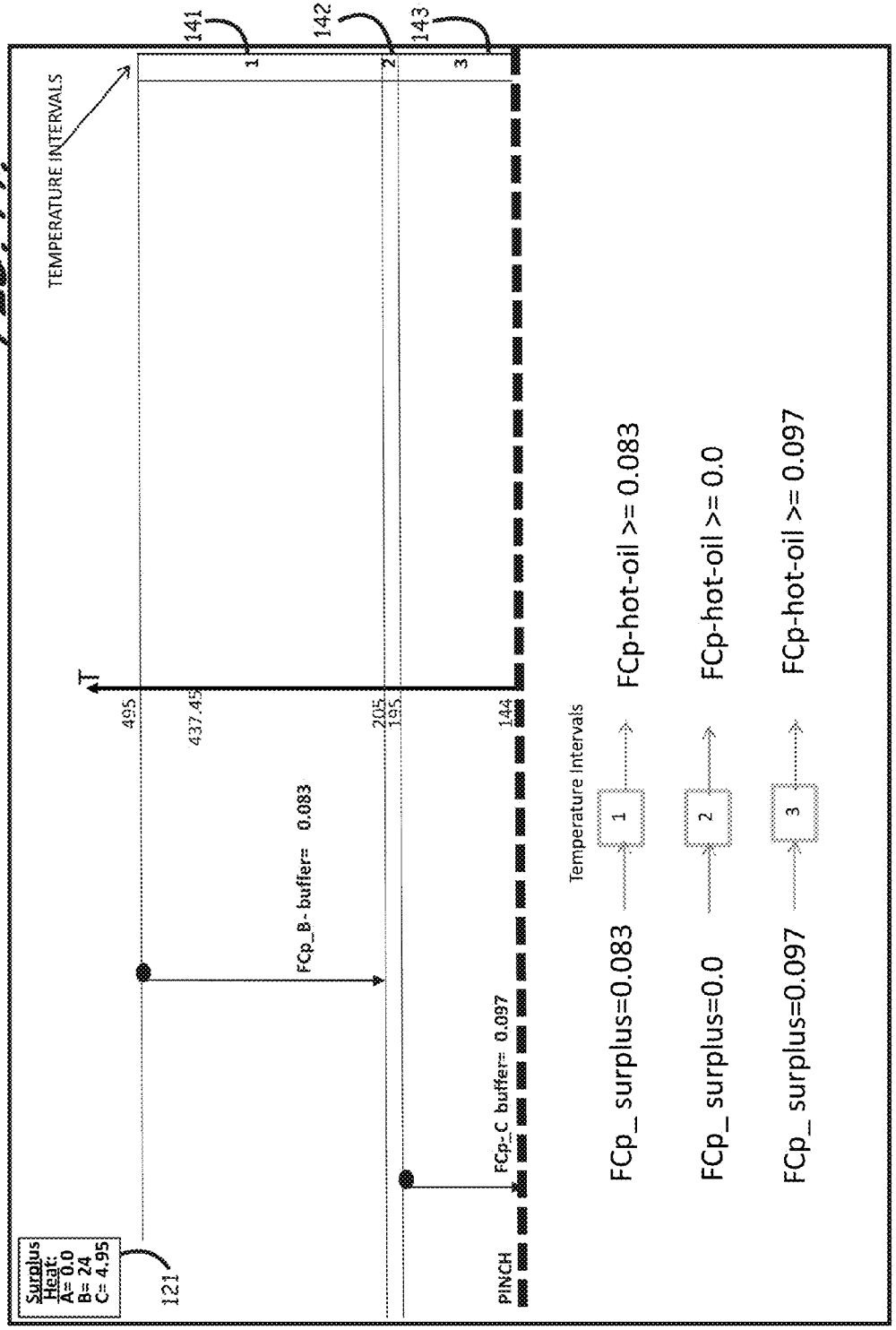
FIG. 44 is a schematic diagram of a graphical user interface illustrating identification of temperature intervals and their operational parameters for calculating the number of hot oil circuits according to an embodiment of the present invention.
Figure 45:
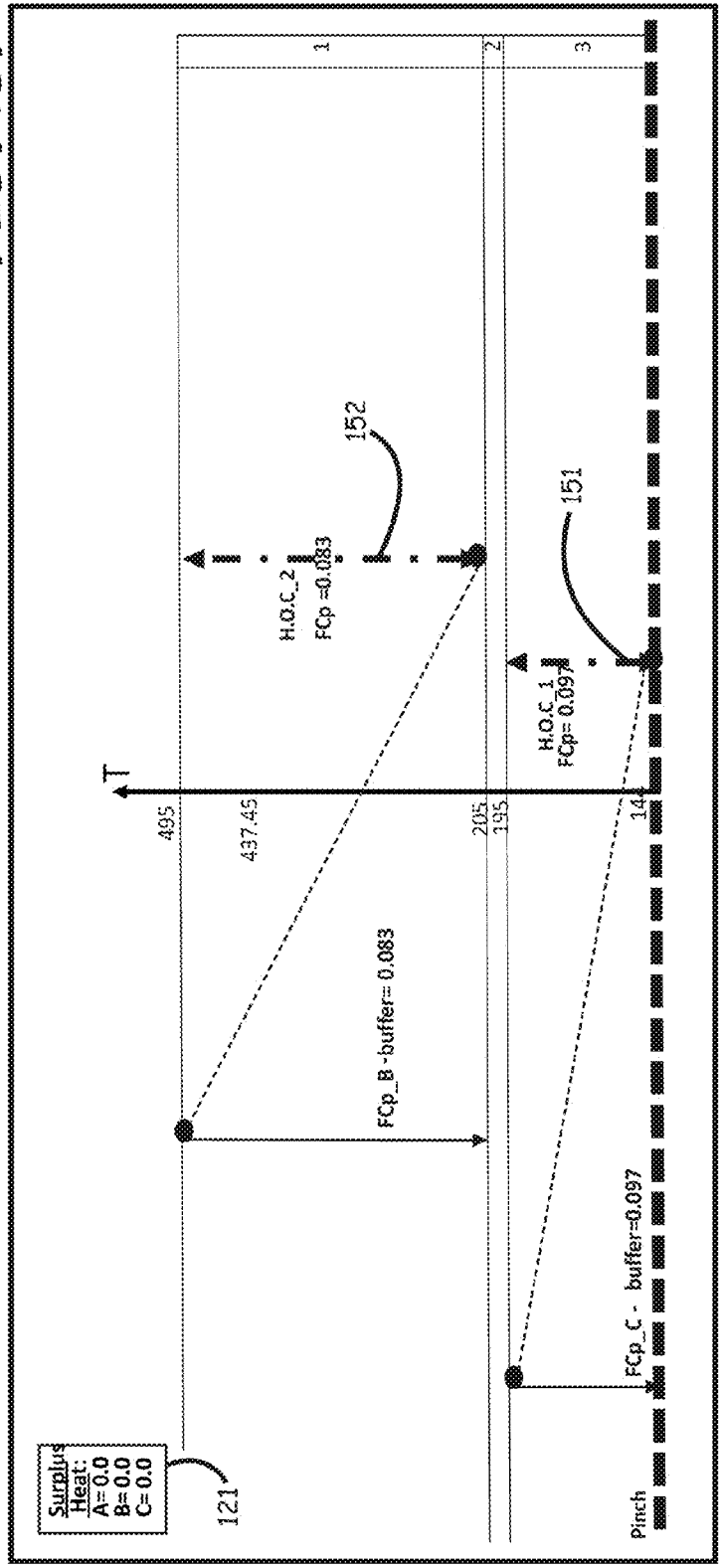
FIG. 45 is a schematic diagram of a graphical user interface illustrating identifying hot oil circuits for each temperature step of FIG. 44 according to an embodiment of the present invention.
Figure 46:
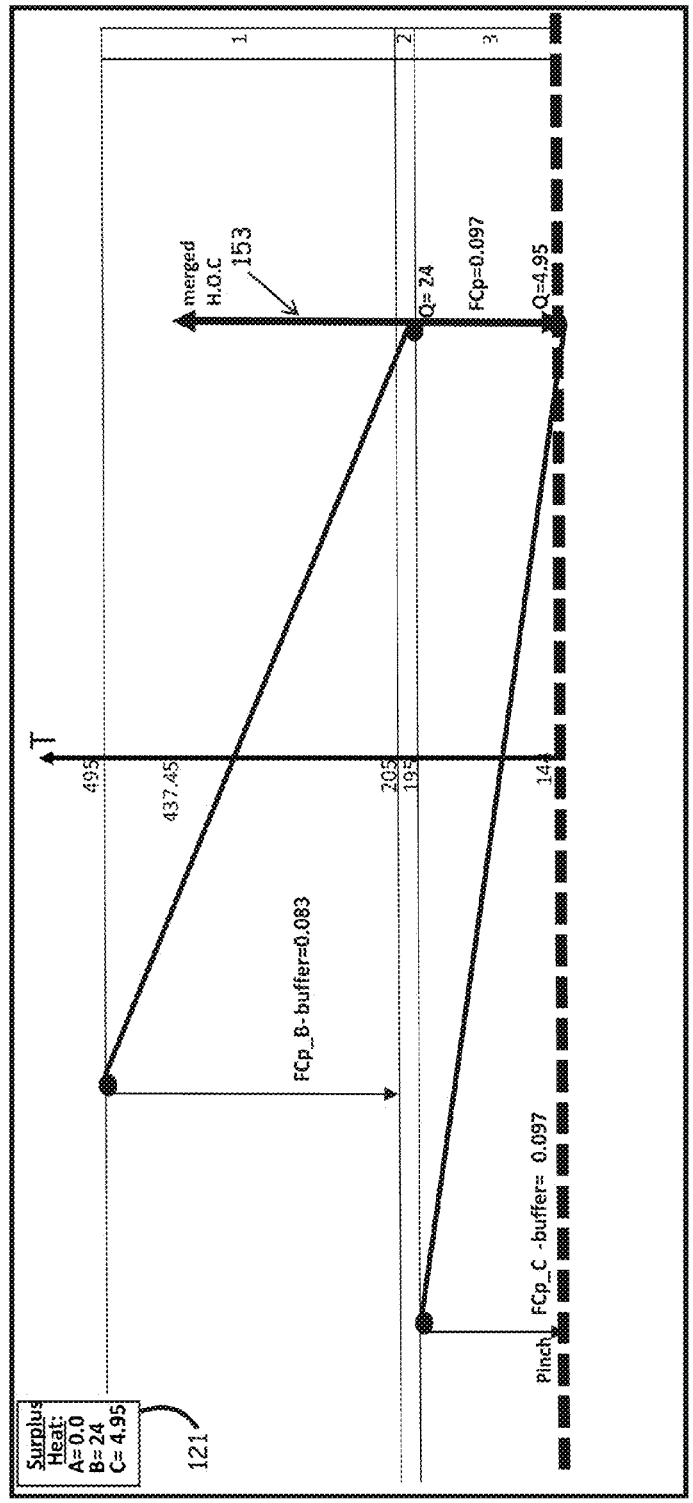
FIG. 46 is a schematic diagram of a graphical user interface illustrating merging of hot oil circuits according to an embodiment of the present invention.

FIGS. 44-46 provide an example of indirect integration using a hot oil circuits final solution above the pinch. In the exemplary embodiment, rather than utilizing MPS and LPS steam headers as a buffer, shown in FIG. 43, one or more hot oil circuits can be employed. FIG. 44 illustrates determining the heat capacity flow rate (FCp) of each temperature interval 141, 142, 143. FIG. 45 illustrates identifying a corresponding hot oil circuit 151, 152, for each temperature interval 141, 142, 143, having a positive value in order to determine the desirable number of hot oil systems. Notably, it is shown that two hot oil systems 151, 152, will provide the desired methodology for performing inter-system integration.

FIG. 46 illustrates merging the two hot oil systems 151, 152 into a single hot oil system 153, using the FCP hot oil circuit 151 extending immediately above the pinch, which has an FCP equal to 0.097, the FCP of the resulting merged circuit. This example illustrates that only one hot oil system needs to be utilized. However, as shown in this figure, if we need two circuits and we succeeded to merge them in one, we lose energy quality in form of a temperature degradation of hot oil (495 F to 437 F) and we may lose the hot oil capability to heat up the cold streams. Further, if the FCP-surplus adjacent and just above the pinch is not the highest among the hot oil circuits desired to be merged, in most cases, more than one hot oil circuit will be required due to the degradation in temperature of the hot oil. That is, the degradation may prevent the hot oil circuit from transferring its acquired energy back to the cold streams.

The minimum number of hot oil circuits is two: one above and another below the pinch (not shown in FIGS. 44-46). However, such configuration cannot achieve the desired maximum saving. The maximum number of hot oil circuits to achieve the desired maximum saving is five, two above and three below.

Phase III—Additional Insights Gained from the Temperature Duty Diagram

According to the exemplary embodiment, additional insights can be gained from utilization of the temperature duty diagram includes, for example, economically evaluating multiple combinations of direct and indirect, steam and hot oil inter-system integration scenarios. Additionally, as described in the next section, the diagram can aid in analyzing advanced matching techniques used to achieve energy savings when forbidden matches exist.

Steam and hot oil systems have their pros and cons. The exemplary configuration renders the designer/decision maker extra information regarding the energy saving objective. The entropy calculation may show, in some special examples, that steam usage will not have an advantage, such as, for example, in certain combined heat and power systems which require power generation while satisfying heating demands. In certain systems, a less than desired number of steam headers will result in energy loss, where a corresponding hot oil circuit or circuits will not face the same problem if enough hot oil circuits are instead utilized.

Phase III—Advanced Matching to Find Final Solution

The final solution can be obtained through utilization of the synthesis of central multi-generation utilities system program module 69, which can arbitrate between the direct and hybrid inter-systems energy integration solutions in view of non-thermodynamic constraints to produce and synthesize multiple acceptable utility system topologies providing a current optimal solution and ones with future retrofit in mind.

Figure 47:
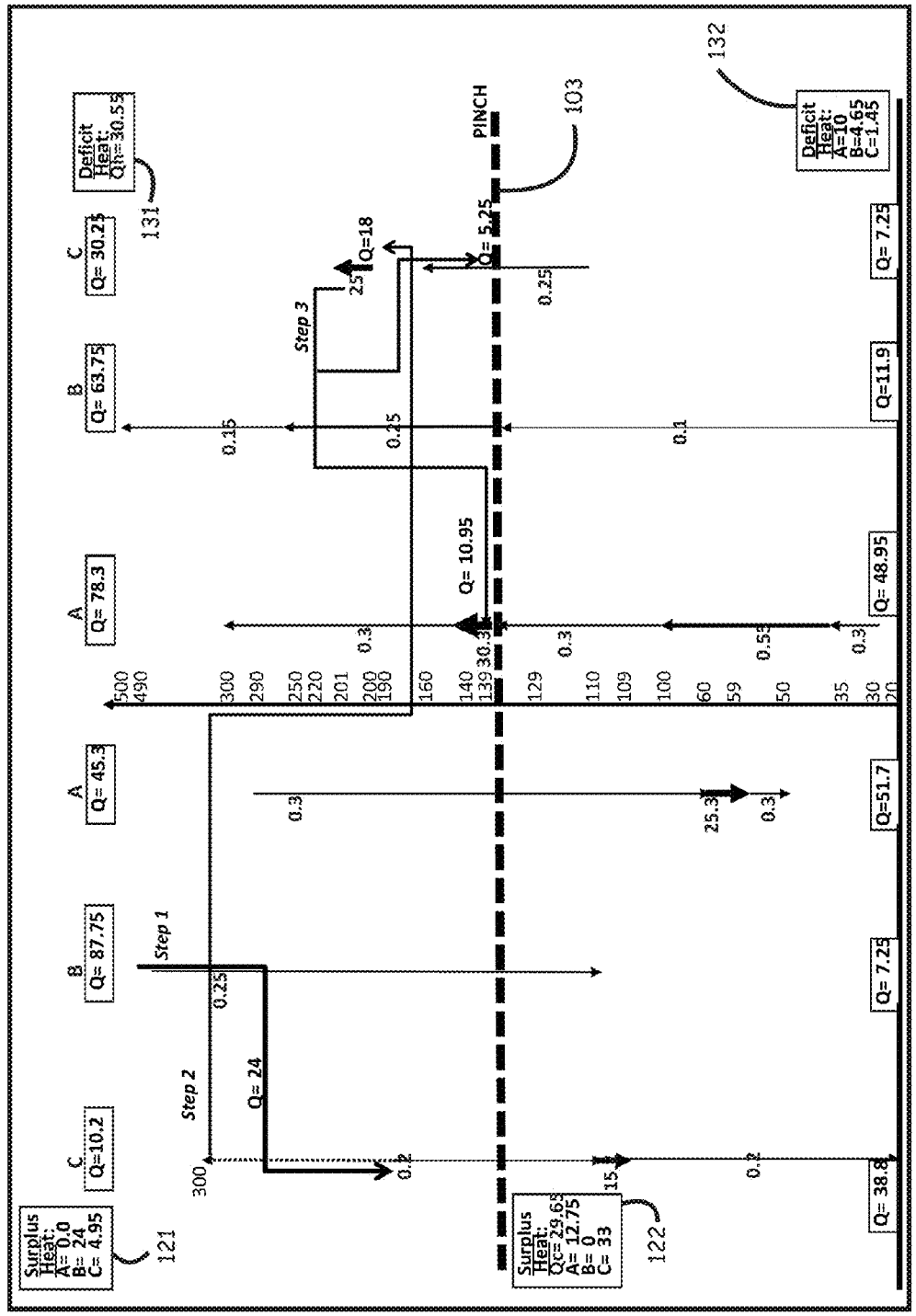
FIG. 47 is a schematic diagram of a graphical user interface illustrating indirect inter-processes integration using an ambassador process/stream as a buffer according to an embodiment of the present invention.

Assume the above described industrial site but with a constraint whereby the zone "B" hot section is not allowed to be matched at high temperature with the zone "C" cold section at high temperature, and the decision-maker has indicated that he/she does do not want to use a new steam or hot oil systems. FIG. 47 illustrates an indirect integration solution using an "ambassador" process/stream as a buffer. According to such solution, rather than matching hot section B with cold section C above the pinch, hot section B is first matched with hot section C (step 1) and then the combined energy now in hot section C is matched with cold section C (step 2). The excess energy is then transferred from cold section C to cold section A (step 3) to obtain the desired energy target. With this advanced matching, the overall heating duty above the pinch is the same. Although it has been increased in zone "C", it has decreased in zone "A."

Figure 48:
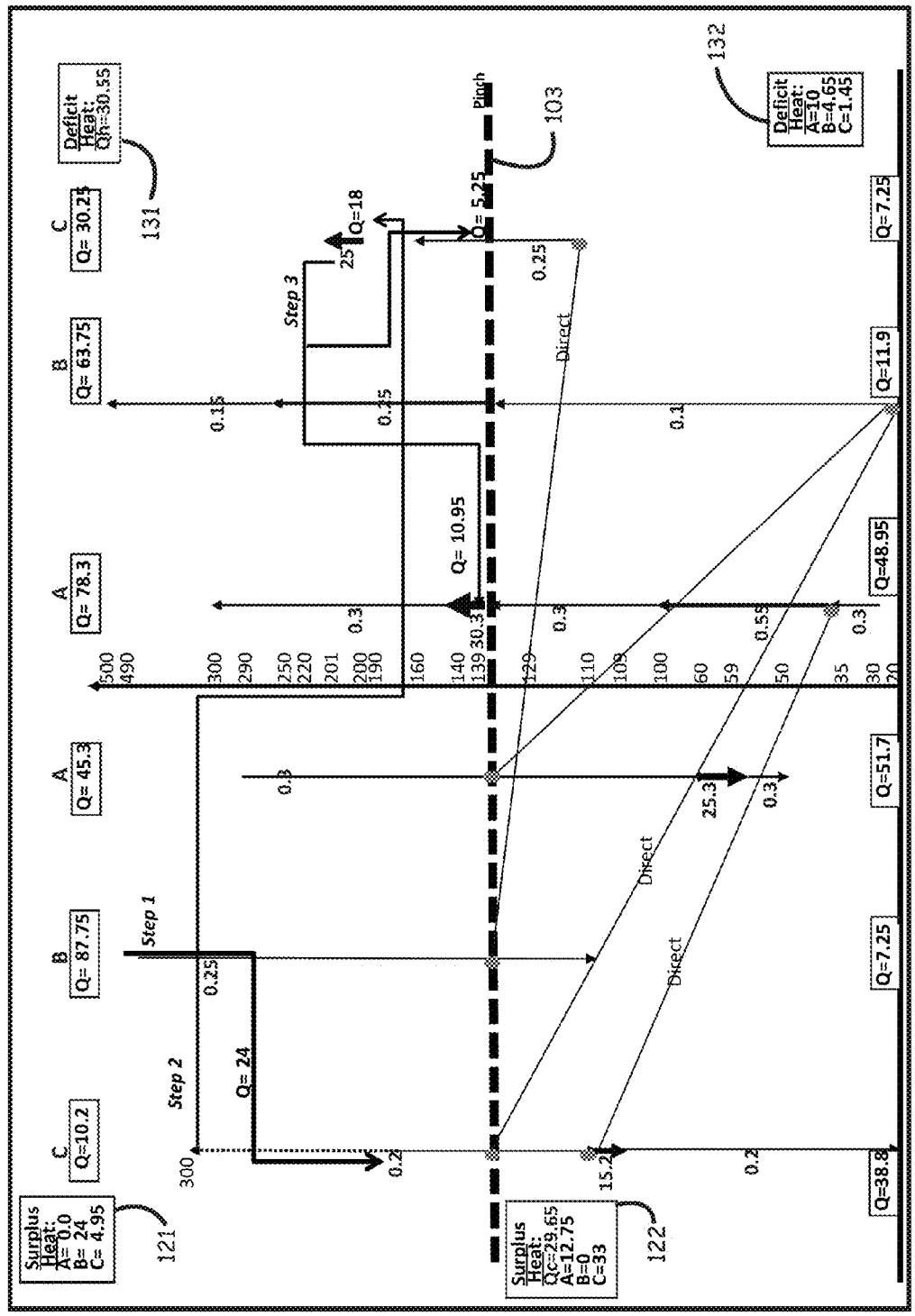
FIG. 48 is a schematic diagram of a graphical user interface illustrating inter-processes integration through stream identity shifting according to an embodiment of the present invention.

FIG. 48 illustrates the hybrid direct and indirect inter-systems integration solution employing both indirect integration utilizing an ambassador (above the pinch 103) and direct integration across zones (below the pinch 103). FIG. 49 illustrates the utilization of direct integration (below the pinch) and full indirect integration above the pinch 103 using MPS and LPS headers 101, 102. FIG. 50 illustrates utilizing only an MPS header 102 to perform the duties of both the MPS and LPS headers 101, 102, in FIG. 49.

Phase III—Utilities-Entropy-Balance Calculations Procedure

According to an exemplary embodiment, the process of matching and generating alternatives analysis can and generally should include analyzing the entropy balance of the representative processes or streams and their combinations, for example, according to the following steps shown in the table below:

| | |
|---|---|
| Step 1 | Specify if the industrial city utility system is allowed to integrate with the community or not. |
| Step 2 | Define the systems boundaries. |
| Step 3 | Determine entropy balance for the all-together direct inter-system energy integration case for each of the systems. |
| Step 4 | Determine entropy balances for each standalone intra-system energy integration cases. |
| Step 5 | Determine the entropy balance for the sum of the entropy balance for each of the standalone systems. |
| Step 6 | Determine entropy balances for each one of the rest of the combinations elements in the total set. |
| Step 7 | Calculate the increase in entropy generation due to the all-in-one inter-systems integration case for each element in the total set of combinations in the total combinations set. |

In step 1, the decision-maker specifies if the industrial city utility system is allowed to integrate with the community or not.

In step 2, the decision-maker determines or approves the systems boundaries, e.g., zones, blocks, facilities, plants, processes, units and streams. The total set of cases for a simple three systems example include: {ABC}; {(A),(B),(C)}; {(A),(BC)}; {(AB),(C)}; {(B),(AC)}.

In step 3, the entropy balance for the all-together direct inter-system energy integration case for three systems, A, B and C, are determined. This is the {ABC} case in this example and is denoted as equation 1 as described in the Phase I, Lab Test C section.

In step 4, the entropy balances for each standalone intra-system energy integration cases are determined, e.g. for (A), (B), (C), formulating three equations 2, 3, 4. According to an embodiment, the grand composite curves of each intra-systems energy integration, described above, can be used to calculate entropy generation for equations 2, 3, 4, and to calculate the inter-systems energy integration entropy generation for equation 1.

In step 5, the entropy balance for {(A)+(B)+(C)} is determined via adding the equations for the standalone intra-system energy integration cases. This equation is denoted as equation 5, and its value indicates the entropy balance for full indirect inter-system integration without any direct inter-systems integration.

In step 6, the entropy balances for each one of the rest of the combinations elements in the total set are determined. In this example, there are three cases {(A),(BC)}; {(AB),(C)}; {(B),(AC)}. For the element {(A),(BC)}, the entropy balance for the combination is calculated by first calculating the entropy balance for (BC) and adding that value to the entropy balance of (A).

In step 7, the increase in entropy generation that would result from the all-in-one inter-systems integration case for each element in the total set of combinations in the total combinations set {ABC} is calculated to determine the increase in entropy due to standalone intra-system integration and indirect inter-systems integration {(A),(B),(C)} solution versus the all-in-one direct inter-systems integration solution {ABC}. In this example, this can be accomplished via subtracting equation 1 from equation 5.

The increase in entropy generation due to indirect integration-direct inter-systems integration comparison can give insights: If entropy generation in equation 1 (the direct inter-systems integration case) is less than that of the equations 2+3+4 (using steam or hot oil as buffer for indirect integration after intra-system integration), then direct inter-systems energy integration can be considered mandatory to achieve the global minimum energy consumption targets and/or to share energy with community and/or to in-situ power generation and/or in-situ steam generation for process applications other than heating purposes. If indirect inter-systems integration is selected by the decision makers for a reason or another, the same calculations for equations 2, 3, 4 are accomplished using first steam and second hot oil system. Upon comparison, one may find that using hot oil, due to its higher entropy generation, the entropy value in equations 2, 3, 4 is less than in the case of using steam. If so, then indirect inter-systems integration using steam is the better choice to achieve desired energy consumption and/or for in-situ power generation.

As a recap, the utilities-entropy-balance calculation, as employed according to the exemplary configuration, provides a plethora of beneficial insights. For example, the insights can be used to determine what technique used for inter-systems integration, i.e., direct or indirect, to achieve the minimum energy consumption selected by the decision-maker, and to confirm the findings of other energy consumption targeting algorithms. The insights can also be used to identify if it is possible to integrate industrial heating and/or cooling with the environment/community, such as through utilization of LPS for heating and/or cooling using absorption chillers, and to what extent/capacity. They can also provide insights as to which of the inter-systems integration methods give me the best synergy with the environment. Other insights include identification of whether direct integration is mandatory to reach specific energy and corresponding greenhouse gas reduction targets, the best combinations for systems inter-integration upon allowing direct and indirect integration among the system set elements, whether indirect integration, using steam, can lead to the same results like all-in-one direct inter-systems integration, and whether indirect integration, using steam is better than indirect using hot oil, or if there is no difference so that the decision-maker may select the method according to other factors including, e.g., availability of water. Further insights include identification of whether indirect integration, using hot oil circuits, can lead to the same results like all-in-one direct inter-systems integration, which indirect method of the potential choices, is more efficient for a specific problem (a steam system or a hot oil system?), and whether it is sensibly favorable to adapt direct inter-systems integration not only to save energy and reduce greenhouse gas emissions, but also to generate more power than by adopting indirect inter-systems integration. One or more of the insights also show that using the energy quantity consumption targeting methods described in literature is not enough for the optimal selection of inter-systems energy integration.

It is important to note that while the foregoing embodiments of the present invention have been described in the context of a fully functional system and process, those skilled in the art will appreciate that the mechanism of at least portions of the present invention and/or aspects thereof are capable of being distributed in the form of a computer readable medium in a variety of forms storing a set of instructions for execution on a processor, processors, or the like, and that various embodiments of the present invention apply equally regardless of the particular type of media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media such as, for example, digital and analog communication links capable of storing the set of instructions, with the exception of those considered to be non-statutory subject matter. Such media can contain, for example, both operating instructions and the operations instructions related to the program code 51, and the computer executable portions of the method steps according to the various embodiments of methods of providing enhanced energy efficiency and reduced greenhouse gas emissions for a mega industrial site through advanced direct, indirect, and hybrid inter-processes integration targeting and solutions generation, described above.

Various embodiments of the present invention have several advantages. For example, various embodiments advantageously provide systems, computer programs, and methods for systematic targeting for hybrid, direct and indirect, inter-processes integration in mega industrial zones/cities which create new opportunities for energy conservation beyond that current state-of-art which depend upon intra-process integration and/or indirect inter-processes integration where waste energy is not optimally recovered using steam or hot oil systems. Various embodiments systematically identify and provide the least number of direct inter-processes integration connections which render best impact on waste energy recovery before taking the decision of resorting to indirect process integration methods using steam, hot oil, and/or tempered hot water systems.

One or more of the embodiments advantageously also or alternatively provide a system, computer program, and systematic method for enhancing energy efficiency and/or greenhouse gas emission reduction beyond what is possible to date using state-of-art technologies via hybrid inter-systems integration that can overcome the problem of $\Delta T\_min$ reduction constraint in standalone units and processes due to its stagnant impact on it. The $\Delta T\_min$ reduction constraint in standalone intra-plant integration, in many situations, is an obstacle to reduce energy consumption along the plants lifetime. In some situations where there is an extra heat load to be transferred such as, for example, if a lower $\Delta T\_min$ is used to reduce thermal load on crude oil heater, the reduction results in accelerated fouling in the heat exchanger(s) before the crude oil heater. In such cases where the hot stream (s) have more load to exchange with cold streams via the reduction in $\Delta T\_min$, and it is not possible to extract such heating load in the same process/plant. According to one or embodiments, inter-plants integration can be employed to utilize such available heating load to save fuel in both plants.

The one or more of the embodiments can advantageously also or alternatively provide a new system, computer program, and systematic method for enhancing energy efficiency and/or greenhouse gas emission reduction beyond what is possible to date using state-of-art technologies via hybrid inter-systems integration that can overcome the problem of intra-units/processes fully-forbidden matches' constraints which is having a negative impact on waste energy recovery. The one or more embodiments can also or alternatively provide new systems, computer programs, and systematic methods for enhancing energy efficiency beyond what is possible to date using state-of-art technologies via hybrid inter-systems integration that can overcome the problem of intra-units/processes partially-forbidden matches' constraints and partially-forbidden matches' constraints in standalone units, which is having a negative impact on waste energy recovery. A partially forbidden match is a special case where there is a limit on the amount of heat that can be extracted. For example, in many cases in industry, the hot products from the chemical reactors due to exothermic reactions have more heat to give to the feed streams to the reactor, but not all of it is used where the reactor feed heater has to have a desired minimum thermal load for better operation and control (e.g., crude oil hydrocracking and Naphtha Hydrotreating plants).

The one or more of the embodiments can advantageously also or alternatively provide systems, computer programs, and systematic methods for enhancing/optimizing energy efficiency and/or greenhouse gas emission reduction via providing hybrid inter-systems integration that can overcome: the problem of $\Delta T\_min$ reduction constraint in standalone units and processes, the problem of intra-units/processes fully-forbidden matches' constraints, the problem of intra-units/processes partially-forbidden matches' constraints, and/or the problem of intra-units/processes partially-forbidden matches' constraints and partially-forbidden matches' constraints in standalone units, having a negative impact on waste energy recovery and/or greenhouse gas reduction for mega industrial cities, zones, blocks, facilities, plants, processes, and/or units, under some or all possible intra-processes' structures and parameters conditions' changes. This can be accomplished, for example: using buffers such as steam, hot oil, tempered water, or a mix of all of them; using a stream, process, plant, facility, block, or zone as an energy-ambassador(s)/carrier(s)); using hot-to-hot, cold-to-cold streams matching; and/or using streams identities switching techniques, and/or, along with streams'-specific $\Delta T\_min$ identification/assignment techniques, to reach desired energy and/or greenhouse gas emissions targets. The desired energy and/or greenhouse gas emissions targets can be a factor of energy efficiency and/or capital and/or operating costs.

The one or more embodiments can also or alternatively include systems, computer programs, and systematic methods for enhancing energy efficiency and/or greenhouse gas reduction via hybrid inter-systems integration that overcome the problems of $\Delta T\_min$ reduction constraints, partially forbidden matches, and/or fully forbidden matches, by identifying when indirect integration using buffers such as steam, hot oil, tempered water, or a mix of all of them and so on are not to be used/recommended, and instead, a stream, process, plant, facility, block, or zone is/are better used as energy-ambassador(s)/carrier(s)) and/or hot-to-hot, cold-to-cold streams matching and/or streams identities switching techniques should be used to reach desired energy and/or greenhouse gas emissions targets.

The one or more embodiments can also or alternatively include matching schemes that overcome the respective problems of $\Delta T\_min$ reduction constraints, partially forbidden matches, and/or fully forbidden matches, which include identifying which plant, as an ambassador, and which stream(s) as ambassadors, can be used to provide a buffer, and/or which hot-to-hot and/or cold-to-cold streams connections should be made, and/or which streams switching techniques should be utilized and on what streams, and/or which set of streams'-specific minimum temperature approach values should be used to reach desired energy and/or greenhouse gas emissions target.

The one or more embodiments can also or alternatively call for the use of steam, hot oil, tempered water and a mix of all of them to provide direct and indirect loads, can define which type of indirect integration to use and its desired thermal load, and/or can identify what is the second best in direct inter-processes integration, third best, fourth best and so on for direct processes, plants and zones integration.

The one or more embodiments can identify when direct inter-system integration is the only option to reach desired energy and greenhouse gas emissions reduction targets, when indirect integration alone can also be used to reach desired energy and greenhouse gas emissions reduction targets, when indirect integration using steam system alone is better than that of hot oil system to reach desired energy and greenhouse gas emissions reduction targets, and when indirect integration using hot oil system alone is better than that of steam system to reach desired energy and greenhouse gas emissions reduction targets. Advantageously, in a single problem, both direct and indirect inter-systems matching can be employed. Further, advantageously, multiple different types of the above described indirect inter-systems matching can be used in conjunction with one or more of the different types of indirect matching and/or in conjunction with direct matching.

The one or more embodiments can perform the above described analyses and provide the above-described advantages to include overcoming one or more or all of the listed problems under the one or more or all of the listed conditions to include overcoming the problems of $\Delta T\_min$ reduction constraints, partially forbidden matches, and/or fully forbidden matches, identifying the appropriate advanced matching techniques, identifying when certain advanced matching techniques are more beneficial than others to include identifying when indirect integration using buffers such as steam, hot oil, tempered water, or a mix of all of them and so on provide the best solution or when steam, hot oil, tempered water, or a mix of all of them and so on are not to be used/recommended, and instead, a stream, process, plant, facility, block, or zone is/are better used as energy-ambassador(s)/carrier(s)) and/or hot-to-hot, cold-to-cold streams matching and/or streams identities switching techniques should be used, identifying the appropriate matching scheme to be utilized under one or more or all of the listed conditions, identifying when steam systems provide a better solution than hot oil and when hot oil systems provide the better solution than steam systems, identifying when direct inter-system integration is the only option to reach the desired listed goals under one or more or all of the listed conditions, identifying when oil is better than steam and vice versa or when both oil and steam should be used for indirect inter-processes integration, and/or identifying when indirect inter-system integration is the only option to reach the desired listed goals under one or more or all of the listed conditions, each with retrofitability in mind, for the sake of more energy conservation and/or greenhouse gas reduction, of any or each unit, process, facility, block and zone, under some or all possible intra-processes' specific structures and parameters conditions' changes. This can advantageously be accomplished, for example, using various techniques including via finding future problem' optimal pinch of the mega industrial unit, process, facility, block, and/or zone, and conducting the current system's analysis and matching.

Advantageously, any or all of the one or more embodiments can perform the above-described analysis and provide the above-described advantages, while exhibiting the best synergy with the mega-industrial community's central multi-generation utilities system.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

APPENDIX 1

The following include related patents and patent applications each incorporated herein by reference in its entirety: U.S. patent application Ser. No. 13/757,467, filed Feb. 1, 2013, titled "Methods For Simultaneous Proceeds and Utility Systems Synthesis in Partially and Fully Decentralized Environments"; U.S. application Ser. No. 13/757,491, filed Feb. 1, 2013, titled "Systems and Computer Programs For Simultaneous Process and Utility Systems Synthesis in Partially and Fully Decentralized Environments"; U.S. Application No. 61/612,470, filed Mar. 19, 2012, titled "Systems, Method, and Computer Program for Simultaneous Processing Utility Systems Synthesis in Partially and Fully Decentralized Environments"; U.S. application Ser. No. 12/480,415, filed Jun. 8, 2009, titled "System, Program Product, and Related Methods For Global Targeting of Process Utilities Under Varying Conditions"; U.S. patent application Ser. No. 12/767,315, filed Apr. 26, 2010, titled "System, Method, and Program Product for Synthesizing Heat Exchanger Networks and Identifying Optimal Topology for Future Retrofit"; U.S. patent application Ser. No. 12/767,275, filed Apr. 26, 2010, now U.S. Pat. No. 8,116,920, titled "System, Method, and Program Product for Synthesizing Non-Thermodynamically Constrained Heat Exchanger Networks"; U.S. patent application Ser. No. 12/767,217, filed Apr. 26, 2010, now U.S. Pat. No. 8,032,262 titled "System, Method, and Program Product for Synthesizing Non-Constrained and Constrained Heat Exchanger Networks"; U.S. Patent Application No. 61/256,754, filed Oct. 30, 2009, titled "System, Method, and Program Product for Synthesizing Non-Constrained Heat Exchanger Networks and Identifying Optimal Topology For Future Retrofit"; U.S. Application No. 61/256,754, filed Apr. 26, 2010, titled "System, Method, and Program Product for Synthesizing Heat Exchanger Networks and Identifying Optimal Topography for Future Retrofit"; U.S. patent application Ser. No. 12/575,743, filed Oct. 8, 2009, now U.S. Pat. No. 7,729,809, titled "System, Method, and Program Product for Targeting and Identification of Optimal Process Variables in Constrained Energy Recovery Systems"; U.S. patent application Ser. No. 11/768,084, filed Jun. 25, 2007, now U.S. Pat. No. 7,698,022 titled "System, Method, and Program Product for Targeting an Optimal Driving Force Distribution in Energy Recovery Systems"; U.S. Patent Application No. 60/816,234, filed Jun. 23, 2006, titled "Method and Program Product for Targeting and Optimal Driving Force Distribution in Energy Recovery Systems"; U.S. patent application Ser. No. 12/715,255, filed Mar. 1, 2010, U.S. Pat. No. 7,873,443, titled "System, Method, and Program Product For Targeting and Optimal Driving Force Distribution in Energy Recovery Systems"; U.S. patent application Ser. No. 12/898,461, filed Oct. 5, 2012, now U.S. Pat. No. 8,116,918, titled "Systems, Program Product, and Methods for Synthesizing Heat Exchanger Networks that Exhibit Life-Cycle Switchability and Flexibility Under all Possible Combinations of Process Variations"; U.S. patent application Ser. No. 12/898,484, filed Oct. 5, 2010, now U.S. Pat. No. 8,364,327, titled "Systems, Program Product, and Methods for Targeting Optimal Process Conditions that Render an Optimal Heat Exchanger Network Design Under Varying Conditions"; U.S. patent application Ser. No. 12/898,475, filed Oct. 5, 2010, now U.S. Pat. No. 8,311,682, titled "Systems, Program Product, and Methods for Synthesizing Heat Exchanger Networks that Account for Future Higher Levels of Disturbances and Uncertainty, and Identifying Optimal Topology for Future Retrofit"; U.S. patent application Ser. No. 13/041,057, filed Mar. 4, 2011, now U.S. Pat. No. 8,150,559, titled "Systems and Program Product For Heat Exchanger Network Energy Efficiency Assessment and Lifetime Retrofit"; U.S. patent application Ser. No. 13/041,087, filed Mar. 4, 2011, now U.S. Pat. No. 8,150,560, titled "Methods For Heat Exchanger Network Efficiency Assessment and Lifetime Retrofit."

The invention claimed is:

1. A computer-assisted method of providing enhanced energy efficiency and reduced greenhouse gas emissions for a mega industrial site, the method comprising the steps of:

analyzing, with the assistance of a computer, a plurality of possible inter-processes energy integration combinations between a plurality of functional areas of a mega industrial site, the plurality of functional areas comprising one or more of the following: a plurality of zones, a plurality of blocks, a plurality of facilities, a plurality of plants, and a plurality of units of the mega industrial site, each including a plurality of resource streams, the resource streams comprising one or more cold streams to be heated or one or more hot streams to be cooled, the inter-process energy integration combinations being analyzed including those using direct inter-processes energy integration employing one or more of the resource streams as a buffer, indirect inter-processes energy integration employing only water, steam or hot oil buffer systems as a buffer, and a combination of both direct and indirect inter-processes energy integration defining hybrid inter-processes energy integration employing one or more of the resource streams as a buffer and one or more of water, steam or hot oil buffer systems as a buffer; and determining, with the assistance of the computer, when direct inter-processes energy integration, indirect inter-processes energy integration, or hybrid inter-processes energy integration provides for a greater total energy recovery for the mega industrial site;

providing, for display, data indicative of when a direct inter-processes energy integration, an indirect inter-processes energy integration, or a hybrid inter-processes energy integration provides for a greater total energy recovery for the mega industrial site to assist in identifying the combination of the plurality of possible inter-processes energy integration combinations providing for an optimal solution for total waste heat recovery between the respective functional areas to define an optimal inter-processes energy integration combination;

generating a plurality of technically viable energy efficient industrial site inter-processes heat exchange system design alternatives;

identifying the industrial site inter-process heat exchange system design having an inter-processes connection and matching scheme providing a balance between most efficient waste heat recovery and capital cost allocation; and providing, for display, data indicative of the industrial site inter-process heat exchange system design having an inter-processes connection and matching scheme providing a balance between most efficient waste heat recovery and capital cost allocation.

2. A method as defined in claim 1, wherein the optimal inter-processes energy integration combination includes indirect inter-processes energy integration, the method further comprising the steps of:

determining when one or more water or steam buffers provides a greatest energy recovery for indirect inter-processes energy integration over a corresponding one or more hot oil circuits; and determining when one or more hot oil circuits provides a greatest energy recovery for indirect inter-processes energy integration over a corresponding one or more water or steam buffers.

3. A method as defined in claim 1, wherein the optimal inter-processes energy integration combination includes indirect inter-processes energy integration, the method further comprising the steps of:

determining when a combination of both water or steam buffers and one or more hot oil circuits provides the greatest energy recovery for indirect inter-processes energy integration; and determining when a combination of water buffers, steam buffers, and one or more hot oil circuits provides the greatest energy recovery for indirect inter-processes energy integration.

4. A method as defined in claim 1, wherein the optimal inter-processes energy integration combination includes indirect inter-processes energy integration, the method further comprising the steps of:

determining when indirect integration using steam system alone is better than that of hot oil system to reach energy and greenhouse gas emissions reduction targets; and determining when indirect integration using hot oil system alone is better than that of steam system to reach energy and greenhouse gas emissions reduction targets.

5. A method as defined in claim 1, wherein the optimal inter-processes energy integration combination includes the indirect inter-processes energy integration, the method further comprising the steps of:

identifying when indirect inter-processes energy integration using a buffer is not to be used or recommended, and instead, a resource stream of the plurality of resource streams of a unit, plant, facility, block, or zone is better used as an energy-ambassador to reach energy or greenhouse gas emissions targets; and identifying when indirect inter-processes energy integration using a buffer is not to be used or recommended, and instead, hot-to-hot streams matching, cold-to-cold streams matching, streams identities switching techniques, or a combination thereof across a plurality of units, plants, facilities, blocks, or zones should be used to reach energy or greenhouse gas emissions targets.

6. A method as defined in claim 1, wherein the step of determining when direct inter-processes energy integration, indirect inter-processes energy integration, or hybrid inter-processes energy integration provides for a greater energy recovery, comprises the steps of:

determining when direct inter-processes integration is the only option to reach energy and greenhouse gas emissions reduction targets; and determining when indirect integration alone can be used to reach the energy and greenhouse gas emissions reduction targets.

7. A method as defined in claim 1, wherein the optimal inter-processes energy integration combination includes the hybrid inter-processes energy integration, the method further comprising the step of:

identifying a minimum number of direct inter-process energy integration connections that render an optimal impact on waste heat recovery before resorting to indirect inter-processes energy integration; and generating an industrial site inter-processes heat exchange system design having an inter-processes connection and matching scheme providing a balance between most efficient waste heat recovery and capital cost allocation.

8. A method as defined in claim 1, further comprises the steps of:

identifying a plurality of additional inter-processes heat exchange system design having an overlapping structure and designed to provide optimal future retrofit solutions responsive to forecasted operational and capital considerations.

9. A method as defined in claim 1, wherein the step of determining when direct inter-processes energy integration, indirect inter-processes energy integration, or hybrid inter-processes energy integration provides for a greater energy recovery, comprises the step of arbitrating between direct and indirect inter-processes energy integration solutions in view of one or more non-thermodynamic constraints; and wherein the method further comprises the steps of producing and synthesizing an acceptable inter-processes heat exchange system design providing the optimal solution for total waste heat recovery and a second-best solution based upon present operational and capital considerations, and to produce and synthesize a plurality of additional solutions having an overlapping structure designed to provide optimal future retrofit solutions responsive to forecasted operational and capital considerations.

10. A method as defined in claim 1, further comprising the steps of:

defining best and second best heat exchange couplings between the plurality of functional areas for optimal energy consumption and greenhouse gas emissions reduction responsive to an analysis of a plurality of possible combinations of significant processes-specific design modifications and smart matching schemes.

11. A method as defined in claim 1, wherein the plurality of the resource streams for each functional area collectively represent a single functional area process stream for the respective functional area of a plurality of functional area process streams for the plurality of functional areas which collectively form an energy utility system for the mega industrial site, the method further comprising the steps of:

identifying one or more functional area process streams that primarily control a pinch point location for the energy utility system for the mega industrial site;

determining an optimal pinch point location that provides a maximum waste energy recovery and a minimum greenhouse gas emissions for the energy utility system; and adjusting supply temperature of the one or more functional area process streams that primarily control the pinch point location to obtain an inter-processes energy integration energy consumption target.

12. A method as defined in claim 1, wherein the plurality of the resource streams for each functional area collectively represent a single functional area process stream of a plurality of functional area process streams which collectively form an energy utility system for the mega industrial site, and wherein the plurality of functional areas comprise a plurality of zones, blocks, plants, or facilities, and wherein the step of analyzing a plurality of possible inter-processes energy integration combinations between a plurality of functional areas of a mega industrial site, comprises the step of:

identifying a zone, block, plant, or facility that primarily control a pinch point location for the energy utility system for the mega industrial site.

13. A method as defined in claim 1, wherein the plurality of the resource streams for each functional area collectively represent a single functional area process stream of a plurality of functional area process streams which collectively form an energy utility system for the mega industrial site, and wherein the step of analyzing a plurality of possible inter-processes energy integration combinations between a plurality of functional areas of a mega industrial site, comprises the steps of:

identifying one or more functional area process streams that primarily control a pinch point location for the energy utility system for the mega industrial site, accounting for all probable significant intra-processes structures' and parameters' conditions changes; and determining an optimal pinch point location for future retrofit responsive to the identification of the one or more functional area process streams that primarily control the pinch point location and responsive to forecasted operational and capital considerations.

14. A computer-assisted method of providing enhanced energy efficiency and reduced greenhouse gas emissions for a mega industrial site, the method comprising the steps of:

determining, with the assistance of a computer, a plurality of possible inter-processes integration energy consumption targets for a plurality of possible inter-processes energy integration combinations between a plurality of functional areas of a mega industrial site, the plurality of functional areas comprising one or more of the following: a plurality of zones, a plurality of blocks, a plurality of facilities, a plurality of plants, and a plurality of units of the mega industrial site, each including a plurality of resource streams the resource streams comprising one or more cold streams to be heated or one or more hot streams to be cooled;

determining, with the assistance of the computer, the combination of the plurality of possible inter-processes energy integration combinations providing for an optimal solution for total waste heat recovery between the respective functional areas responsive to selection of an energy efficient inter-processes integration energy consumption target, the combination of the plurality of possible inter-processes energy integration combinations comprising one or more resource streams of the plurality of resource streams as a buffer and one or more of water, steam or hot oil buffer systems as a buffer;

determining, with the assistance of the computer, the combination of the plurality of possible inter-processes energy integration combinations comprising one or more resource streams plurality of resource streams as a buffer and one or more of water, steam or hot oil buffer systems as a buffer; and determining, with the assistance of the computer, a technically viable industrial site inter-processes heat exchange system design providing for the optimal total waste heat recovery between the respective functional areas, the determining comprising:

generating a plurality of technically viable energy efficient industrial site inter-processes heat exchange system design alternatives;

identifying, from the plurality of technically viable energy efficient industrial site inter-processes heat exchange system design alternatives, an industrial site inter-process heat exchange system design having an inter-processes connection and matching scheme providing a balance between most efficient waste heat recovery and capital cost allocation; and providing, for display, data indicative of the industrial site inter-process heat exchange system design having an inter-processes connection and matching scheme providing a balance between most efficient waste heat recovery and capital cost allocation.

15. A method as defined in claim 14, wherein the method further comprises determining a plurality of additional inter-processes heat exchange system design having a substantially overlapping structure and designed to provide optimal future retrofit solutions responsive to forecasted operational and capital considerations.

16. A method as defined in claim 14, wherein the steps of identifying the combination of the plurality of possible inter-processes energy integration combinations providing for an optimal solution for total waste heat recovery between the respective functional areas and determining a technically viable industrial site inter-processes heat exchange system design providing the optimal total waste heat recovery between the respective functional areas, comprise the step of:

arbitrating between direct and indirect inter-processes energy integration solutions in view of one or more non-thermodynamic constraints to produce and synthesize an acceptable inter-processes heat exchange system design providing the optimal solution and a second-best solution based upon present operational and capital considerations, and to produce and synthesize a plurality of additional solutions having an overlapping structure designed to provide optimal future retrofit solutions responsive to forecasted operational and capital considerations.

17. A method as defined in claim 14, wherein the step of determining a technically viable industrial site inter-processes heat exchange system design providing for the optimal total waste heat recovery between the respective functional areas, comprises the step of:

defining best and second best heat exchange couplings between the plurality of functional areas for optimal energy consumption and greenhouse gas emissions reduction responsive to an analysis of a plurality of possible combinations of significant processes-specific design modifications and smart matching schemes.

18. A method as defined in claim 14, wherein the plurality of the resource streams for each functional area collectively represent a single functional area process stream for the respective functional area of a plurality of functional area process streams for the plurality of functional areas which collectively form an energy utility system for the mega industrial site, and wherein the steps of identifying a plurality of possible inter-processes energy integration energy consumption targets for a plurality of possible inter-processes energy integration combinations between a plurality of functional areas of a mega industrial site and identifying the combination of the plurality of possible inter-processes energy integration combinations providing for an optimal solution for total waste heat recovery between the respective functional areas, comprises the steps of:

identifying one or more functional area process streams that primarily control a pinch point location for the energy utility system for the mega industrial site;

determining an optimal pinch point location that provides a maximum waste energy recovery and a minimum greenhouse gas emissions for the energy utility system; and adjusting supply temperature of the one or more functional area process streams that primarily control the pinch point location to obtain an inter-processes energy integration energy consumption target.

19. A method as defined in claim 14, wherein the plurality of the resource streams for each functional area collectively represent a single functional area process stream of a plurality of functional area process streams which collectively form an energy utility system for the mega industrial site, wherein the plurality of functional areas comprise a plurality of zones, blocks, plants, or facilities, and wherein the step of identifying a plurality of possible inter-processes energy integration energy consumption targets for a plurality of possible inter-processes energy integration combinations between a plurality of functional areas of a mega industrial site, comprises the step of:

identifying a zone, block, plant, or facility that primarily control a pinch point location for the energy utility system for the mega industrial site.

20. A method as defined in claim 14, wherein the plurality of the resource streams for each functional area collectively represent a single functional area process stream of a plurality of functional area process streams which collectively form an energy utility system for the mega industrial site, and wherein the step of identifying a plurality of possible inter-processes energy integration energy consumption targets for a plurality of possible inter-processes energy integration combinations between a plurality of functional areas of a mega industrial site, comprises the steps of:

identifying one or more functional area process streams that primarily control a pinch point location for the energy utility system for the mega industrial site, accounting for all probable significant intra-processes structures' and parameters' conditions changes; and determining an optimal pinch point location for future retrofit responsive to the identification of the one or more functional area process streams that primarily control the pinch point location and responsive to forecasted operational and capital considerations.

21. A method as defined in claim 14, wherein the step of identifying the combination of the plurality of possible inter-processes energy integration combinations providing for an optimal solution for total waste heat recovery between the respective functional areas, comprises the step of:

determining when direct inter-processes energy integration, indirect inter-processes energy integration, or a combination of both direct inter-processes energy integration and indirect inter-processes energy integration defining hybrid inter-processes energy integration provides for a greater energy recovery.

22. A method as defined in claim 14, wherein the step of determining a technically viable industrial site inter-processes heat exchange system design providing the optimal total waste heat recovery between the respective functional areas to define an optimal inter-processes heat exchange system design, comprises one or more of the following steps when indirect inter-processes energy integration is employed in the optimal heat exchange system design:

determining when one or more water or steam buffers provides a greatest energy recovery for indirect inter-processes energy integration over a corresponding one or more hot oil circuits;

determining when a combination of both water or steam buffers and one or more hot oil circuits provides the greatest energy recovery for indirect inter-processes energy integration, and determining when a combination of water buffers, steam buffers, and one or more hot oil circuits provides the greatest energy recovery for indirect inter-processes energy integration.

23. A method as defined in claim 14, wherein the step of determining a technically viable industrial site inter-processes heat exchange system design providing the optimal total waste heat recovery between the respective functional areas, comprises one of the following steps:

identifying when indirect inter-processes integration using a buffer is not to be used or recommended, and instead, a resource stream of the plurality of resource streams of a unit, plant, facility, block, or zone is better used as an energy-ambassador to reach energy or greenhouse gas emissions targets; and identifying when indirect inter-processes integration using a buffer is not to be used or recommended, and instead, hot-to-hot streams matching, cold-to-cold streams matching, streams identities switching techniques, or a combination thereof across a plurality of units, plants, facilities, blocks, or zones should be used to reach energy or greenhouse gas emissions targets.

24. A computer-assisted method of providing enhanced energy efficiency and reduced greenhouse gas emissions for a mega industrial site, the method comprising the steps of:

identifying, with the assistance of a computer, a plurality of possible inter-processes integration energy consumption targets for a plurality of possible inter-processes energy integration combinations between a plurality of functional areas of a mega industrial site, the plurality of functional areas comprising one or more of the following: a plurality of zones, a plurality of blocks, a plurality of facilities, a plurality of plants, and a plurality of units of the mega industrial site, each including a plurality of resource streams;

selecting an energy-efficient one of the plurality of possible inter-processes integration energy consumption targets;

identifying, with the assistance of the computer, the combination of the plurality of possible inter-processes energy integration combinations providing for the energy efficient one of the plurality of possible inter-processes integration energy consumption targets;

generating, with the assistance of the computer, a plurality of technically viable industrial site inter-processes heat exchange system design alternatives; and identifying, with the assistance of the computer from the plurality of technically viable industrial site inter-processes heat exchange system design alternatives, a technically viable industrial site inter-processes heat exchange system design substantially providing for optimal total waste heat recovery between the respective functional areas; and providing, for display, data indicative of the technically viable industrial site inter-processes heat exchange system design substantially providing for optimal total waste heat recovery between the respective functional areas.

25. A method as defined in claim 24, further comprising the step of:

identifying a plurality of additional inter-processes heat exchange system design having an overlapping structure and designed to provide optimal future retrofit solutions responsive to a time series of forecasted operational and capital considerations.

* * * * *